US012750775B2

(12) United States Patent
Xia et al.

(10) Patent No.: US 12,750,775 B2
(45) Date of Patent: Sep. 29, 2026

(54) COORDINATED R-TWT SP SCHEDULING AMONG MULTIPLE ADJACENT BSS ACCORDING TO NON-AP STA NEEDS

(71) Applicants: SONY GROUP CORPORATION, Tokyo (JP); SONY CORPORATION OF AMERICA, New York, NY (US)

(72) Inventors: Qing Xia, San Jose, CA (US); Salvatore Talarico, Los Gatos, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 267 days.

(21) Appl. No.: 18/749,128

(22) Filed: Jun. 20, 2024

(65) Prior Publication Data

US 2025/0063502 A1 Feb. 20, 2025

Related U.S. Application Data

(60) Provisional application No. 63/643,622, filed on May 7, 2024, provisional application No. 63/520,484, filed on Aug. 18, 2023.

(51) Int. Cl.
*H04W 52/02* (2009.01)
*H04W 84/12* (2009.01)

(52) U.S. Cl.
CPC ........ *H04W 52/0216* (2013.01); *H04W 84/12* (2013.01)

(58) Field of Classification Search
CPC .......................... H04W 52/0216; H04W 84/12
See application file for complete search history.

(56) References Cited

U.S. PATENT DOCUMENTS

| | | | | |
|---|---|---|---|---|
| 2022/0201591 | A1* | 6/2022 | Xin | H04W 48/10 |
| 2022/0386372 | A1 | 12/2022 | Xin | |
| 2022/0408355 | A1 | 12/2022 | Shafin | |
| 2023/0140312 | A1 | 5/2023 | Ajami | |
| 2024/0064705 | A1* | 2/2024 | Chu | H04W 72/04 |

(Continued)

FOREIGN PATENT DOCUMENTS

WO WO-2023075921 A1 5/2023

OTHER PUBLICATIONS

Chen, Qinghua, "An Energy-Efficient Channel Access with Target Wake Time Scheduling for Overlapping 802.11ax Basic Service Sets", IEEE Internet of Things Journal, vol. 9, No. 19, Oct. 2022, pp. 1-14.

(Continued)

*Primary Examiner* — Kashif Siddiqui
(74) *Attorney, Agent, or Firm* — O'BANION & RITCHEY LLP; John P. O'Banion

(57) ABSTRACT

A coordinated form of R-TWT SP scheduling taking into account the needs of non-AP STAs in adjacent BSS. A flag in the BSSID field is used to indicate if the AP is represented by the BSSID is a UHR AP. Mechanisms are described to support coordinated R-TWTs and the operation of UHR devices supporting these coordinated R-TWT. The protocol for UHR AP and UHR non-AP STAs allows for identifying possible interference with the OBSS, directly rescheduling, or performing negotiation with the UHR AP of the OBSS for scheduling the R-TWT SP.

20 Claims, 38 Drawing Sheets

(56) References Cited

U.S. PATENT DOCUMENTS

| | | | | |
|---|---|---|---|---|
| 2024/0365374 A1* | 10/2024 | Patil | ...................... | H04W 74/04 |
| 2024/0365379 A1* | 10/2024 | Ratnam | ................ | H04B 17/328 |
| 2024/0381417 A1* | 11/2024 | Patil | ...................... | H04W 74/08 |
| 2025/0294633 A1* | 9/2025 | Lu | ......................... | H04W 76/15 |

OTHER PUBLICATIONS

Muhammad Kumail Haider (Meta): "R-TWT Multi-AP Coordination", IEEE Draft; 11-23-0291-00-0UHR-R-TWT-Multi-AP-Coordina Tion, IEEE-SA Mentor, May 7, 2023 (May 7, 2023), pp. 1-12, vol. 802.11 UHR, Piscataway, NJ USA, XP068202415, Retrieved from the Internet: [retrieved on May 7, 2023].

* cited by examiner

COORDINATED R-TWT SP SCHEDULING AMONG MULTIPLE ADJACENT BSS ACCORDING TO NON-AP STA NEEDS

CROSS-REFERENCE TO RELATED APPLICATIONS

This application claims priority to, and the benefit of, U.S. provisional patent application Ser. No. 63/520,484 filed on Aug. 18, 2023, incorporated herein by reference in its entirety. This application claims priority to, and the benefit of, U.S. provisional patent application Ser. No. 63/643,622 filed on May 7, 2024, incorporated herein by reference in its entirety.

STATEMENT REGARDING FEDERALLY SPONSORED RESEARCH OR DEVELOPMENT

Not Applicable

Notice of Material Subject to Copyright Protection

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communications, and more particularly to IEEE 802.11 cooperatively scheduling Restricted Target Wake Time (R-TWT) Service Period (SPs) across different basic service sets (BSSs).

2. Background Discussion

In IEEE 802.11 be, some stations have the capability for Extremely High Throughput (EHT), also often referred to as WiFi 7. An EHT AP and its associated EHT non-AP STAs can negotiate a Restricted Target Wake Time (R-TWT) Service Period (SP) for transmitting latency sensitive Up-Link (UL) and/or Down-Link (DL) traffic with specific Traffic Identifiers (TIDs).

However, these features were designed for a single BSS and not across different BSS. This can lead to OBSS interference which impacts scheduled R-TWT SPs in communicating latency sensitive traffic.

Accordingly, a need exists for an enhanced protocol that manages R-TWT SPs, across multiple BSS. The present disclosure fulfills that need and provides additional benefits over existing systems.

BRIEF SUMMARY

A coordinated form of R-TWT SP scheduling is described which takes into account the interference of the AP and/or non-AP STA(s) from the adjacent BSS(s) and the needs/ schedules of corresponding non-AP STA(s) in the intended BSS. The present disclosure describes mechanisms which provide the capability of supporting coordinated R-TWTs and the operation of UHR devices supporting these coordinated R-TWT. The described operational protocol for UHR AP allows for identifying if its associated UHR non-AP STA, which is a member of the coordinated R-TWT, is located within the interference range of the OBSS AP and/or non-AP STAs, and determines if rescheduling of the coordinated R-TWT is required for the UHR non-AP STA.

The procedure of negotiating and granting coordinated R-TWTs is configured for a specific UHR non-AP STA with the proposed coordinated R-TWT ID and frame exchange. The starting point and ending point of the coordinated R-TWT SP are defined. It should be noted that the term 'coordinated R-TWT' can also be referred to as CR-TWT, C-RTWT or Co-RTWT.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

Figure 1:
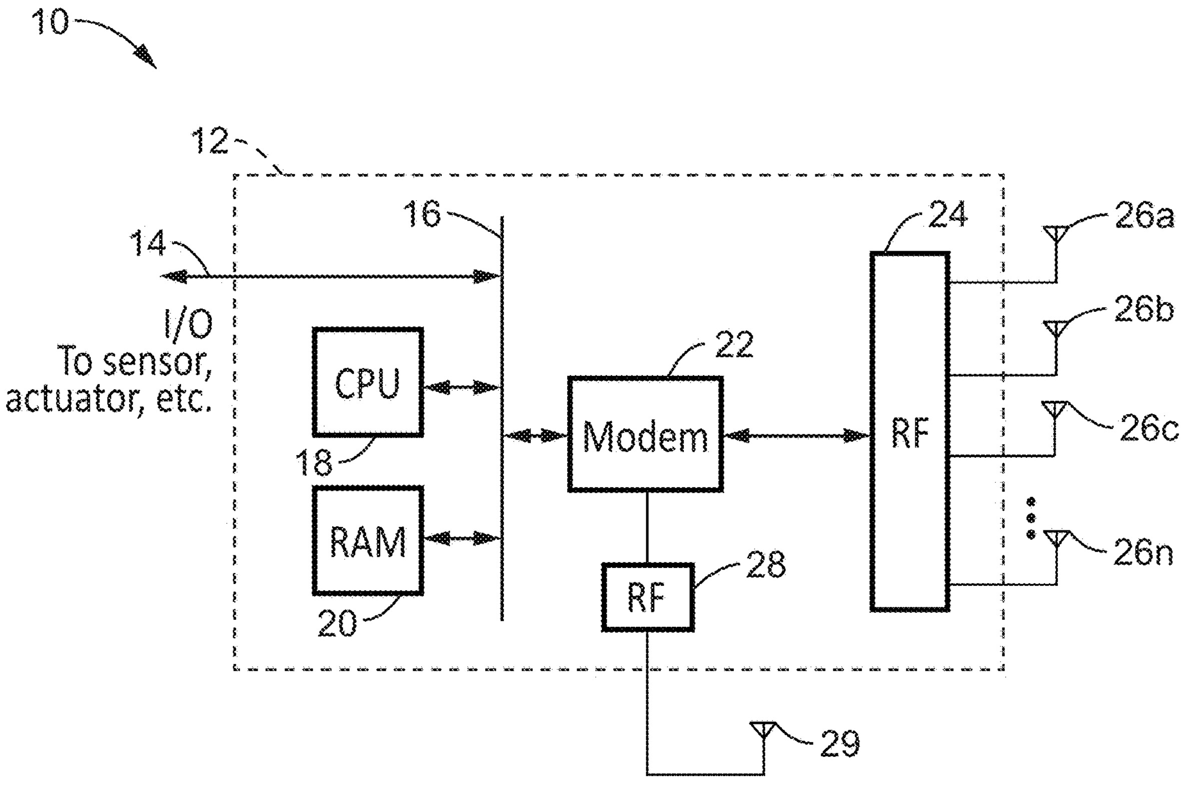
FIG. 1 is a block diagram of communication station hardware, according to at least one embodiment of the present disclosure.

1. Introduction 1.1. R-TWT in IEEE802.11 be

In the current 802.11 be standard (Draft P802.11 be_D6.0) EHT AP and its associated EHT non-AP STAs can negotiate a R-TWT Service Period (SP) for transmitting latency sensitive UL/DL traffic with specific TIDs. A quiet interval commences at the starting point of the R-TWT SP that prevents legacy non-AP STAs from accessing the medium during this protective interval. The EHT non-AP STAs which have been granted membership in the R-TWT SP can transmit Physical-layer Protocol Data Units (PPDUs) or trigger-based (TB) PPDUs during this quiet interval. The EHT non-AP STAs may also follow the quiet rule and not access the medium during this quiet interval. In this case, the R-TWT SP prioritizes the R-TWT member STAs, at the start of the SP, to transmit latency sensitive traffic.

1.2. Neighbor Report

A neighbor report is sent by an AP, and it contains information on neighboring APs that are members of ESSs requested in the neighbor report request. A STA requesting a neighbor report from an AP shall send a Neighbor Report Request frame to its associated AP. An AP receiving a neighbor report request shall respond with a Neighbor Report Response frame containing zero or more Neighbor Report elements.

The Neighbor Report element describes an AP. The subsequent fields in the Neighbor Report element pertain to the BSS, whose BSSID is being reported in the BSSID field of the Neighbor Report element. Aside from that, the Neighbor Report Element also carries BSSID information such as AP Reachability. The Operating Class, and the Channel Number together indicate the primary channel of the BSS being reported. The TSF Offset of the neighbor AP's TSF timer offset, and Beacon Interval of the Neighbor AP is indicated by this BSSID. The Neighbor Report element is capable of extending the sub-element to carry more information about the Neighbor AP as indicated by this BSSID, the current sub-element includes TSF Information, Wide Bandwidth Channel, BSS Load and other information.

1.3. Reduced Neighbor Report

A Reduced Neighbor Report element contains information on neighbor APs, co-located APs, or a combination of both. An AP that operates in the 2.4 GHz or 5 GHz band and that is in the same co-located AP set as one or more 6 GHz APs, shall follow the rules in Out-of-band discovery of a 6 GHz BSS(11ax) for including a Reduced Neighbor Report element in Beacon and Probe Response frames.

The Reduced Neighbor Report element contains channel and other information related to neighbor APs. The Neighbor AP Information fields contains one or more of the Neighbor AP Information fields that include TBTT Information Header, Operation Class, Channel Number and variable TBTT Information Set. The Operating Class field indicates a channel starting frequency that, together with the Channel Number field, indicates the primary channel of the BSSs of the APs in this Neighbor AP Information field. The Channel Number field indicates the last known primary channel of the APs in this Neighbor AP Information field. The TBTT Information Set field contains one or more TBTT Information fields.

1.4. RSSI and RCPI Considerations

Considerations of Receive Signal Strength Indicator (RSSI) and Received Channel Power Indicator (RCPI). The start of an OFDM transmission at a received level greater than or equal to the minimum modulation and coding rate sensitivity (−82 dBm for 20 MHz channel spacing, −85 dBm for 10 MHz channel spacing, and −88 dBm for 5 MHz channel spacing) can cause CS/CCA to detect a channel busy condition with a probability of greater than 90% within 4 us for 20 MHz channel spacing, 8 us for 10 MHz channel spacing, and 16 us for 5 MHz channel spacing.

Additionally, the CS/CCA mechanism shall detect a medium busy condition within 4 us of any signal with a received energy that is 20 dB above the minimum modulation and coding rate sensitivity (minimum modulation and coding rate sensitivity +20 dB resulting in −62 dBm for 20 MHz channel spacing, −65 dBm for 10 MHz channel spacing, and −68 dBm for 5 MHz channel spacing)

In IEEE 802.11 be, when the received frame format is EHT_MU or EHT_TB, then the allowed values for the RSSI parameters are in the range from 0 to 255 inclusive. This parameter is a measurement by the PHY of the power observed at the antennas used to receive the current PPDU measured during the reception of the EHT-LTF field. RSSI is intended to be used in a relative manner, and it represented a monotonically increasing function of the received power.

When the received frame format is EHT_MU or EHT_TB, the allowed values for the RSSI_LEGACY parameter are in the range of from 0 to 255 inclusive. This parameter is a measurement by the PHY layer of the power observed at the antennas used to receive the current PPDU measured during the reception of the non-EHT portion of the EHT PPDU preamble. RSSI_LEGACY is intended to be used in a relative manner, and it is a monotonically increasing function of the received power.

The RCPI is a measure of the received RF power in the selected channel for a received PPDU. This parameter shall be a measurement by the PHY layer of the received RF power in the channel measured over the SYNC field of the received PPDU or by other equivalent means that meet the specified accuracy. RCPI shall equal the received RF power in dBm within an accuracy of ±5 Db (95% confidence interval) within the specified dynamic range of the receiver.

Upon receiving the transmitted energy, according to the selected CCA mode, A PHY-CCA.indication(BUSY) primitive shall be issued for energy detection (ED) and/or code lock prior to correct reception of the PHY header. The PHY measures the RSSI and SQ and the parameters are reported to the MAC in the RXVECTOR.

In the event that a change in the RSSI causes the status of the CCA to return to the IDLE state before the complete reception of the PSDU, as indicated by the PHY LENGTH field, the error condition shall be reported to the MAC using a PHY-RXEND.indication(CarrierLost) primitive and the PHY receiver shall return to the RX IDLE state. The CCA of the OFDM PHY shall indicate a busy medium for the intended duration of the transmitted PPDU.

2. Problem Statement

In the IEEE 802.11 be specification, the R-TWT feature has been designed for a single BSS. However, the interference from OBSS was not taken into consideration. Interference from OBSS may cause the medium to become busy during the scheduled R-TWT SP, which can lead to delay for latency sensitive traffic. Thus, the present disclosure has designed a coordinated R-TWT scheduling process between adjacent BSSs for next generation Wi-Fi (11bn) which prevent transmissions of latency sensitive traffic in adjacent BSSs from interfering with each other.

In the coordinated R-TWT design, if the interference from the coordinated OBSS is sufficient extensive to interfere with all STAs (AP and non-AP STAs) in the intended BSS, then one might consider avoiding overlapping any of the R-TWT SPs between coordinated OBSSs.

However, this situation rarely occurs unless the two BSSs totally overlap; which should not arise. The most general scenario is that the intended BSS and its neighboring OBSS(s) partially overlap, which means the APs from the coordinated BSSs may or may not interfere each other, the associated non-AP STAs in the intended BSS may or may not be located within the communication range of the OBSS's AP or STAs. In this case, the rule to avoid any overlapped R-TWT SPs between the coordinated BSSs is not always required. The coordinated scheduling in this disclosure is thus more adaptive according to the need of each specific STA.

3. Contributions of the Present Disclosure

In the present disclosure coordinated R-TWT SP scheduling is performed among coordinated adjacent BSSs according to the needs of non-AP STAs. More specifically, the capabilities were provided in the described protocol, apparatus, and method for supporting coordinated R-TWT to aid performance of UHR devices supporting these new coordinated R-TWT mechanisms. The protocol was designed to allow a UHR AP to identify if its associated UHR non-AP STA is located within the interference range of the OBSS, and if rescheduling of the coordinated R-TWT is required for the UHR non-AP STA. The procedure of negotiating and granting coordinated R-TWT for a specific UHR non-AP STA is described under various conditions with this disclosed coordinated R-TWT ID and frame exchange. It should be noted that the term 'coordinated R-TWT' could also be termed as CR-TWT, C-RTWT or Co-RTWT.

4. Hardware Embodiments

4.1. Communication Station (STA and MLD) Hardware

FIG. 1 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implements the described communication protocol. The host machine accommodates at least one modem 22 to support communications coupled to at least one RF module 24, 28 each connected to one or multiple antennas 29, 26*a*, 26*b*, 26*c* through 26*n*. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, AP in an OBSS, STA in an OBSS, and so forth), depending on what role it is performing in the current communication protocol and context.

Thus, the STA HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware, such as shown in this figure, can be combined into a multi-link device (MLD), which typically will have a processor and memory for coordinating activity, although it should be appreciated that these resources may be shared as there is not always a need for a separate CPU and memory for each STA within the MLD.

Figure 2:
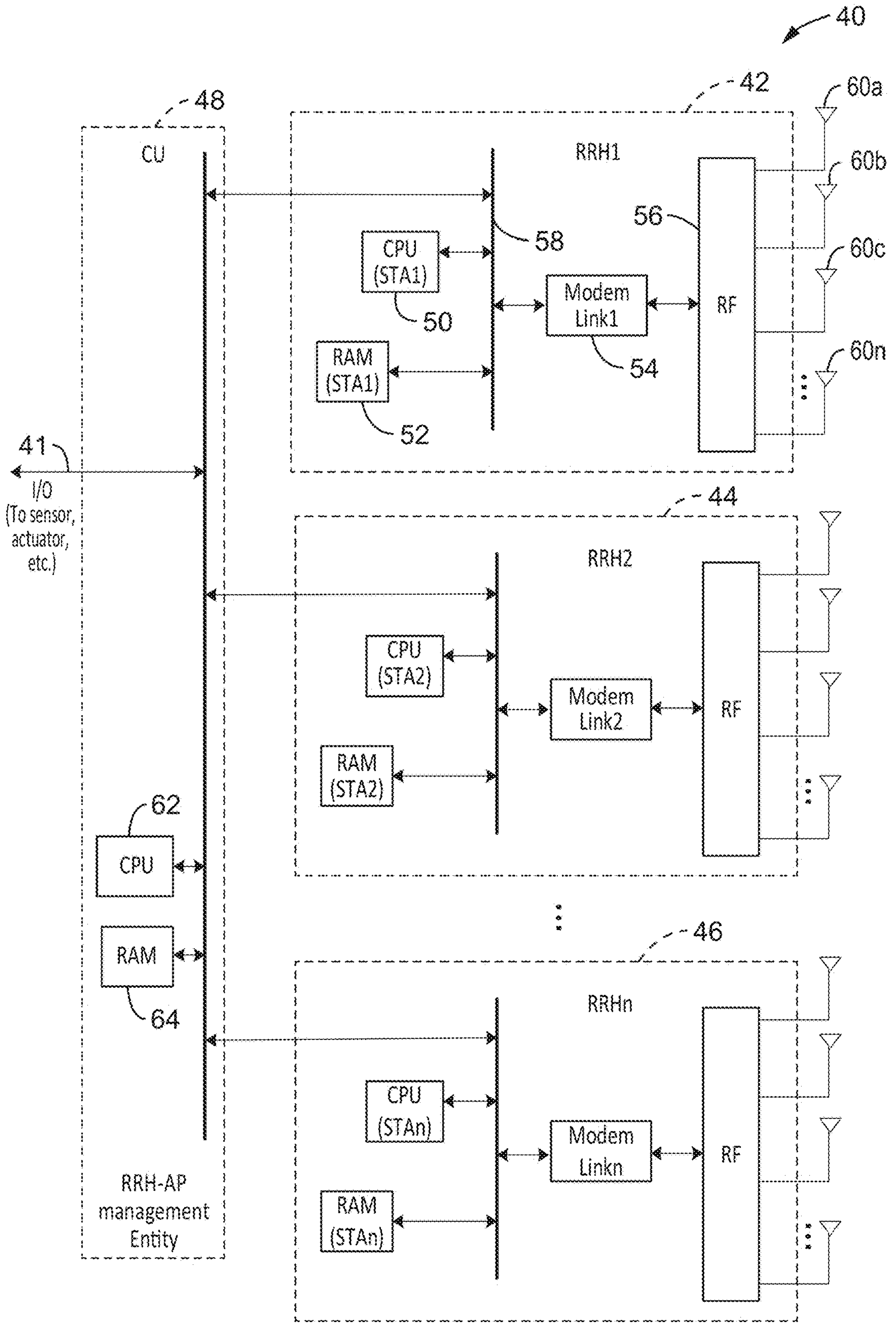
FIG. 2 is a block diagram of Multi-Link Device (MLD) hardware according to at least one embodiment of the present disclosure.

FIG. 2 illustrates an example embodiment 40 of a Multi-Link Device (MLD) hardware configuration. It should be noted that a "Soft AP MLD" is a MLD that consists of one or more affiliated STAs, which are operated as APs. A soft AP MLD should support multiple radio operations, for example on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60*a*, 60*b*, 60*c* through 60*n*, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

5. Topology Under Consideration

Figure 3:
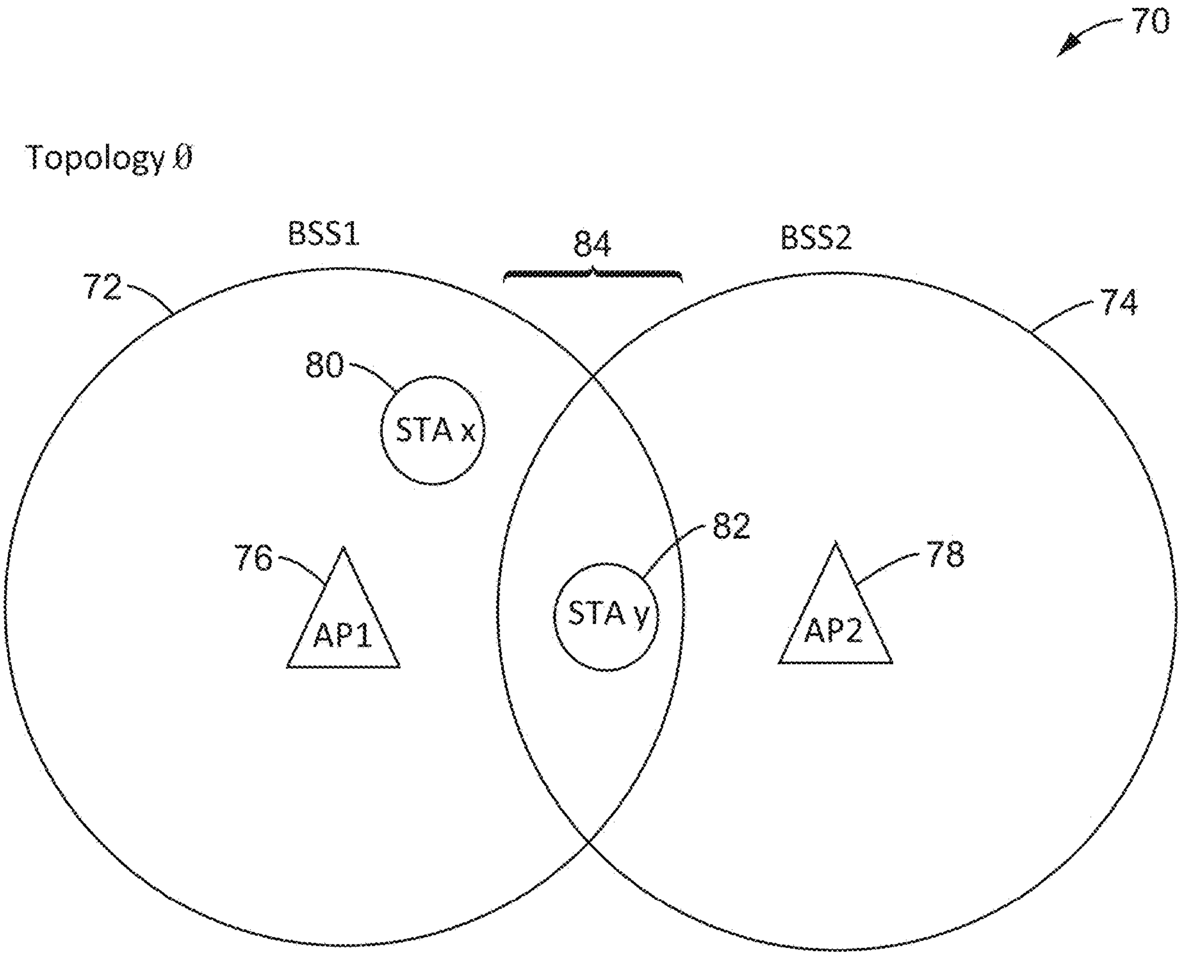
FIG. 3 is a communication topology (Topology 0) showing two BSS in which AP1 and AP2 are unable to directly communicate with each other.

FIG. 3 illustrates an example 70 of a zeroth topology (Topology 0) showing two Basic Service Sets (BSSs) as BSS1 72 having AP1 76, and BSS2 74 having AP2 78. STA x 80 is within BSS1 associated with AP1 76, while STA y 82 is associated with AP2 78 and is located within the intersection (overlap) 84 of BSS1 and BSS2. In this example the APs and STAs are Ultra High Reliability (UHR) devices that support coordinated R-TWT. AP1 and AP2 are unable to directly communicate with each other.

It should be appreciated that the present disclosure is not limited to any specific topologies, and that the topology in this figure, and others in this disclosure, are only provided for the purpose of simplifying discussions about the operation (behavior) of the disclosed protocol enhancements.

Figure 4:
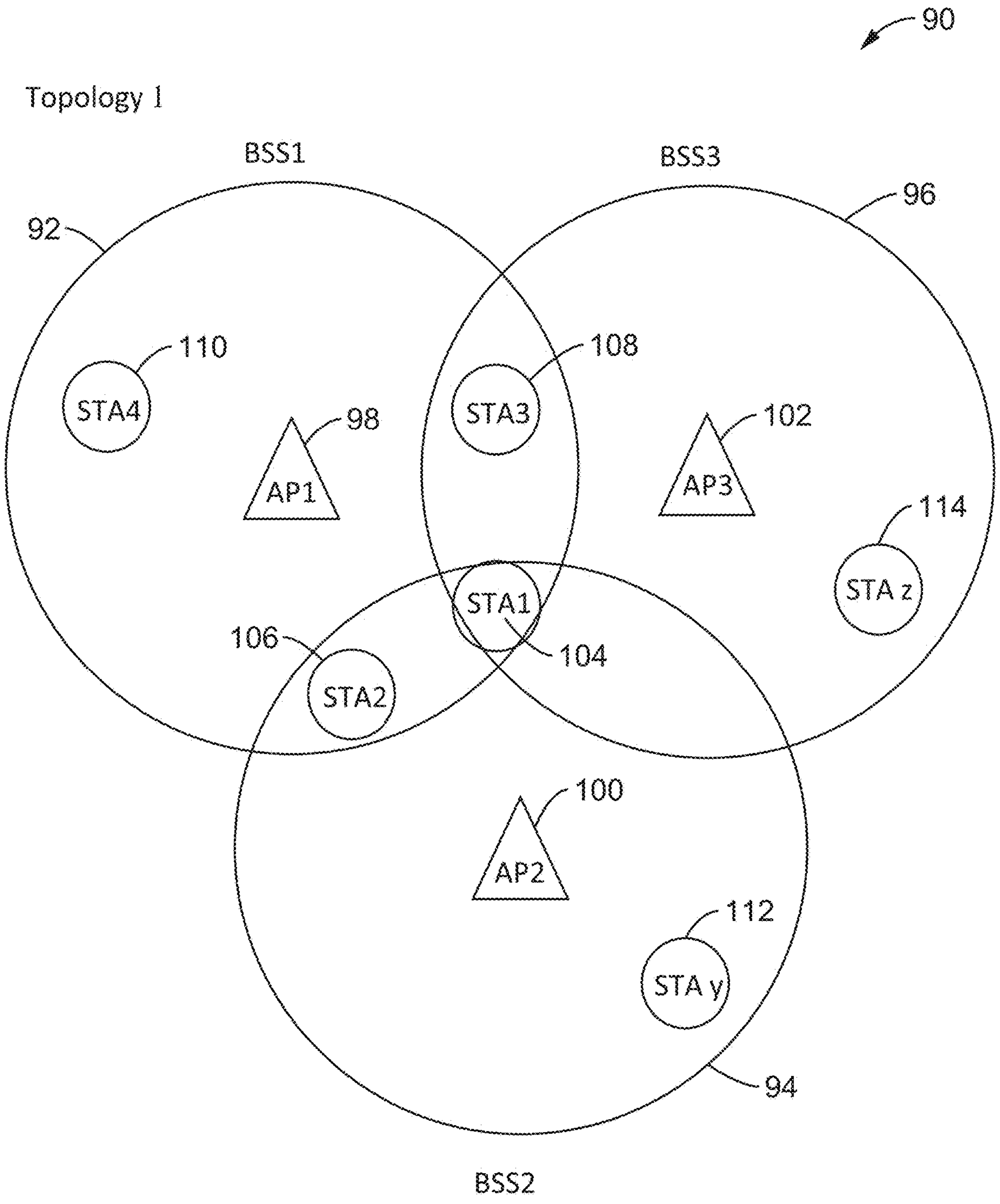
FIG. 4 is a communication topology (Topology 1) showing three BSS in which AP1, AP2 and AP3 are unable to directly communicate with each other.

FIG. 4 illustrates an example 90 of a first topology (Topology 1) showing three Basic Service Sets (BSSs) as BSS1 92 having AP1 98, and BSS2 94 having AP2 100, and BSS3 96 having AP3 102. STA1 104, STA2 106, STA3 108 and STA4 110 are all associated with AP1 98. STA y 112 is associated with AP2, and STA z 114 is associated with AP3 102. The APs and STAs shown in the figure are UHR devices that support coordinated R-TWT.

In this example, AP1, AP2 and AP3 are unable to directly communicate with (hear from) each other. In terms of communication with the APs: STA1 can directly communicate with AP1, and can interfere with AP2 and AP3, while STA2 can directly communicate with AP2 and can interfere with AP1, while STA3 can directly communicate with both AP3 and can interfere with AP3, and STA4 can only directly communicate with AP1. The location of STA y and STA z depend on a specific example, which will not be described here.

Figure 5:
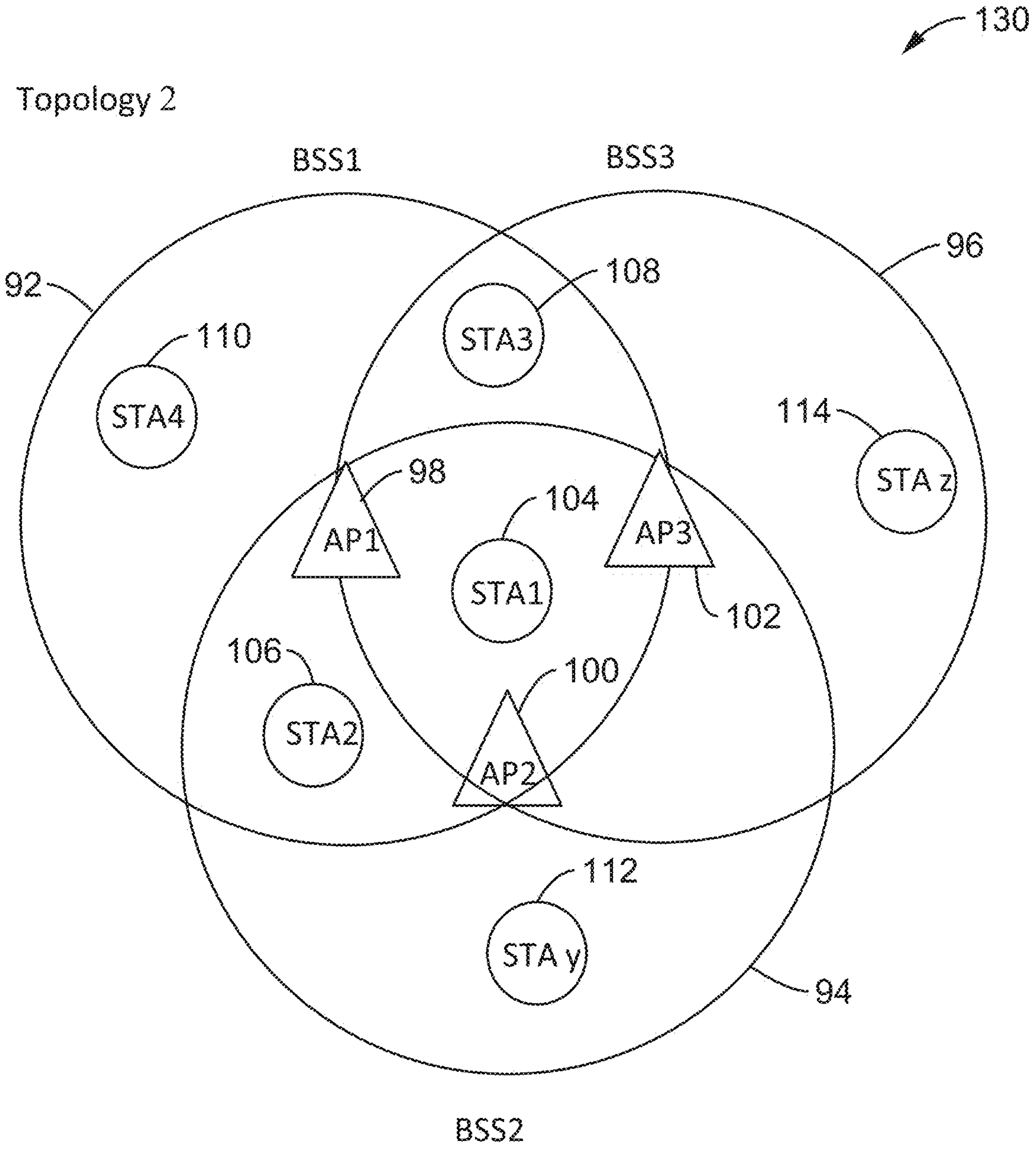
FIG. 5 is a communication topology (Topology 2) showing that AP1 and AP2 can directly communicate with each other, and AP2 and AP3 can directly communicate with each other, yet AP1 and AP3 cannot directly communicate with each other.

FIG. 5 illustrates an example of a second topology 130 (Topology 2) showing three Basic Service Sets (BSSs) as BSS1 92 having AP1 98, and BSS2 94 having AP2 100, and BSS3 96 having AP3 102. The APs and STAs shown in the figure are UHR devices that support coordinated R-TWT.

AP1, AP2 and AP3 can communicate with each other. STA1, STA2, STA3 and STA4 associate with AP1. STA1 104 can hear from AP1, AP2 and AP3. STA2 106 can hear from AP1 and AP2. STA3 108 can hear from both AP1 and AP3, while STA4 110 can only hear from AP1. STA y 112 is associated with AP2. STA z 114 is associated with AP3, the location of STA y and STA z depend on a specific example, which will not be described here.

Figure 6:
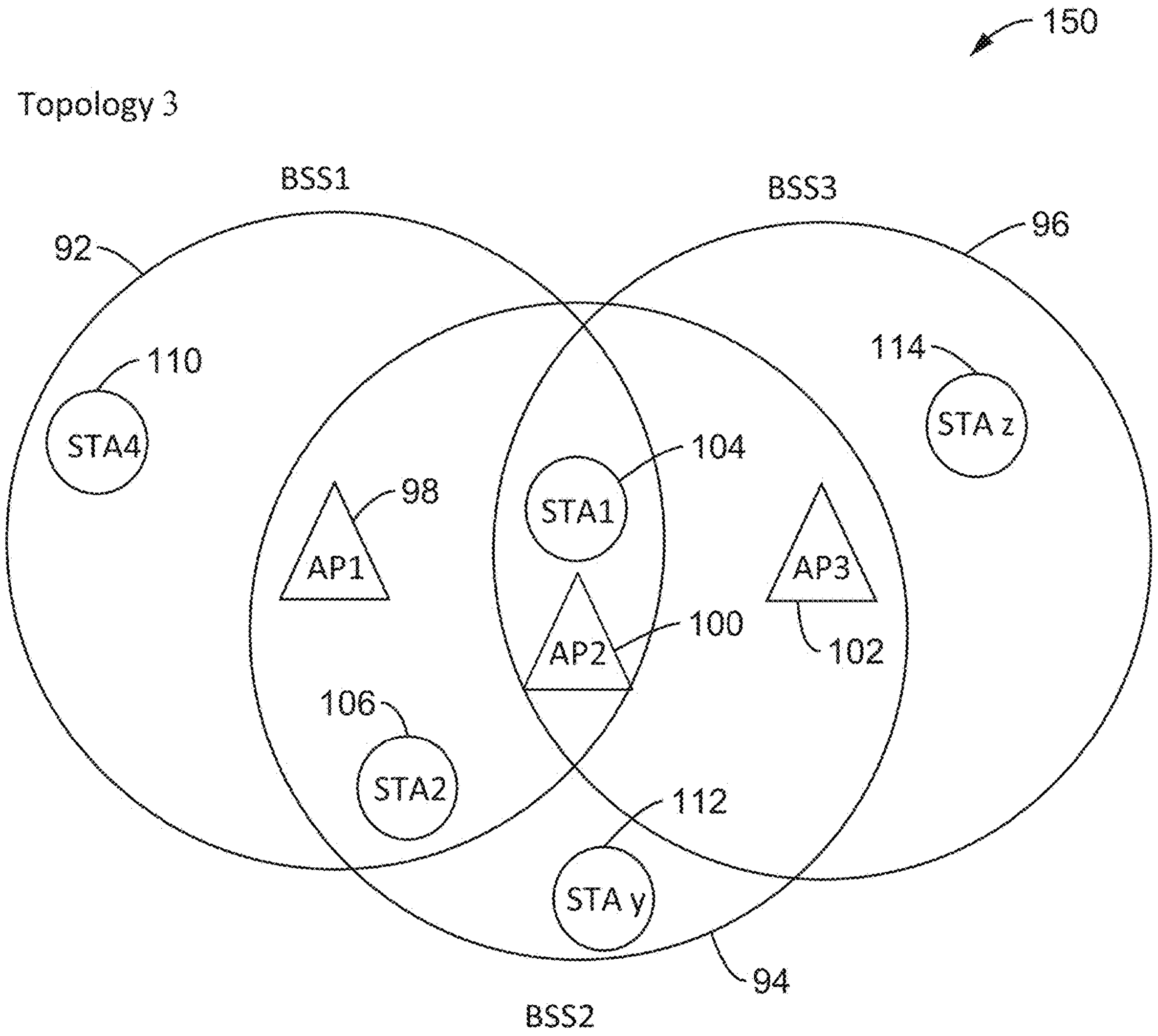
FIG. 6 is a communication topology (Topology 3) in which AP1 and AP3 cannot directly communicate with each other, and in which STA1 can receive communications from AP1, AP2 and AP3; STA2 can receive communications from AP1 and AP2, while STA4 can only receive communications from AP1.

FIG. 6 illustrates an example of a third topology 150 (Topology 3) showing three Basic Service Sets (BSSs) as BSS1 92 having AP1 98, and BSS2 94 having AP2 100, and BSS3 96 having AP3 102. The APs and STAs shown in the figure are UHR devices that support coordinated R-TWT.

In this situation AP1 and AP2 can directly communicate with each other, and AP2 and AP3 can directly communicate with each other, yet AP1 and AP3 cannot directly communicate with each other. STA1 104, STA2 106 and STA4 110 are associated with AP1. STA1 can directly communicate with AP1, and interfere with AP2 and AP3. STA2 can directly communicate with AP2 and can interfere with AP1. STA4 110 can only communicate with AP1.

It will be noted that this description intentionally skips STA3 for ease of description in addressing general performance of a STA with the same STA ID in two BSS topologies in following sections. STA y 112 is associated with AP2. STA z 114 is associated with AP3, the location of STA y and STA z depend on specific examples, which need not be described herein.

6. Protocol General Overview

It should be appreciated that for the purpose of simplification, unless otherwise specified, the AP and non-AP STA mentioned in this disclosure refer to UHR APs and UHR non-AP STAs, respectively.

1. The coordinated R-TWT SP(s) should be scheduled in response to a consideration of the network topology. (a) For the coordinated APs that are participating in transmission and/or reception and may interfere with each other during the overlapped R-TWT SPs, they should be orthogonally rescheduled in the time, frequency or spatial domain to avoid interference. (b) For the coordinated APs that don't interfere with each other during the overlapped R-TWT SPs, the coordinated R-TWT SP(s) would be scheduled according to each specific non-AP STA, which is an R-TWT member of any of the coordinated R-TWT SP(s), with details extended in Section 6.2.
2. The coordinated R-TWT SP(s) should be scheduled for specific non-AP STAs that are R-TWT members of overlapped and interfered R-TWT SPs from adjacent BSSs. (a) For non-AP STAs that are located within the communication range of the AP and/or non-AP STA(s) from the coordinated neighboring OBSS; the coordinated R-TWT scheduler(s) should avoid scheduling the non-AP STAs in a coordinated R-TWT SP that may overlap/interfere with the OBSS coordinated R-TWT SP that was scheduled to serve those interfering STAs from that OBSS. (b) For non-AP STAs that are not located within the communication range of the AP, or non-AP STA(s), from the coordinated neighboring OBSS; the coordinated R-TWT scheduler(s) can schedule the non-AP STAs of a coordinated R-TWT SP that may overlap, however not interfere, with the OBSS coordinated R-TWT SP that was scheduled to serve those STAs while not introducing interference from that OBSS.
3. The coordinated R-TWT scheduling APs and the coordinated R-TWT scheduled STAs from the coordinated BSSs should indicate the capabilities, which include but are not limited to the following. (a) It should indicate whether it supports coordinated R-TWT features that could be combined with other coordination mechanisms (e.g., C-TDMA (Time Division Multiple Access), C-OFDMA (Orthogonal Frequency Division Multiple Access), C-SR (Spatial Reuse) and so forth) and the corresponding channel access rules. In at least one embodiment, the present disclosure is configured for Coordinated Time Division Multiple Access (C-TDMA), (b) It should indicate whether it supports the coordinated R-TWT schedule according to the need of each specific non-AP STA. More specifically, it should provide an indication according to the non-AP STA(s)' corresponding interference from the AP and/or non-AP STA(s) from the coordinated OBSS. (c) Thus, a subfield Coordinated R-TWT Support is designed to indicate the support of coordinated R-TWT schedule. The STA/AP which supports coordinated R-TWT receives the frame from OBSS and parses the Coordinated R-TWT Support subfield, set to 1, should continue parsing information including, but not limited, to the BSSID, the R-TWT schedule, the channel access rules, such as the overlapped quiet interval, the Time Synchronization Function (TSF) offset, the primary channel and other operating channel information, the BSS color, the AID or TA, the RSSI and/or the RCPI of the OBSS.
4. An AP supporting coordinated R-TWT capabilities can negotiate coordinated R-TWT schedules with an OBSS AP that supports the coordinated R-TWT capabilities. (a) The negotiation procedure can be directly through the frame exchange between these coordinated APs if they are in communication range of each other; or could otherwise be coordinated through a common management entity, or a backhaul connection; or through relaying from the associated STAs if the coordinated APs are not in communication range of each other. (b) The coordinated R-TWT scheduling APs can negotiate or advertise the (re)scheduled coordinated R-TWT information to the associated coordinated R-TWT scheduled non-AP STA(s) that are interfered with by the OBSS overlapped R-TWT SPs. (c) The coordinated R-TWT schedules can be negotiated and carried in Beacon frames or other management, control or action frames. (d) In addition, aside from the coordinated R-TWT schedule, the BSSID, the channel access rules, the TSF offset, the primary channel, other operating channel information, the BSS color, the AID or TA, the RSSI and/or the RCPI can also be carried by the OBSS frames. The coordinated R-TWT scheduling AP can announce the identified coordinated OBSS (BSSID or BSS color) list to the associated coordinated R-TWT scheduled non-AP STAs for the non-AP STAs to determine whether there is a need to relay information based on the received OBSS signal.

5. When a non-AP STA supporting coordinated R-TWT capabilities (as described in element 3 above) detects an OBSS frame with different BSS color, it should parse the frame to check if the frame has the Coordinated R-TWT Support subfield is set to 1 meaning the source of the frame is capable to support the coordinated R-TWT and/or contains (coordinated) R-TWT schedule of the OBSS. The term 'color' in the above refers to the AP assigning a value (from 1 to 63), known as BSS color, to be included in the PHY header of all transmissions in its BSS. Accordingly, detecting an OBSS frame with a different color indicates that this non-AP STA may be located within an area that can be interfered with by the OBSS frame source. in this case, the non-AP STA should check BSSID or BSS color from the OBSS frame to see if the frame is sent from a coordinated OBSS as previously announced by its associated AP.

(a) If the non-AP STA couldn't identify the BSSID from the previously announced coordinated OBSS by its associated AP; then this indicates that the OBSS device might be hidden from its associated AP. The non-AP STA should report the information including, but not limited to the BSSID, the R-TWT schedule, the channel access rules, the TSF offset, the primary channel and other operating channel information, the BSS color, the AID or TA, the RSSI and/or the RCPI of the OBSS as parsed from the received OBSS frame to its associated AP.

(b) If the non-AP STA identifies the frame is sent from a coordinated OBSS that was previously announced by its associated AP, which implicitly indicated that the non-AP STA associated AP might also receive this frame and will be aware of the R-TWT schedule of this coordinated OBSS. The non-AP STA is to parse the frame and first report at least the parsed BSSID/BSS color, the AID or TA, the RSSI and/or the RCPI and R-TWT ID information of the OBSS frame to its associated AP. The non-AP STA can identify if its associated AP successfully received the frame from the coordinated OBSS based on the AP's response. If in AP's response, the AP requests to report more information (e.g., by setting up a Coordinated R-TWT Info request flag) including but not limited to the coordinated R-TWT schedule, the channel access rules, the TSF offset, the primary channel and other operating channel information of the OBSS as parsed or detected from the received OBSS frame, the non-AP STA should further report this parsed information to its associated AP. Otherwise, the non-AP STA can assume that its associated AP is aware that it is interfered with by the OBSS frame source and is aware of the coordinated R-TWT schedule and other information from that interfering OBSS. (b)(i) The non-AP STA can also identify its associated AP has received the coordinated R-TWT schedule from the OBSS frame through different ways including but not limited to: (b)(i)(A) receiving a management frame that carries updated coordinated R-TWT schedule which indicates the corresponding OBSS R-TWT ID from its associated AP; (b)(i)(B) receiving a frame from its associated AP that carries a signaling bit e.g., Update R-TWT Flag that indicates the AP has received a coordinated R-TWT schedule from its OBSS and updated its coordinated R-TWT schedule with considering its own R-TWT and the coordinated R-TWT schedule from the OBSS; and/or (b)(i)(C) detecting the negotiation frame exchange between its associated AP and the coordinated OBSS AP. (c) The report frame can be a management frame, control frame or action frame, which carries information including, but not limited to the coordinated R-TWT schedule, channel access rules, BSSID, TSF offset and primary channel and other operating channel information, the BSS color, the AID or TA, the RSSI and/or the RCPI as parsed or detected from the received OBSS frame of the coordinated OBSS. After the non-AP STA sends the report frame to its associated AP, it expects to receive a response frame, e.g., TWT response frame or another acknowledgement frame, from its associated AP.

6. APs and non-AP STAs supporting coordinated R-TWT capabilities (as described in 3) should negotiate coordinated R-TWT membership of the (re)scheduled coordinated R-TWT SP(s) between each AP and R-TWT member non-AP STA pair or advertise membership from AP to all R-TWT member non-AP STAs. The coordinated R-TWT ID is used to identify the (re) scheduled coordinated R-TWT SP for each coordinated R-TWT member non-AP STAs (as described in element 2 above). The coordinated R-TWT ID reflects both R-TWT ID of the intended BSS and the information of the OBSS(s) as parsed from OBSS frame(s). The details are shown in Example 7-1-1 for Case 1, Example 7-1-2 for Case 2 and Example 7-1-3.

(a) The coordinated R-TWT schedule negotiation between AP and non-AP STAs can be initiated from the non-AP STA side when the non-AP STA is aware (through overhearing OBSS signal) of a new or an update of any OBSS interfering R-TWT SP and it needs to setup or update its own R-TWT SP with the associated coordinated R-TWT scheduling AP. In this case, the non-AP STA can send coordinated R-TWT Request/Report frames to the associated coordinated R-TWT scheduling AP and expect to receive the coordinated Response frame from the AP.

(b) The coordinated R-TWT schedule negotiation between AP and non-AP STAs can be initiated from the AP side when the AP is aware (through overhearing OBSS signal or exchanging signals with OBSS AP) of a new or an update of any OBSS interfering R-TWT SP that will interfere with the existing R-TWT SP in its own BSS. If the AP doesn't receive coordinated R-TWT Request/Report frames from these potentially interfered R-TWT member non-AP STAs, the AP can advertise or negotiate the rescheduled coordinated R-TWT SPs for these non-AP STAs by broadcasting, or groupcasting, or unicasting the rescheduled coordinated R-TWT SPs through an unsolicited coordinated R-TWT Response frame to these interfered R-TWT member non-AP STAs.

(c) The coordinated R-TWT ID should indicate both the R-TWT ID of the R-TWT SP in which the non-AP STA has been granted an R-TWT membership in its own BSS, and the R-TWT ID of the interfering R-TWT SP from its OBSS if the OBSS R-TWT ID has been detected and parsed from any OBSS signals, which could be presented, such as a parameter set of <R-TWT ID of its own BSS, and R-TWT ID of the coordinated OBSS>.

(d) If the R-TWT negotiation as requested by the non-AP STA, or the responding AP doesn't detect any OBSS interference signals, it can provide none for the coordinated OBSS. In this case the coordinated R-TWT ID could be presented as for example a parameter set of <R-TWT ID of its own BSS and none for the OBSS>.

(e) If the R-TWT negotiation requesting non-AP STA or the responding AP detects OBSS interference signals, but not indicating OBSS R-TWT, it can put the BSSID or the BSS color of the OBSS as the R-TWT ID of coordinated OBSS. In this case, the coordinated R-TWT ID can be presented for example as a parameter set of <R-TWT ID of own BSS, and BSSID of OBSS>.

(f) The reschedule rules of the coordinated R-TWT SP based on coordinated R-TWT ID in the negotiation frames could be interpreted as in Table 1. It should be noted in Table 1 that, (A) the setup of the Update R-TWT Flag bit in the frame sent by coordinated R-TWT scheduling AP or the coordinated R-TWT scheduled non-AP STA, indicates that the coordinated R-TWT scheduling AP has updated the coordinated R-TWT SP for the coordinated R-TWT scheduled non-AP STA with considering the interfering OBSS coordinated R-TWT SP if it has been detected and parsed from any OBSS signals. This bit is designed to avoid scheduling deadlock. (B) BSSID can be replaced by BSS color. (C) Together with BSSID/BSS color and/or R-TWT ID of the coordinated OBSS, additional information such as the AID or TA, the RSSI and/or the RCPI of the received OBSS frame can also be exchanged between the coordinated R-TWT scheduling AP and coordinated R-TWT scheduled STA from the intended BSS to identify specific interfering coordinated R-TWT scheduling AP and/or coordinated R-TWT scheduled STA from the coordinated OBSS.

7. The coordinated R-TWT schedules can be negotiated through coordinated R-TWT Request (Req.)/Report (Rept.) frames; coordinated R-TWT Response (Resp.) frames; unsolicited coordinated R-TWT Response frames, beacon frames or other management frames.

(a) The exchange of coordinated R-TWT scheduling information could carry the coordinated R-TWT members' ID information, such as group AID/AIDs and/or TAs, which could be used by the coordinated R-TWT scheduling APs or coordinated R-TWT scheduled non-AP STAs to further identify the coordinated R-TWT SP as indicated by the coordinated R-TWT ID field under the same coordinated R-TWT Parameter Set field is negotiated for which coordinated R-TWT scheduled STA(s) in the intended BSS or from the interfering OBSS.

(b) If the group AID/AIDs and/or TAs are used to identify the STA(s) from the interfering OBSS; then the non-AP STA as a coordinated R-TWT member of the intended BSS can check if the OBSS coordinated R-TWT member STAs as indicated by the group AID/AIDs and/or TAs is an OBSS interference source according to for example the RSSI and/or the RCPI of the OBSS frame previously/currently received from these OBSS Is.

(c) If the group AID/AIDs and/or TAs are used to identify the STA(s) from the intended BSS, it can be used to indicate the coordinated R-TWT SP as identified by the coordinated R-TWT ID field under the same coordinated R-TWT Parameter Set field is negotiated for which coordinated R-TWT scheduled STA(s) in the intended BSS.

(d) The coordinated R-TWT scheduled non-AP STAs should report the identified interference source from the OBSS coordinated R-TWT member STAs and/or OBSS AP to its associated coordinated R-TWT scheduling AP for further coordinated R-TWT SP (re)schedule.

8. When applying coordinated R-TWT (re)scheduling, the scheduling AP should independently (re)schedule non-AP STAs that were R-TWT members of the same R-TWT SP into different R-TWT SPs depending on the interference R-TWT SPs from each non-AP STA's corresponding coordinated OBSS(s). The details are discussed in Example 7-2-1, Example 7-2-2 and Example 7-2-3. (a) It should be noted that the OBSS interference can be caused by OBSS R-TWT scheduling APs and OBSS R-TWT scheduled non-AP STAs. (b) It should be noted that the OBSS interference level may be varying during the mobility of the OBSS coordinated R-TWT member STAs and/or OBSS AP. In this case, the coordinated R-TWT scheduling AP and/or coordinated R-TWT scheduled STA may only need to re-negotiate for the updated coordinated R-TWT SP when the detected OBSS signal from the interfering coordinated R-TWT SP member STAs and/or AP from OBSS has passed or dropped below certain RSSI and/or RCPI threshold.

9. The starting point of a coordinated R-TWT SP can be scheduled after the end point of the latest coordinated OBSS R-TWT SP that the coordinated R-TWT member STA and/or its associated AP interfere with, unless after the latest coordinated OBSS R-TWT SP there is another coordinated OBSS R-TWT SP in sequence that doesn't leave enough time for scheduling a CR-TWT SP. In the 2nd case, the starting point of a coordinated R-TWT SP can be scheduled after the end point of the first interfering coordinated OBSS R-TWT SP that leaves enough time for scheduling a coordinated R-TWT SP.

10. The end point of a coordinated R-TWT SP should be scheduled before the starting point of the next cooperating OBSS R-TWT SP that the coordinated R-TWT member STA and/or its associated AP interfere with. The end point of a coordinated R-TWT SP should also be limited by the R-TWT SP maximum duration.

11. When (re)scheduling the coordinated R-TWT SP for each coordinated R-TWT scheduled STA, the coordinated R-TWT scheduling APs may consider traffic priorities such as TID, stream lifetime and other priorities, which is to be served in the coordinated R-TWT SPs. The coordinated R-TWT scheduling APs can provide earlier channel access and/or more time or frequency or spatial resources to the coordinated R-TWT member STAs which have higher priority than the coordinated R-TWT member STAs from its own BSS and/or from the coordinated OBSS.

12. The coordinated R-TWT scheduling AP can assign non-AP STAs membership of the same coordinated R-TWT SP if their finally scheduled R-TWT SPs are totally overlapped in time.
13. At the starting point of the (coordinated) R-TWT SP, the non-AP STAs and APs should access the channel in the same way in which EHT non-AP STAs and EHT AP perform this in 802.11 be, under the condition that the coordinated R-TWT SPs from the intended BSS and the interfering OBSS are not overlapped after coordinated R-TWT SP (re)scheduling.
14. Non-AP STAs and APs can respect the quiet interval of coordinated OBSSs.
15. When a non-AP STA supporting coordinated R-TWT capabilities (as described in Element 3) detects a Beacon frame or other frame (as described in Element 4) from more than one OBSS (as illustrated in Example 7-4-1, Example 7-4-2 and Example 7-4-3), it can parse the latest coordinated R-TWT schedules from all those OBSSs and report the parsed and/or detected information to its associated AP (as described in Element 5). In this case, the cooperative R-TWT scheduling AP should always use the latest coordinated R-TWT information from OBSS for the reschedule/update of the coordinated R-TWT schedule.
16. The AP and/or its affiliated non-AP STA that support the coordinated R-TWT feature should detect the OBSS topology or OBSS interference from OBSS devices before (re)scheduling the coordinated R-TWT in response to considering the OBSS interference. The AP and/or its affiliated non-AP STA can determine OBSS interference based on several criteria including, but not limited to, the RSSI, RCPI or signal quality (SQ) of the received OBSS signal from OBSS AP and/non-AP STAs.

7. Operational Examples

7.1. Coordinated R-TWT SP Membership Assignment

FIG. 7 through FIG. 10 illustrates Case 1 in which there is no interference between STA x and STA y (FIG. 7 and FIG. 8) and Case 2 in which there exists interference between STA x and STA y (FIG. 9 and FIG. 10) of Example 7-1 of Coordinated R-TWT SP membership assignment.

Figure 7:
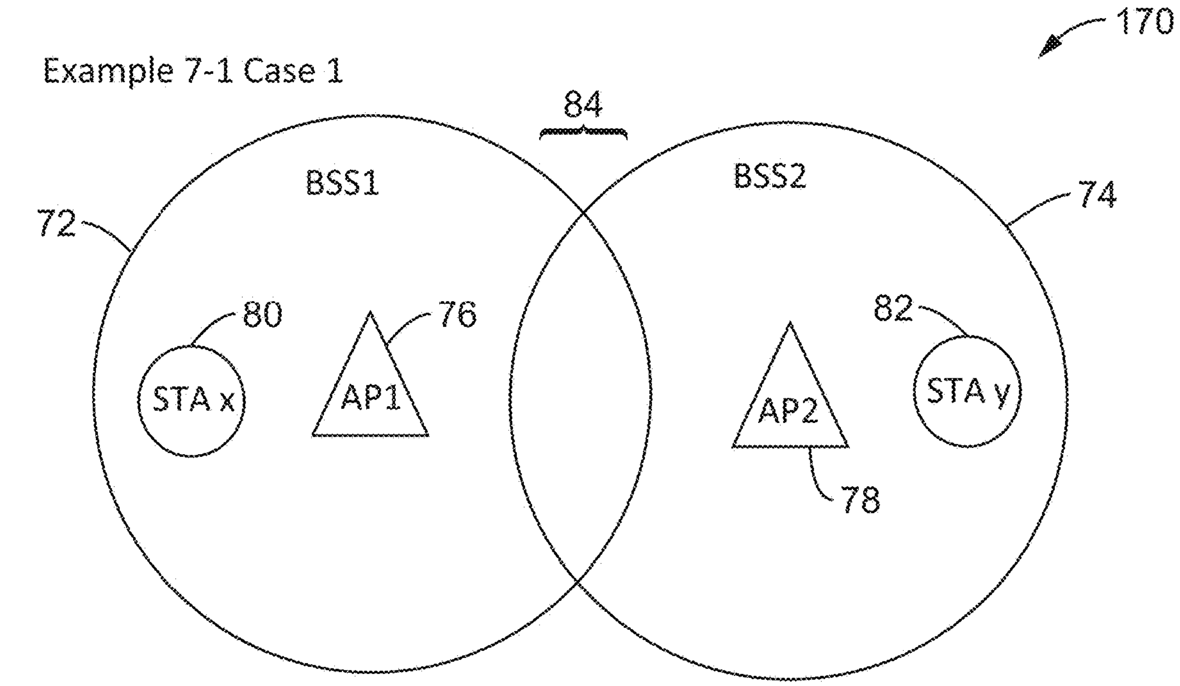
FIG. 7 is a communication topology (Topology 0, Case 1), as Example 7-1 Case 1, in which two BSSs overlap, but without interference between STA x and STA y.
Figure 8:
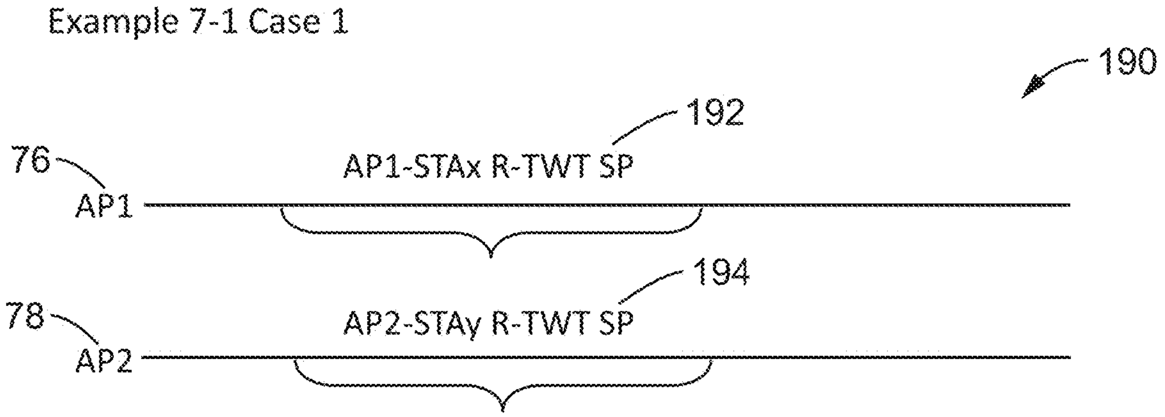
FIG. 8 is a communication diagram for Example 7-1 Case 1 between AP1 and AP2 as utilized according to at least one embodiment of the present disclosure.

In FIG. 7 and FIG. 8 is seen Case 1 which illustrates an example topography in FIG. 7 and the R-TWT SPs scheduled in the time domain of two BSSs in FIG. 8 with the R-TWT SP membership assignment in which there is no interference between STA x and STA y.

Figure 9:
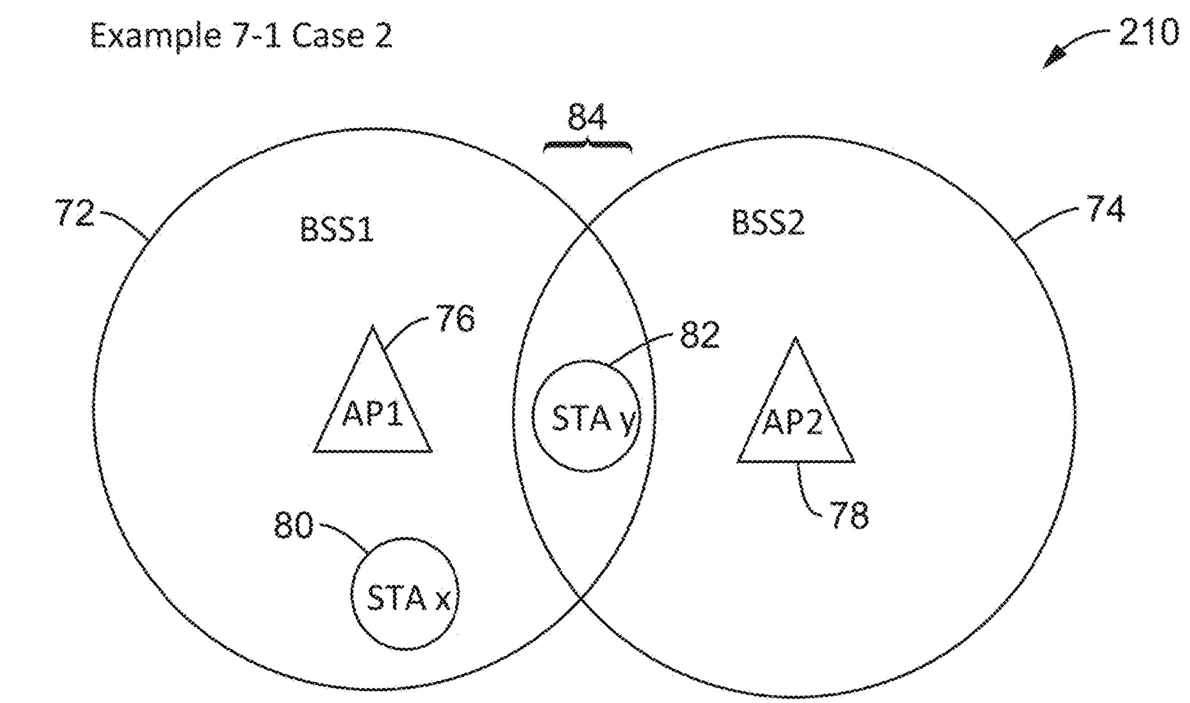
FIG. 9 is a communication topology (Topology 0, Case 2) as Example 7-1 Case 2, in which two BSSs overlap, and interference can arise between STA x and STA y.
Figure 10:
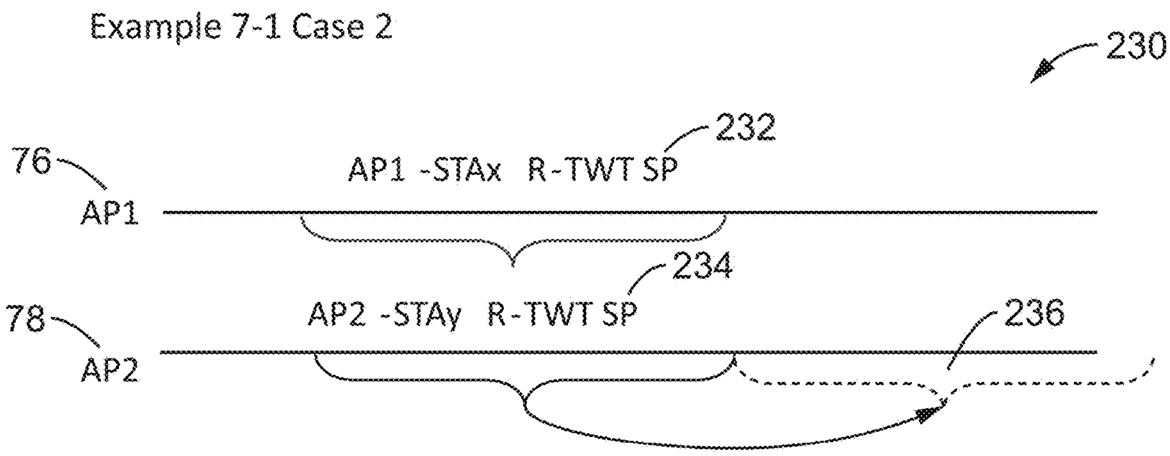
FIG. 10 is a communication diagram between for AP1 and AP2 for Example 7-1 Case 2, in which interference can be mitigated when performed according to at least one embodiment of the present disclosure.

In FIG. 9 and FIG. 10 is seen Case 2 which illustrates an example topography in FIG. 9 and the R-TWT SPs scheduling in the time domain of 2 BSSs in FIG. 10 with the R-TWT SP membership assignment in which interference can exist between STA x and STA y. Both Case 1 and Case 2 are based on Topology 0 as seen and described in FIG. 3. In each of these cases there is seen BSS1 92 having AP1 98 and STA x 172, and BSS2 having AP2 100 with STA y 112. The following provides additional details about these figures.

In FIG. 7 is shown a topology 170 of Case 1 having multiple BSS, exemplified as BSS1 72 and BSS2 74, which overlap 84. In this OBSS context STA x 80 and STA y 82 negotiate coordinated R-TWT memberships with their associated AP1 76 and AP2 78, respectively. STA x cannot directly receive communications from AP2, STA y cannot directly receive communications from AP1. STA x and STA y may or may not be able to directly communicate with each other, depending on their location and communications range.

In FIG. 8 is illustrated an example 190 of R-TWT SPs scheduled by AP1 76 and AP2 78 for STA x and STA y, respectively. If STA x and STA y are not interfering with each other, as shown in Case 1, then there are no issues when overlapping AP1-STAx R-TWT SP 192 and AP2-STAy R-TWT SP 194, which are non-coordinated R-TWT SPs negotiated between AP1 and STAx, AP2 and STAy, respectively.

In FIG. 9 is shown a topology 210 of Case 2 in which STA y 82 is in the overlap 84 between BSS1 72 and BSS2 74, while STA x 80 remains solely within BSS1.

In FIG. 10 is illustrated an example 230 of R-TWT SPs performing re-allocation when interference arises between the original R-TWT SPs that is overlapped in time domain which are from R-TWT SP 232 for AP1 and STA x and R-TWT SP 234 for AP2 and STA y.

If STA x and STA y are interfering with each other as shown in case 2, AP1 and AP2 should avoid overlapping AP1-STAx R-TWT SP and AP2-STAy-R-TWT SP in the time domain, whereby one of the communications should be performed at a later time 236.

AP1 and AP2 can use the new coordinated R-TWT ID as described in the protocol section, to identify Case 1 and Case 2. The details are shown in Example 7-1-1 for Case 1, Example 7-1-2 for Case 2 and Example 7-1-3 for a similar case as Case 1 with AP1 and AP2 able to communicate with (e.g., hear from) each other.

7.1.1. R-TWT Negotiations without Interference APs or STAs

A coordinated R-TWT membership negotiation is shown in this example in which there is no interference between AP1 and AP2. STA x and STA y are both outside of the coverage of their corresponding OBSS AP and non-AP STA. The topology is that of FIG. 7.

Figure 11:
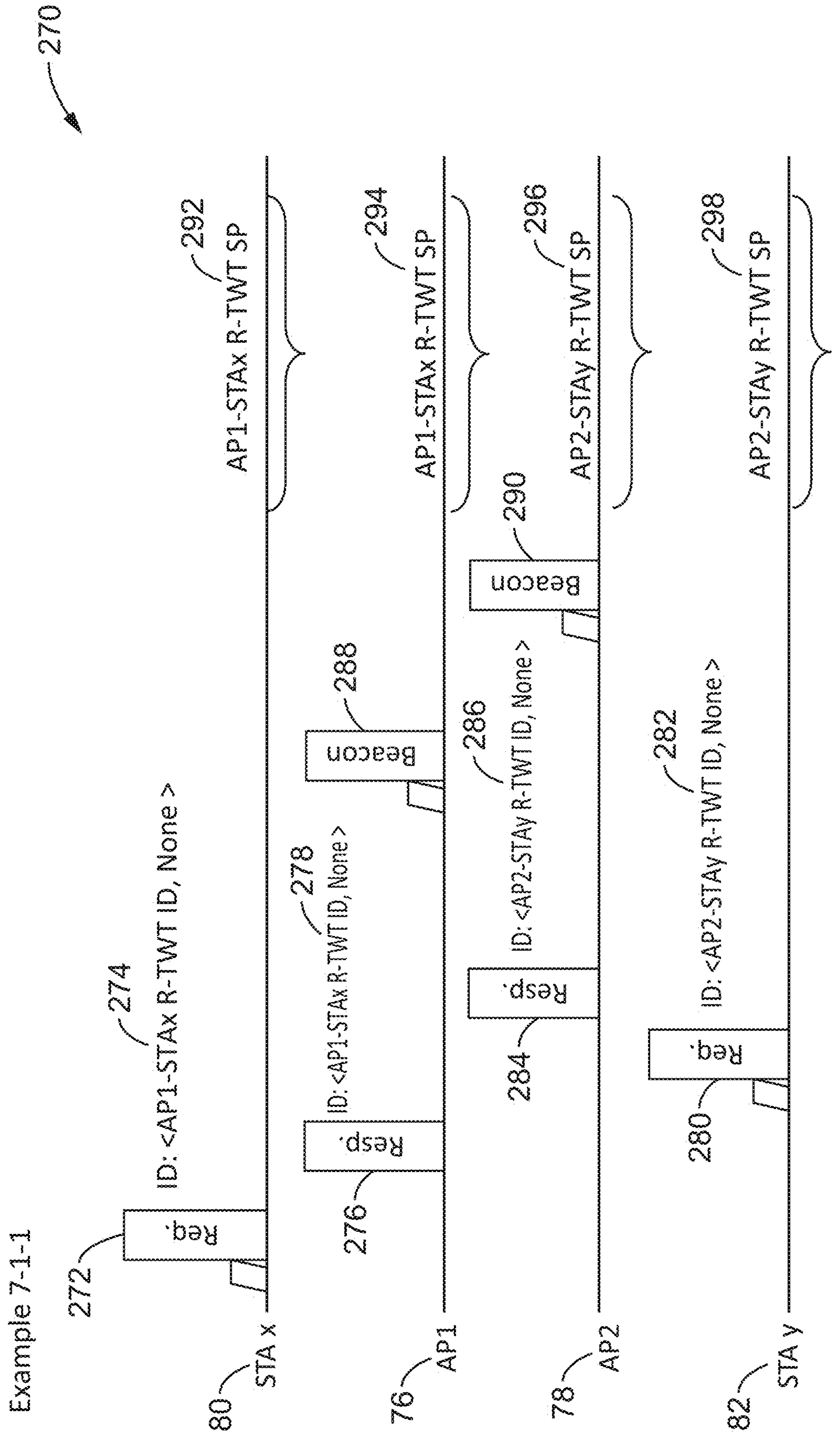
FIG. 11 is a communication diagram as Example 7-1-1 for coordinated R-TWT membership negotiation when there is no interference between AP1 and AP2, or STA x and STA y, when performed according to at least one embodiment of the present disclosure.

FIG. 11 illustrates example communications 270 between AP1 76, AP2 78, STA x 80 and STA y 82. STA x first negotiates the coordinated R-TWT membership with AP1, since STA x didn't receive any communications (e.g., hear anything) from BSS2, it negotiates to be a member of coordinated R-TWT SP identified 274 by ID <AP1-STAx R-TWT ID, None> in the (coordinated) R-TWT Request frame 272, without indicating any OBSS information.

After receiving the (coordinated) R-TWT Request frame 272, AP1 sends back a (coordinated) R-TWT Response frame 276 which indicates the acceptance of the negotiation for STA x to be a member of the coordinated R-TWT SP identified 278 by ID <AP1-STAx R-TWT ID, None>. Later AP1 contends for channel access to broadcast Beacon frames 288 that carry the coordinated R-TWT information.

Then, STA y negotiates, by first sending a request 280 for coordinated R-TWT membership with AP2, since STA y didn't hear anything from BSS1, it negotiates to be a member of coordinated R-TWT SP identified 282 by ID <AP2-STAy R-TWT ID, None> in the (coordinated) R-TWT Request frame, and without indicating any OBSS information.

After receiving the (coordinated) R-TWT Request frame 280, AP2 sends back a (coordinated) R-TWT Response frame 284 indicating acceptance of the negotiation for STA y to be a member of the coordinated R-TWT SP identified 286 by ID <AP2-STAy R-TWT ID, None>. Later AP2 contends for channel access to broadcast Beacon frames 290 that carry coordinated R-TWT information.

Since the (coordinated) R-TWT ID implicitly indicates that the original R-TWT schedule is not affected by OBSS interference. There are no issues in regard to interference on the original R-TWT schedules of BSS1 and BSS2 overlapping with each other. The figure depicts these communications 292, 294, 296, and 298 being performed as originally scheduled.

There should be noted that in the above example, the BSSID can be replaced by other identifiers, such as BSS color. Together with BSSID/BSS color and/or R-TWT ID of the coordinated OBSS, additional information such as the AID or TA, the RSSI and/or the RCPI of the received OBSS frame can also be exchanged between the coordinated R-TWT scheduling AP and the coordinated R-TWT scheduled non-AP STAs from the intended BSS to identify specific interfering coordinated R-TWT scheduling AP and/or coordinated R-TWT scheduled non-AP STA(s) from the coordinated OBSS.

7.1.2. R-TWT Negotiations with STA Interference

A coordinated R-TWT membership negotiation is now described in which there is no interference between AP1 76 and AP2 78, although there is interference between STA y 82 and BSS1 devices including AP1 and STA x 80. The topology is that of FIG. 9.

Figure 12:
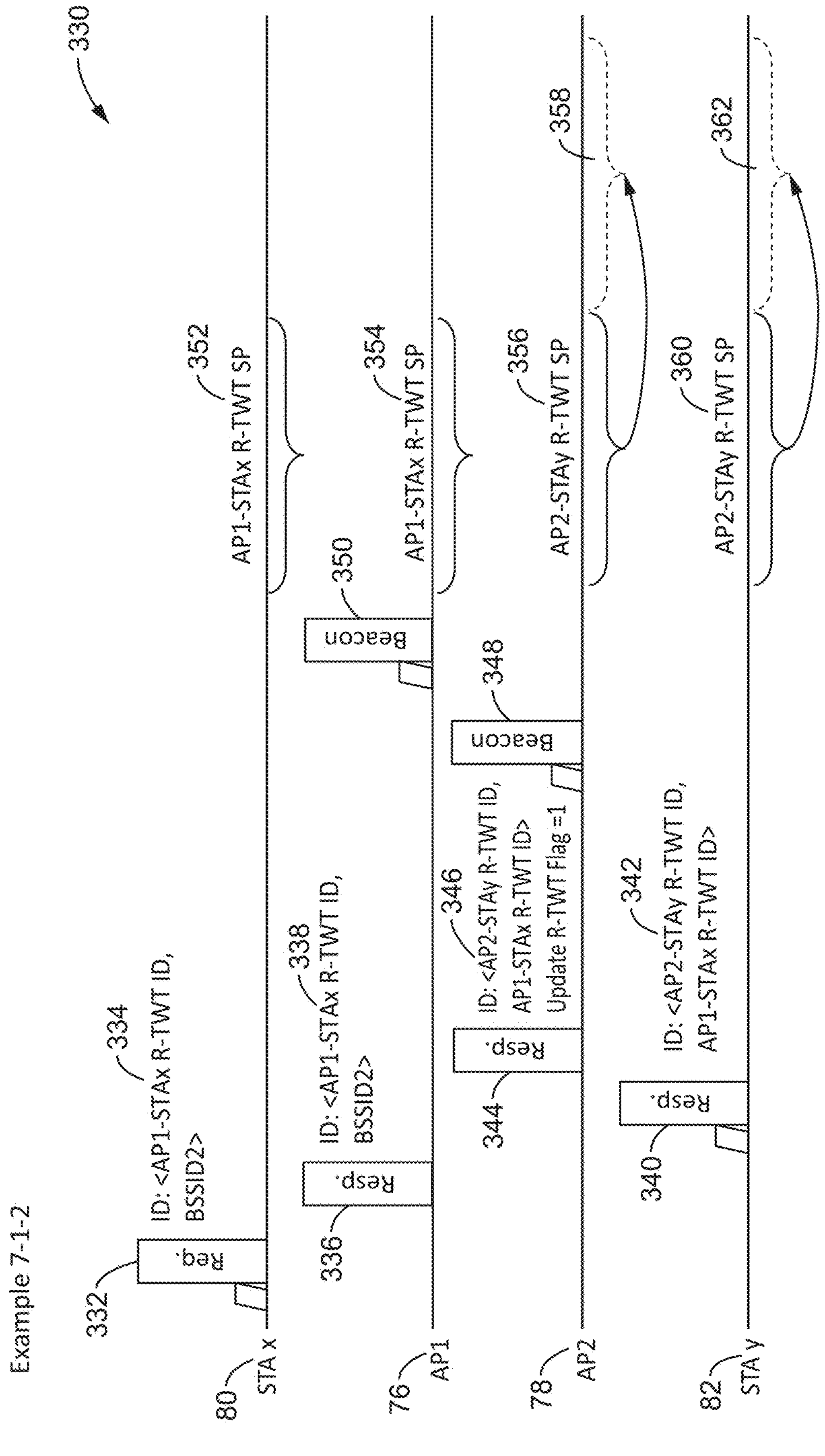
FIG. 12 is a communication diagram as Example 7-1-2 for coordinated R-TWT membership negotiation when there is possible interference between STA x and STA y, which is overcome according to at least one embodiment of the present disclosure.

FIG. 12 illustrates example communications 330 between AP1 76, AP2 78, STA x 80 and STA y 82.

STA x first negotiates the coordinated R-TWT membership with AP1, since STA x can hear from (is in communication range) STA y that is within BSS2, it negotiates by first sending request 332 to be a member of coordinated R-TWT SP identified 334 by ID <AP1-STAx R-TWT ID, BSSID2> in the (coordinated) R-TWT Request frame 332, which indicates that STAx as a member of the coordinated R-TWT SP identified by this ID is interfered with by signals from BSS2.

After receiving the (coordinated) R-TWT Request frame 332, AP1 sends back a (coordinated) R-TWT Response frame 336 indicating the acceptance of the negotiation for STA x to be a member of the coordinated R-TWT SP identified 338 by ID <AP1-STAx R-TWT ID, BSSID2>. Later AP1 contends for channel access and broadcasts Beacon frames 350 that carry the coordinated R-TWT information.

Then, STA y negotiates the coordinated R-TWT membership with AP2, since STA y can hear from AP1 of BSS1 and thus can be aware of R-TWT SP(s) scheduled by AP1, it negotiates to be a member of coordinated R-TWT SP identified 342 by ID <AP2-STAy R-TWT ID, AP1-STAx R-TWT ID> in the (coordinated) R-TWT Request/Report frame 340, in which it negotiates to be a member of the R-TWT SP identified by R-TWT ID AP2-STAy in its own BSS and which indicates the parsed OBSS R-TWT information identified by AP1-STAx R-TWT ID.

After receiving the (coordinated) R-TWT Request frame 332, AP2 sends back a (coordinated) R-TWT Response frame 344 indicating the acceptance of the negotiation for STA y to be a member of the coordinated R-TWT SP identified 346 by ID <AP2-STAy R-TWT ID, AP1-STAx R-TWT ID>. To avoid deadlock, AP2 may use a single bit for setting the Update R-TWT Flag to a first state (e.g., 1) to indicate that it has applied the update considering the R-TWT SPs of both AP2-STAy and AP1-STAx.

As a result of the coordinated operations the original R-TWT schedule identified by AP2-STAy R-TWT ID from BSS2 has been updated from 356, 360 to 358, 362, respectively, to avoid overlapping with the original R-TWT schedule 352, 354 identified by AP1-STAx R-TWT ID from BSS1.

Then prior to the scheduled SPs, AP2 contends for channel access and broadcasts Beacon frames 348 that carry the updated coordinated R-TWT information which also considers the latest R-TWT schedules 358, 362 352, and 354, which are identified by AP2-STAy R-TWT ID from its own BSS and AP1-STAx R-TWT ID from its OBSS. Also prior to the scheduled SPs, AP1 is seen sending beacon frames 350, in response to which SPs 352, 354 are performed according to their original schedules. When the R-TWT SP as identified by AP2-STAy R-TWT ID from BSS2 starts, it shall follow the lasted R-TWT schedules 358 and 362.

It should be noted that in this example, the BSSID can be replaced by other identifiers, such as BSS color. Together with BSSID/BSS color and/or R-TWT ID of the coordinated OBSS, additional information such as the AID or TA, the RSSI and/or the RCPI of the received OBSS frame can also be exchanged between the coordinated R-TWT scheduling AP and the coordinated R-TWT scheduled non-AP STAs from the intended BSS to identify specific interfering coordinated R-TWT scheduling AP and/or coordinated R-TWT scheduled non-AP STA(s) from the coordinated OBSS.

7.1.3. R-TWT Negotiations with Only AP Interference

A coordinated R-TWT membership negotiation is shown in this example in which there is interference between AP1 and AP2, but STA x and STA y are outside of the coverage area of any STA from their corresponding BSS. The topology is that of FIG. 7.

Figure 13:
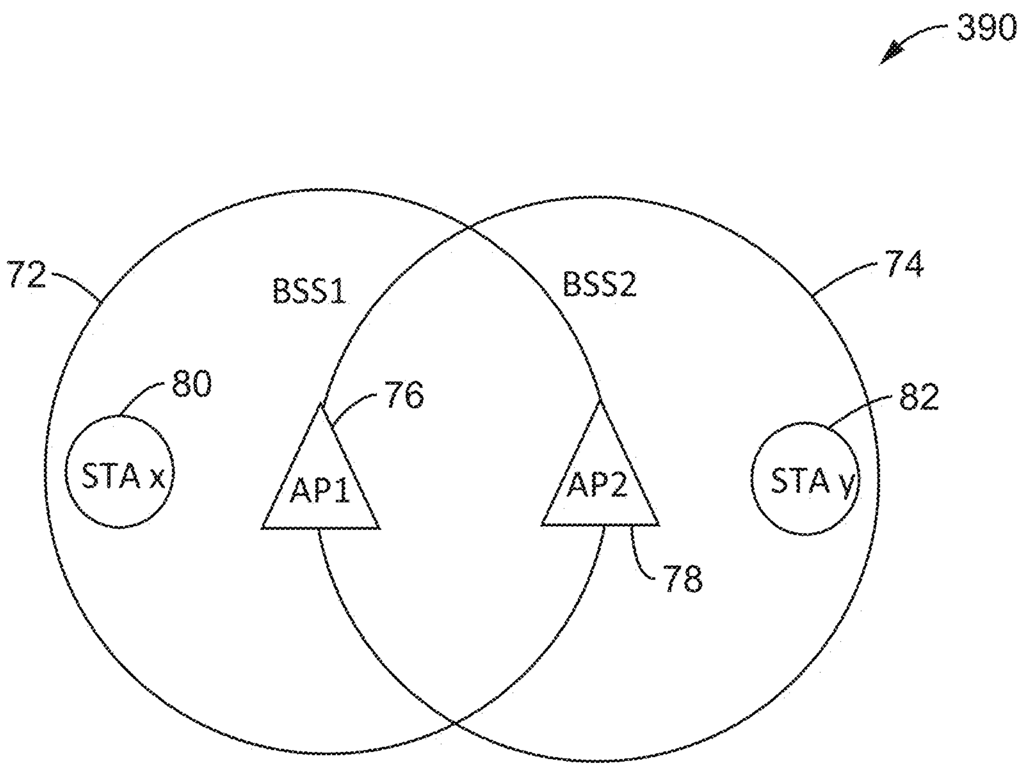
FIG. 13 is a communication topology for Example 7-1-3 for coordinated R-TWT membership negotiation when there is possible interference between AP1 and AP2.

FIG. 13 illustrates an example topology 390, showing AP1 76 and STA x 80 in BSS1 72, and AP2 78 and STA y 82 in BSS2 74, with STA x and STA y bordering on the respective OBSS.

Figure 14:
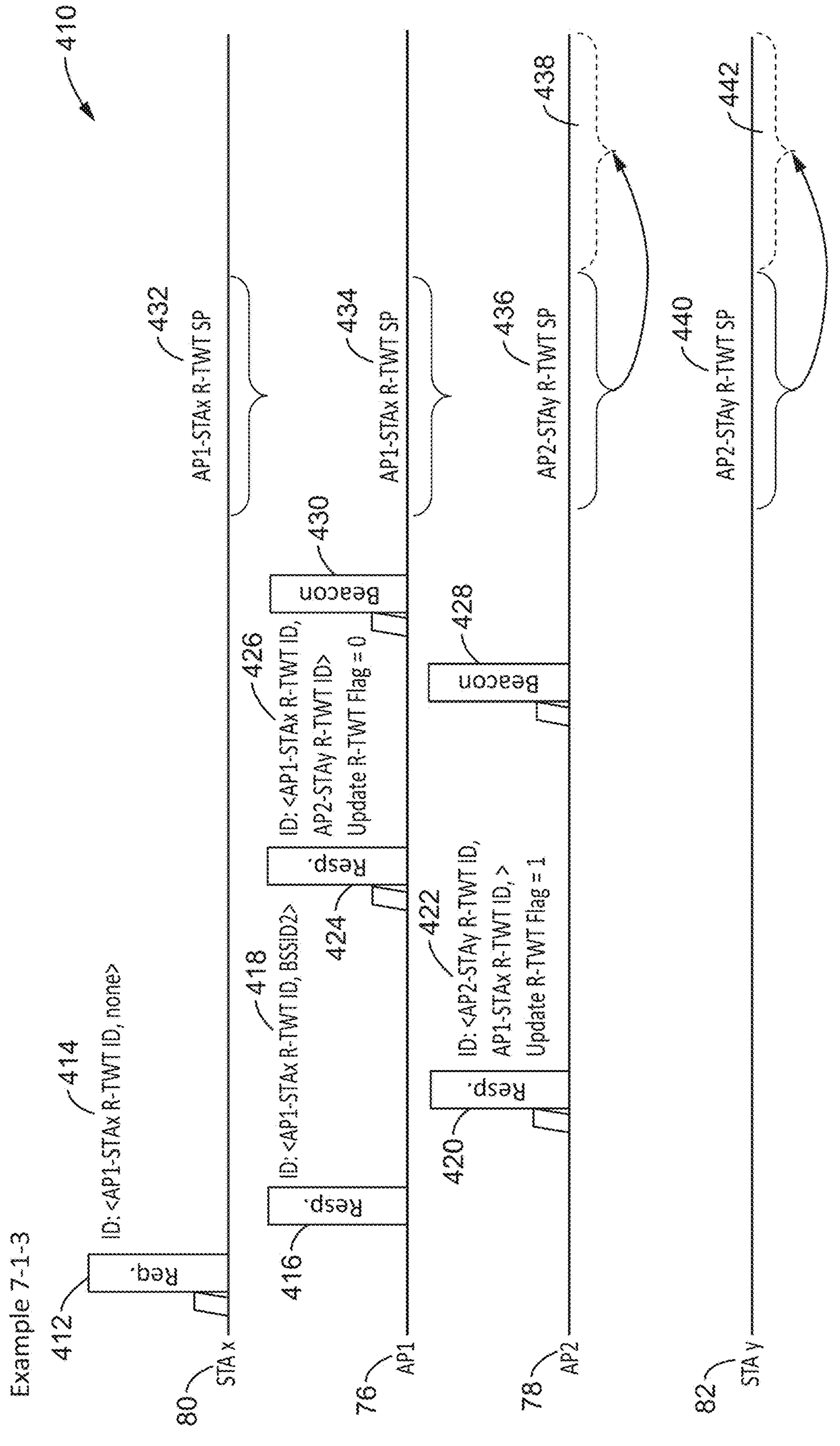
FIG. 14 is a communication diagram as Example 7-1-3 for coordinated R-TWT membership negotiation when there is possible interference between AP1 and AP2 which is overcome according to at least one embodiment of the present disclosure.

FIG. 14 illustrates example communications 410 between AP1 76, AP2 78, STA x 80 and STA y 82.

STA x first negotiates the coordinated R-TWT membership with AP1, since STA x could not hear anything (e.g., receive communications) from BSS2, it negotiates to be a member of coordinated R-TWT SP identified 414 by ID <AP1-STAx R-TWT ID, none> in the (coordinated) R-TWT Request frame 412, which indicates it is not interfered with by signals from BSS2.

After receiving the (coordinated) R-TWT Request frame 412, AP1 sends back a (coordinated) R-TWT Response frame 416 indicating the suggested acceptance of the negotiation for STA x to be a member of the coordinated R-TWT SP identified 418 by ID <AP1-STAx R-TWT ID, BSSID2>, which is different from the ID in the (coordinated) R-TWT Request frame. The (coordinated) R-TWT Response frame indicates that AP1 is interfered by BSS2's signals.

After detecting and parsing the (coordinated) R-TWT Response frame from AP1, then AP2 can broadcast an un-solicited (coordinated) R-TWT Response frame 420 indicating the updated coordinated R-TWT schedule for STA y to be a member of the coordinated R-TWT SP identified 422 by ID <AP2-STAy R-TWT ID, AP1-STAx R-TWT ID>. The updated coordinated R-TWT SP is scheduled with a consideration that the R-TWT SPs identified by AP2-STAy R-TWT ID and AP1-STAx R-TWT ID. To avoid deadlock, AP2 may use a signal bit for setting the Update R-TWT Flag to a first state (e.g., '1') to indicates that it has applied the update which considers the above mentioned R-TWT SPs.

After detecting and parsing the un-solicited (coordinated) R-TWT Response frame 420 from AP2, AP1 can broadcast an un-solicited (coordinated) R-TWT Response frame 424 indicating the updated coordinated R-TWT schedule for STA x to be a member of the coordinated R-TWT SP identified 426 by ID <AP1-STAx R-TWT ID, AP2-STAy R-TWT ID>. Since the Update R-TWT Flag is set to a first state (e.g., '1') in the (coordinated) R-TWT Response frame; AP1 should understand that AP2 has already updated coordinated R-TWT schedule to avoid overlap, whereby AP1 does not need to update R-TWT SP, so AP1 should set the Update R-TWT Flag to a second state (e.g., '0') as shown. Later AP1 and AP2 broadcast Beacon frames 428, 430 that carry the updated coordinated R-TWT information with consideration of the updated R-TWT schedules 432, 434, 438, 442 identified by AP1-STAx R-TWT ID from its BSS1 and AP2-STAy R-TWT ID from BSS2.

As the result of the cooperation, the original R-TWT schedule identified by AP2-STAy R-TWT ID from BSS2 has been updated 438, 442 to avoid overlap with original R-TWT schedule identified by AP1-STAx R-TWT ID from BSS1.

It should be noted in this example, that the BSSID can be replaced by other identifiers such as BSS color. Together with BSSID/BSS color and/or R-TWT ID of the coordinated OBSS, additional information such as the AID or TA, the RSSI and/or the RCPI of the received OBSS frame can also be exchanged between the coordinated R-TWT scheduling AP and the coordinated R-TWT scheduled non-AP STAs from the intended BSS to identify specific interfering coordinated R-TWT scheduling AP and/or coordinated R-TWT scheduled non-AP STA(s) from the coordinated OBSS.

7.2.1. Scheduling with OOR APs and STAs that do not Interfere

In this Example 7-2-1 scheduling is shown being performed when the APs cannot directly communicate with each other, and thus are (Out Of Range (OOR)), and OBSS STAs that do not interfere with each other. This example uses Topology 1 as seen in FIG. 4.

Figure 15:
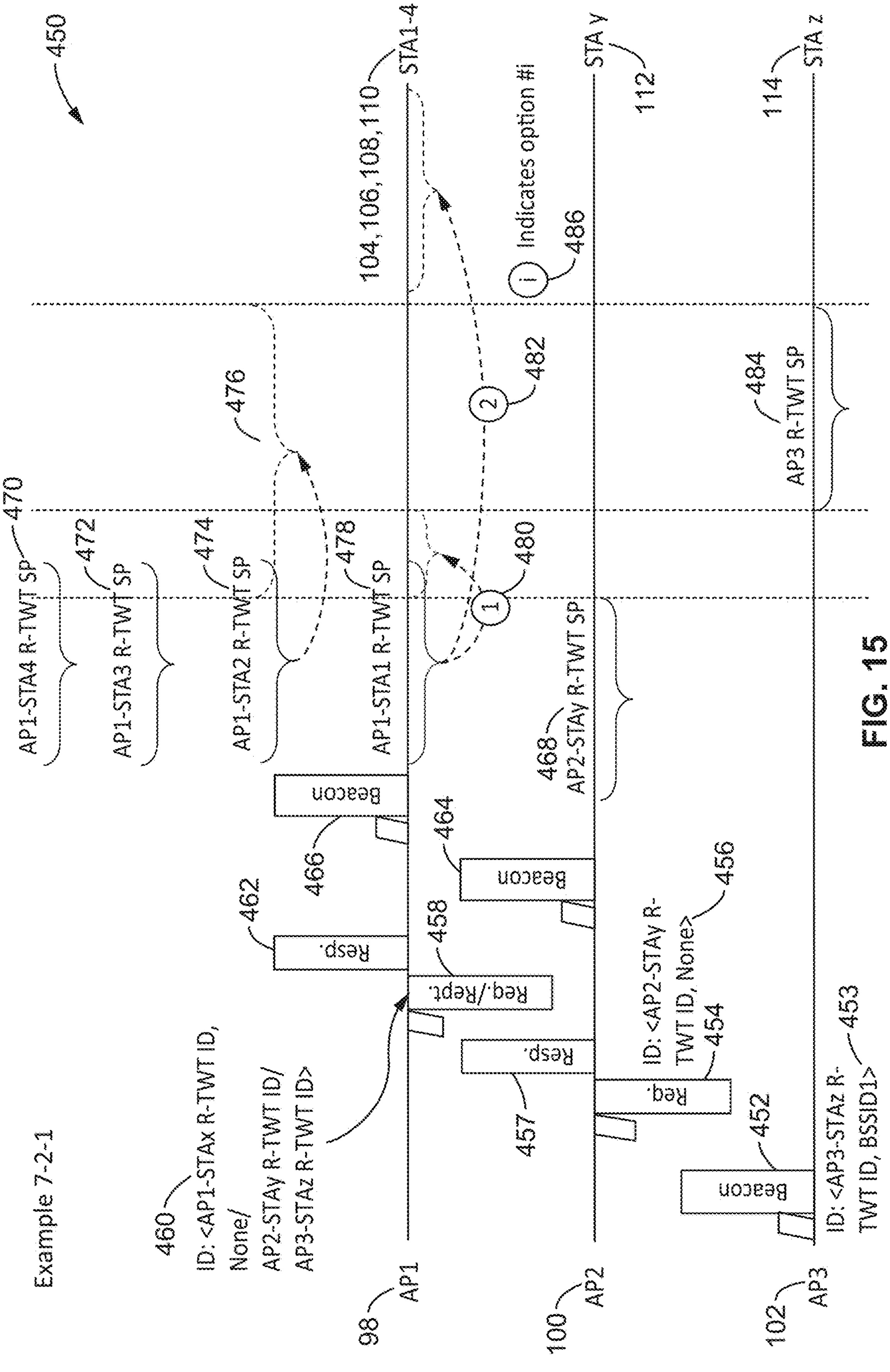
FIG. 15 is a communication diagram as Example 7-2-1 for coordinated R-TWT membership negotiation when APs cannot communicate with one another, and the OBSS stations do not interfere with one another, as performed according to at least one embodiment of the present disclosure.

FIG. 15 illustrates example communications 450 between AP1 98, AP2 100, AP3 102, STAs 1-4 104, 106, 108, 110, STA y 112 and STA z 114. The STAs in BSS1 (AP1 98 and STAs 1-4 104, 106, 108, 110) are the Devices Under Study (DUS).

It is assumed by way of example that STA1, STA2, STA3 and STA4 are R-TWT members of the same R-TWT SP before applying coordinated R-TWT rescheduling. AP1 should reschedule them independently into different R-TWT SPs depending on their corresponding cooperating OBSS R-TWT SPs.

In this example STA y 112 is only capable of hearing from AP2 100, while STA z 114 can only hear from AP3 102.

First, AP3 102 broadcasts a Beacon frame 452 indicating its scheduled (coordinated) R-TWT schedule for its associated STA z 114, which is identified 453 by coordinated R-TWT ID <AP3-STAz R-TWT ID, BSSID1>.

Later, STA y 112 sends a coordinated R-TWT Request frame 454 to its associated AP2, indicating it is negotiating for the coordinated R-TWT membership of a coordinated R-TWT SP, identified 456 by ID <AP2-STAy R-TWT ID, None>. AP2 receives this coordinated R-TWT Request frame and responds with a coordinated R-TWT Response frame 457 to indicate acceptance of the request.

STA x, which is used here to indicate the associated non-AP STA of AP1, and may be any of the stations: STA1, STA2, STA3 or STA4, could detect and parse the Beacon frame or other exchanged coordinated R-TWT negotiation frames from BSS2 or BSS3, and then send coordinated R-TWT request/report frames 458 to its associated AP1 to update the latest R-TWT schedule(s) accordingly from coordinated OBSS(s). AP1 is seen responding 462. Later AP2 and AP1 are seen transmitting beacons 464, 466.

For example, when STAx stands for STA1, it hears from both AP2 and AP3. STA1 should report to AP1 about the latest R-TWT schedule(s) it has parsed and is indicating the negotiated coordinated R-TWT SP with identifier 460 <AP1-STA1 R-TWT ID, AP2-STAy R-TWT ID, AP3-STAz R-TWT ID>. AP1 will understand that it should schedule coordinated R-TWT SP for STA1 and considering AP1-STA1 R-TWT, AP2-STAy R-TWT and AP3-STAz R-TWT. When STAx stands for STA4, it doesn't hear any signals from BSS2 or BSS3. STA4 should request the R-TWT schedule from AP1, and indicate the negotiated coordinated R-TWT SP with ID <AP1-STA4 R-TWT ID, None>. AP1 will understand that it should schedule coordinated R-TWT SP for STA4 and considering only AP1-STA4 R-TWT.

It should be noted that, in this example BSSID can be replaced by other identifiers, such as BSS color. Together with BSSID/BSS color and/or R-TWT ID of the coordinated OBSS, additional information such as the AID or TA, the RSSI and the RCPI of the received OBSS frame can also be exchanged between the CR-TWT scheduling AP and CR-TWT scheduled STA from the intended BSS to identify specific interfering CR-TWT scheduling AP and/or CR-TWT scheduled STA from the coordinated OBSS.

After the coordinated R-TWT negotiation frames exchange, the coordinated R-TWT SPs have been rescheduled and could be broadcasted through Beacon frames. STA1-STA4 as (re)scheduled CR-TWT member STAs should accept the reschedule unless further negotiation is needed. Accordingly, the figure shows scheduled SPs 470, 472, 468 and 484 being performed as originally scheduled. It is also seen in the figure that transmissions 474 is rescheduled to 476, schedule 478 can be rescheduled as 480 or 482.

This is described more particularly as follows. AP1-STA1 R-TWT SP 478 means that STA1 is the member of this R-TWT SP. Since STA1 is in communication range of AP1, AP2 and AP3, AP1 should schedule AP1-STA1 R-TWT SP to avoid conflict/overlap with AP2 R-TWT SP and AP3 R-TWT SP; regardless of where STA y and STA z are located.

The starting point of AP1-STA1 R-TWT SP could be scheduled after the end point of AP2 R-TWT SP (shown 480 as option 1) or the end point of AP3 R-TWT SP (shown 482 as option 2).

The end point of AP1-STA1 R-TWT SP in option 1 should be scheduled before the starting point of AP3 R-TWT SP; the ending point of AP1-STA1 R-TWT SP in option 2 should be scheduled before the starting point of any cooperating OBSS R-TWT SP that STA1 interferes with.

AP1-STA2 R-TWT SP 474 means that STA2 is the member of this R-TWT SP. Since STA2 is in the communication range of AP1 and AP2, AP1 should schedule 476 AP1-STA2 R-TWT SP to avoid conflict/overlap with AP2 R-TWT SP; regardless of where STA y is located. The starting point of AP1-STA2 R-TWT SP could be scheduled after the end point of AP2 R-TWT SP. The ending point of AP1-STA2 R-TWT SP should be scheduled before the starting point of any cooperating OBSS R-TWT SP that STA2 interferes with. The end point of AP1-STA2 R-TWT SP should not surpass the maximum R-TWT SP duration.

AP1-STA3 R-TWT SP 472 means that STA3 is the member of this R-TWT SP. Since STA3 is in the communication range of AP1 and AP3, AP1 should schedule AP1-STA3 R-TWT SP to avoid conflict/overlap with AP3 R-TWT SP; regardless of where STA z is located. Since the original AP1-STA3 R-TWT SP is not overlapping with AP3 R-TWT SP, no further rescheduling is required.

AP1-STA4 R-TWT SP 470 means that STA4 is the member of this R-TWT SP. Since STA4 is not in the communication range of AP2 or AP3, STA4 is not within the communication range of STA y and STA z, there is no need to avoid overlapped R-TWT SP. AP1 could maintain the originally scheduled AP1-STA4 R-TWT SP as shown in this figure.

After rescheduling, AP1 could assign STA3 and STA4 the membership of the same R-TWT SP if their final schedule R-TWT SPs are totally overlapped in time.

Channel accesses based on the rescheduled R-TWT SPs are shown in Example 7-3-1

It should be noted that the option of (re)scheduling of coordinated R-TWT SP schedules can be impacted by traffic priorities, which are to be served in the coordinated R-TWT SPs 7.2.2. Scheduling with APs in Range, and STAs that do not Interfere In this Example 7-2-2 scheduling is shown being performed when the APs are in direct communication range of each other and OBSS STAs do not interfere with each other. The example is based on Topology 2 as was shown in FIG. 5, in which the APs interfere with each other.

Figure 16:
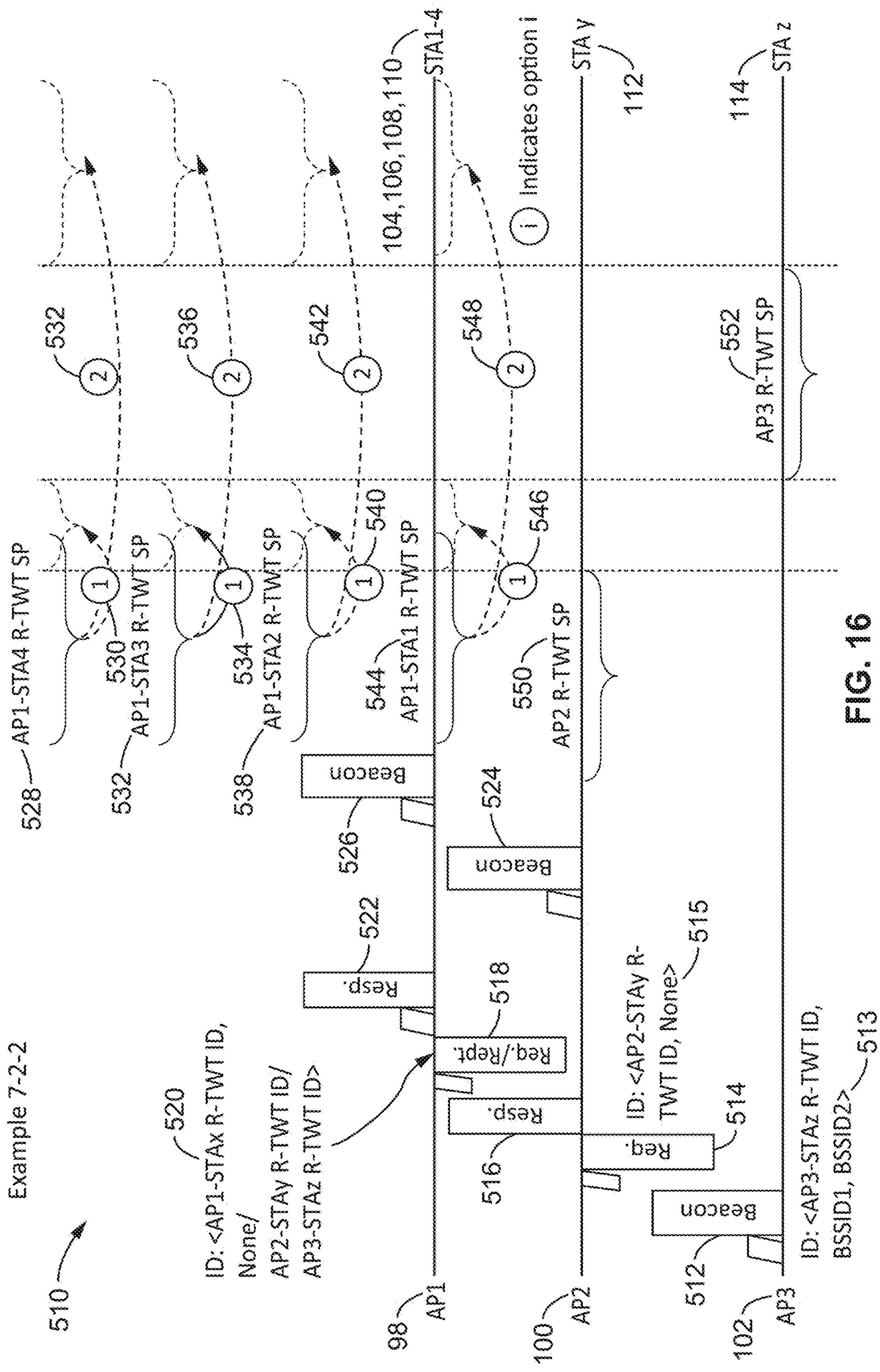
FIG. 16 is a communication diagram as Example 7-2-2 for coordinated R-TWT membership negotiation when APs can communicate with one another, and the OBSS stations do not interfere with one another, as performed according to at least one embodiment of the present disclosure.

FIG. 16 illustrates example communications 510 between AP1 98 and STA1 through STA4 104, 106, 108 and 110, between AP2 100 and STA y 112, and between AP3 102 and STA z 114. In this example STA y 112 only hears from AP2 100, while STA z 114 only hears from AP3 102.

STA1, STA2, STA3 and STA4 can be R-TWT members of same R-TWT SP before applying coordinated R-TWT rescheduling. AP1 should reschedule these transmissions independently into different R-TWT SPs depending on their corresponding cooperating OBSS R-TWT SPs.

First, AP3 broadcast a Beacon frame 512 indicating its scheduled (coordinated) R-TWT schedule for its associated STA z, which is identified 513 by coordinated R-TWT ID <AP3-STAz R-TWT ID, BSSID1, BSSID2>. Later, STA y sends a coordinated R-TWT Request frame 514 to its associated AP2, indicating it is negotiating for the coordinated R-TWT membership of a coordinated R-TWT SP, identified 515 by ID <AP2-STAy R-TWT ID, None>. AP2 receives this coordinated R-TWT Request frame and responds with a coordinated R-TWT Response frame 516 to indicate acceptance of the request.

STAx, which indicates the associated non-AP STA of AP1 and could be any one of STA1, STA2, STA3 or STA4, that could detect and parse the Beacon frame or other exchanged coordinated R-TWT negotiation frames from BSS2 or BSS3, and then send coordinated R-TWT request/report frames 518 to its associated AP1 to update the latest R-TWT schedule(s) accordingly from coordinated OBSS(s).

For example, when STAx stands for STA2, it hears from AP2. STA2 should report AP1 the latest R-TWT schedule(s) it parsed with indicating the negotiated coordinated R-TWT SP with identification 520 <AP1-STA2 R-TWT ID, AP2-STAy R-TWT ID>. AP1 will understand that it should schedule coordinated R-TWT SP for STA2 in consideration of AP1-STA2 R-TWT and AP2-STAy R-TWT. When STAx stands for STA3, it hears from AP3. STA2 should report AP1 the latest R-TWT schedule(s) it parsed with indicating the negotiated coordinated R-TWT SP with identification 520 <AP1-STA3 R-TWT ID, AP3-STAz R-TWT ID>. AP1 will understand that it should schedule coordinated R-TWT SP for STA3 with considering AP1-STA3 R-TWT and AP3-STAz R-TWT.

AP1 is shown sending a response 522 to this request. After the coordinated R-TWT negotiation frame exchange, the coordinated R-TWT SPs have been rescheduled and can be broadcast through Beacon frames 524, 526. STA1 through STA4 as (re)scheduled CR-TWT member STAs should accept the reschedule unless further negotiation is required.

It should be noted that, in this example BSSID can be replaced by other identifiers, such as BSS color. Together with BSSID/BSS color and/or R-TWT ID of the coordinated OBSS, additional information such as the AID or TA, the RSSI and the RCPI of the received OBSS frame can also be exchanged between the CR-TWT scheduling AP and CR-TWT scheduled STA from the intended BSS to identify a specific interfering CR-TWT scheduling AP and/or CR-TWT scheduled STA from the coordinated OBSS.

The figure depicts AP2-RWT SP 550, and AP3 R-TWT SP 552 being performed as originally scheduled, while the other transmissions are rescheduled as described below.

AP1-STA1 R-TWT SP 544 means that STA1 is the member of this R-TWT SP. Since both AP1 and STA1 are in communication range of AP2 and AP3, AP1 should schedule AP1-STA1 R-TWT SP to avoid conflict or overlap with AP2 R-TWT SP and AP3 R-TWT SP; regardless of where STA y and STA z are located.

The starting point of AP1-STA1 R-TWT SP could be scheduled immediately, or not immediately, after the end point of AP2 R-TWT SP (shown 546 as option 1) or the end point of AP3 R-TWT SP (shown 548 as option 2).

The end point of AP1-STA1 R-TWT SP in option 1 should be scheduled before the start point of AP3 R-TWT SP; the end point of AP1-STA1 R-TWT SP in option 2 should be scheduled before the starting point of any cooperating OBSS R-TWT SP that AP1 and/or STA1 interferes with.

AP1-STA2 R-TWT SP 538 means that STA2 is the member of this R-TWT SP. Since both AP1 and STA2 is in the communication range of AP2, AP1 should schedule AP1-STA2 R-TWT SP to avoid conflict/overlap with AP2 R-TWT SP. In addition, since AP1 is in the communication range of AP3, AP1 should schedule AP1-STA2 R-TWT SP to avoid conflict/overlap with AP3 R-TWT SP as well. The starting point and the ending point of AP1-STA2 R-TWT SP should be the same as that specified for AP1-STA1 R-TWT SP, and shown as option 1 540 and option 2 542.

AP1-STA3 R-TWT SP 532 means that STA3 is the member of this R-TWT SP. Since STA3 is in the communication range of AP1 and AP3, AP1 should schedule AP1-STA3 R-TWT SP to avoid conflict/overlap with AP3 R-TWT SP. In addition, since AP1 is in the communication range of AP2, AP1 should schedule AP1-STA3 R-TWT SP to avoid conflict/overlap with AP2 R-TWT SP as well. The starting point and the ending point of AP1-STA3 R-TWT SP should be the same as that specified for AP1-STA1 R-TWT SP, and is shown as option 1 534 and option 2 536.

AP1-STA4 R-TWT SP 528 means that STA4 is the member of this R-TWT SP. Since STA4 is only in the communication range of AP1, but AP1 is in the communication range of AP2 and AP3, AP1 should schedule AP1-STA4 R-TWT SP to avoid conflict/overlap with AP2 R-TWT SP and AP3 R-TWT SP. The starting point and the ending point of AP1-STA4 R-TWT SP should be the same as that specified for AP1-STA1 R-TWT SP, and is shown as option 1 530 and option 2 532.

After the reschedule, AP1 could assign STA1, STA2, STA3 and STA4 the membership of the same R-TWT SP since their final schedule R-TWT SPs are totally overlapped in time.

The channel access based on the rescheduled R-TWT SPs are shown in Example 7-3-2.

It should be noted that the (re)scheduling coordinated R-TWT SP schedule option can be impacted by traffic priorities, which is to be served in the coordinated R-TWT SPs.

7.2.3. Scheduling APs not all in Range but STAs not Interfering

Example 7-2-3 shows communications when not all APs can hear from each other and the OBSS STAs don't interfere each other. In this example Topology 3 is utilized which is shown in FIG. 6.

Figure 17:
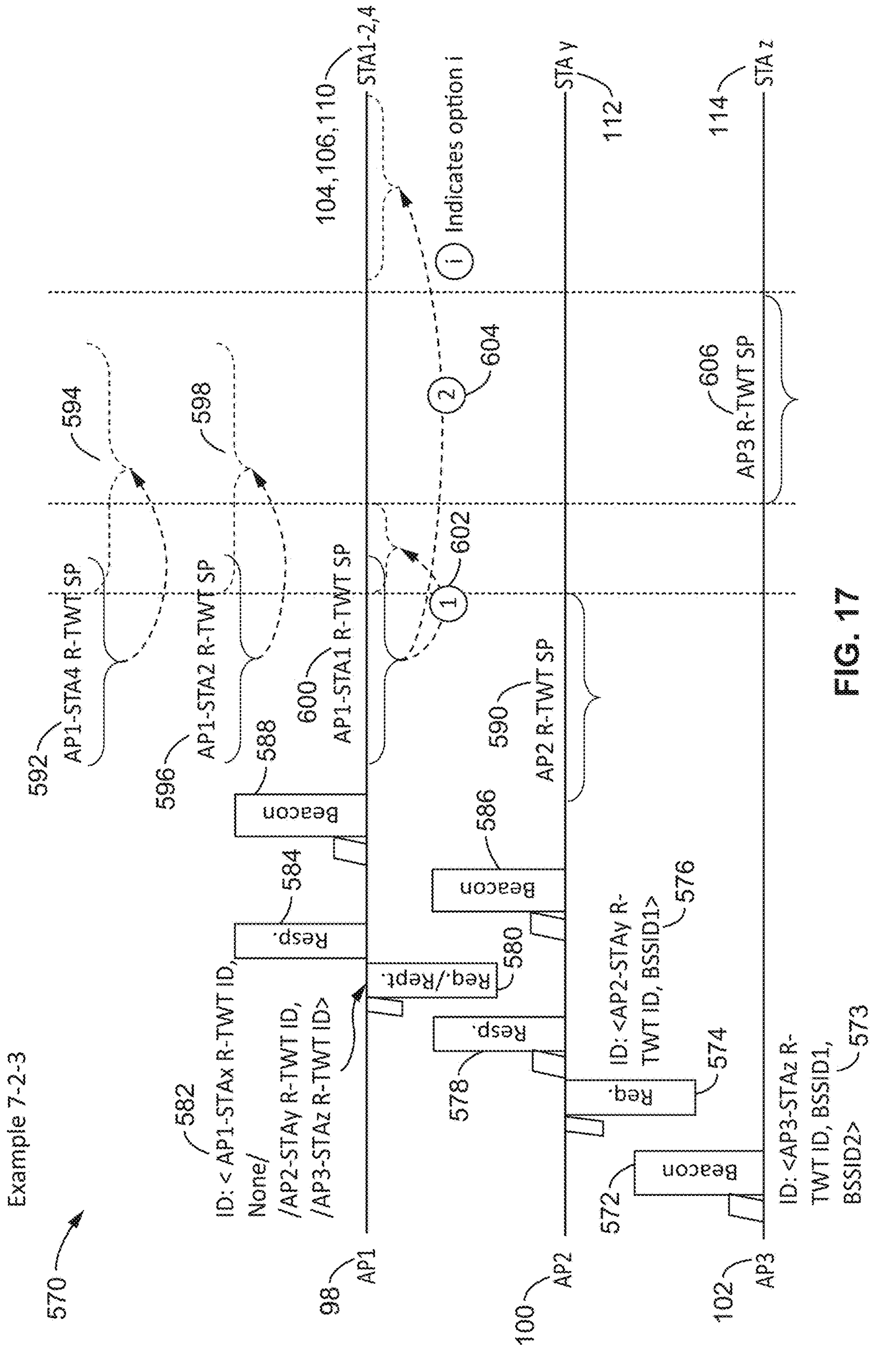
FIG. 17 is a communication diagram as Example 7-2-3 for coordinated R-TWT membership negotiation when APs can communicate with one another, and the OBSS stations do not interfere with one another, as performed according to at least one embodiment of the present disclosure.

FIG. 17 illustrates an example 570 of communications between AP1 98 and STA1 104, STA2 106 and STA4 110, and between AP2 100 and STA y 112, and between AP3 102 and STA z 114. In this example STA y 112 only hears from AP2 100, while STA z 114 only hears from AP3 102.

AP1 and AP2, as well as AP2 and AP3, can hear from each other; while AP1 and AP3 cannot hear from each other.

STA1, STA2 and STA4 could be an R-TWT member of same R-TWT SP before applying coordinated R-TWT rescheduling. AP1 should reschedule them independently into different R-TWT SPs depending on their corresponding cooperating OBSS R-TWT SPs.

First, AP3 broadcasts Beacon frame 572 indicating its scheduled (coordinated) R-TWT schedule for its associated STA z, which is identified 573 by coordinated R-TWT ID <AP3-STAz R-TWT ID, BSSID1, BSSID2>. Later, STA y sends a coordinated R-TWT Request frame 574 to its associated AP2, indicating it is negotiating for the coordinated R-TWT membership of a coordinated R-TWT SP, identified 576 by ID <AP2-STAy R-TWT ID, BSSID1>. AP2 receives this coordinated R-TWT Request frame and responds with a coordinated R-TWT Response frame 578 to indicate acceptance of the request. After which beacon frames 586, 588 are shown being sent by AP2 and AP1.

STAx, which indicates the associated non-AP STA of AP1 and could be STA1 104, STA2 106 or STA4 110 that could detect and parse the Beacon frame or other exchanged coordinated R-TWT negotiation frames from BSS2 or BSS3, and then send coordinated R-TWT request/report frames to its associated AP1 to update the latest R-TWT schedule(s) accordingly from coordinated OBSS(s).

For example, when STAx stands for STA2, it hears from AP2. STA2 should report AP1 the latest R-TWT schedule(s) it parsed with indicating the negotiated coordinated R-TWT SP with identification 582<AP1-STA2 R-TWT ID, AP2-STAy R-TWT ID>. AP1 will understand that it should schedule coordinated R-TWT SP for STA2 with considering AP1-STA2 R-TWT and AP2-STAy R-TWT. When STAx stands for STA1, it hears from both AP2 and AP3. STA1 should report to AP1 the latest R-TWT schedule(s) it parsed with indicating the negotiated coordinated R-TWT SP with identification 582<AP1-STA1 R-TWT ID, AP2-STAy R-TWT ID, AP3-STAz R-TWT ID>.

AP1 will understand that it should schedule coordinated R-TWT SP for STA1 with considering AP1-STA1 R-TWT, AP2-STAy R-TWT and AP3-STAz R-TWT. When STAx stands for STA4, it doesn't hear any signal from BSS2 or BSS3. STA4 should request the R-TWT schedule from AP1, with indicating the negotiated coordinated R-TWT SP with identification 582<AP1-STA4 R-TWT ID, None>.

AP1 will understand that it should schedule coordinated R-TWT SP for STA1 with considering only AP1-STA4 R-TWT. After the coordinated R-TWT negotiation frame exchange, the coordinated R-TWT SPs have been rescheduled and could be broadcasted through Beacon frames. STA1 through STA4 as (re)scheduled CR-TWT member STAs should accept the reschedule unless further negotiation is necessary.

It should be noted that, in this example BSSID can be replaced by other identifiers, such as BSS color. Together with BSSID/BSS color and/or R-TWT ID of the coordinated OBSS, additional information such as the AID or TA, the RSSI and the RCPI of the received OBSS frame can also be exchanged between the CR-TWT scheduling AP and CR-TWT scheduled STA from the intended BSS to identify specific interfering CR-TWT scheduling AP and/or CR-TWT scheduled STA from the coordinated OBSS.

AP1-STA1 R-TWT SP 600 means that STA1 is the member of this R-TWT SP. Since STA1 is in the communication range of AP2 and AP3, AP1 is in the communication range of AP2, AP1 should schedule AP1-STA1 R-TWT SP to avoid conflict/overlap with AP2 R-TWT SP and AP3 R-TWT SP. The starting point of AP1-STA1 R-TWT SP could be scheduled after the end point of AP2 R-TWT SP (shown 602 as option 1) or the end point of AP3 R-TWT SP (shown 604 as option 2).

The end point of AP1-STA1 R-TWT SP in option 1 should be scheduled before the starting point of AP3 R-TWT SP; the ending point of AP1-STA1 R-TWT SP in option 2 should be scheduled before the starting point of any cooperating OBSS R-TWT SP that AP1 and/or STA1 interferes with.

AP1-STA2 R-TWT SP 596 means that STA2 is the member of this R-TWT SP. Since both AP1 and STA2 are in the communication range of AP2, AP1 should schedule AP1-STA2 R-TWT SP to avoid conflict/overlap with AP2 R-TWT SP. STA2 may be in the communication range of STAz, which could be identified by receiving a Request frame from STAz indicating the coordinated R-TWT ID as <AP3-STAz R-TWT ID, BSSID1>. In this example, assume STA2 is out of the communication range of STAz. The starting point of AP1-STA2 R-TWT SP could be scheduled 598 after the end point of AP2 R-TWT SP. The ending point of AP1-STA2 R-TWT SP should be scheduled 594 before the starting point of any cooperating OBSS R-TWT SP that STA2 interferes with. The end point of AP1-STA2 R-TWT SP should not surpass the maximum R-TWT SP duration.

AP1-STA4 R-TWT SP 592 means that STA4 is the member of this R-TWT SP. Since STA4 is only in the communication range of AP1, but AP1 is in the communication range of AP2, AP1 should schedule AP1-STA4 R-TWT SP 594 to avoid conflict/overlap with AP2 R-TWT SP. The starting point and the ending point of AP1-STA4 R-TWT SP should be the same as that specified for AP1-STA2 R-TWT SP, and is shown as schedule 594.

After the reschedule, AP1 could assign STA2 and STA4 the membership of the same R-TWT SP since their final schedule R-TWT SPs are totally overlapped in time. It is seen in the figure that AP2 R-TWT SP 590 and AP3 R-TWT SP 606 are transmitted according to their original schedule.

The channel access based on the rescheduled R-TWT SPs are shown in Example 7-3-3.

It should be noted that the (re)scheduling of coordinated R-TWT SP schedule option may be impacted by traffic priorities, which are to be served in the coordinated R-TWT SPs.

7.3.1. Channel Access Based on Example 7-2-1

This case of Example 7-3-1 illustrates channel access based on example 7-2-1 when APs cannot hear from each other and OBSS STAs don't interfere each other.

Figure 18:
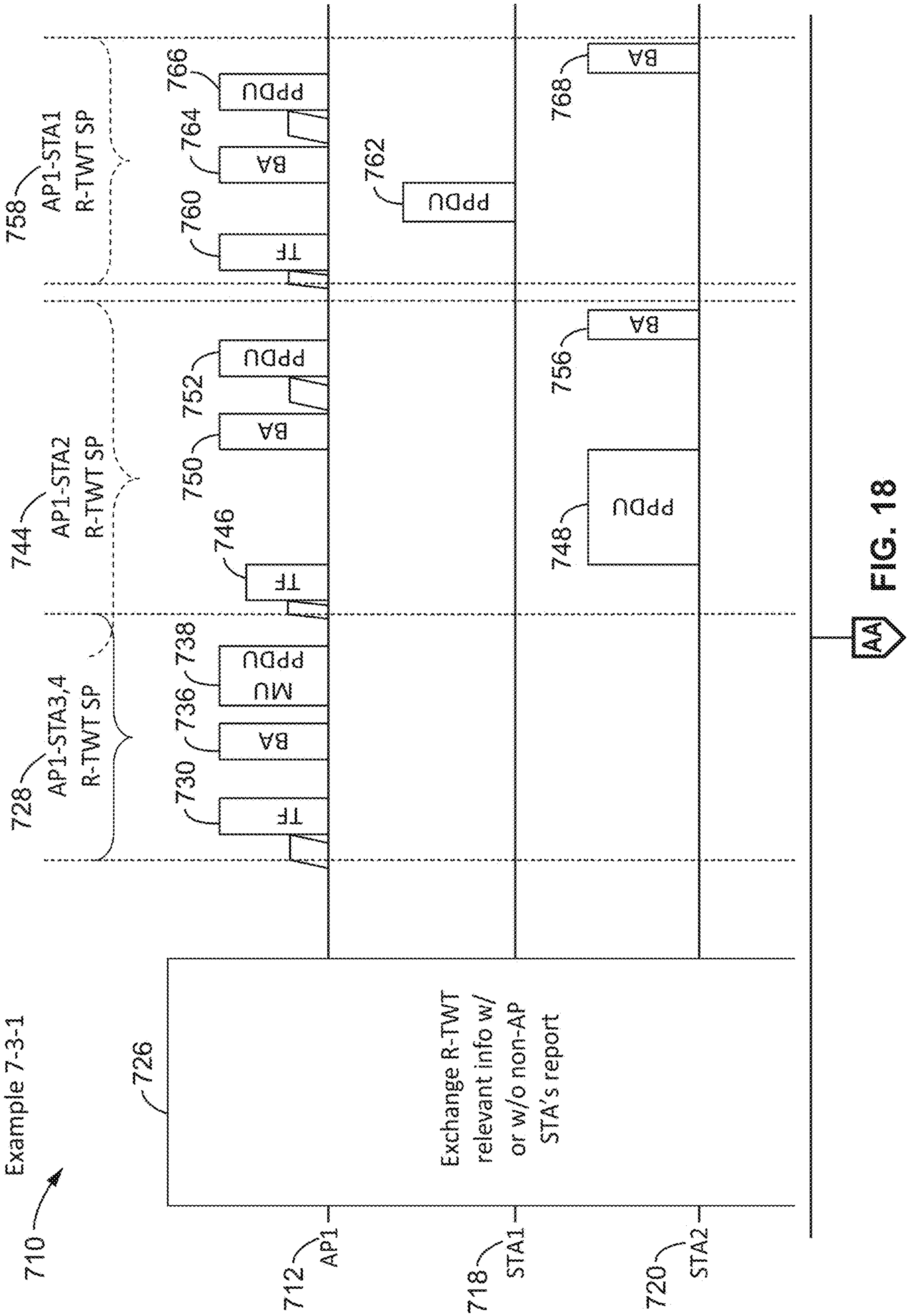
FIG. 18 and FIG. 19 is a communication diagram as Example 7-3-1 for channel access when APs cannot communicate with one another, and the OBSS stations do not interfere with each another, as performed according to at least one embodiment of the present disclosure.
Figure 19:
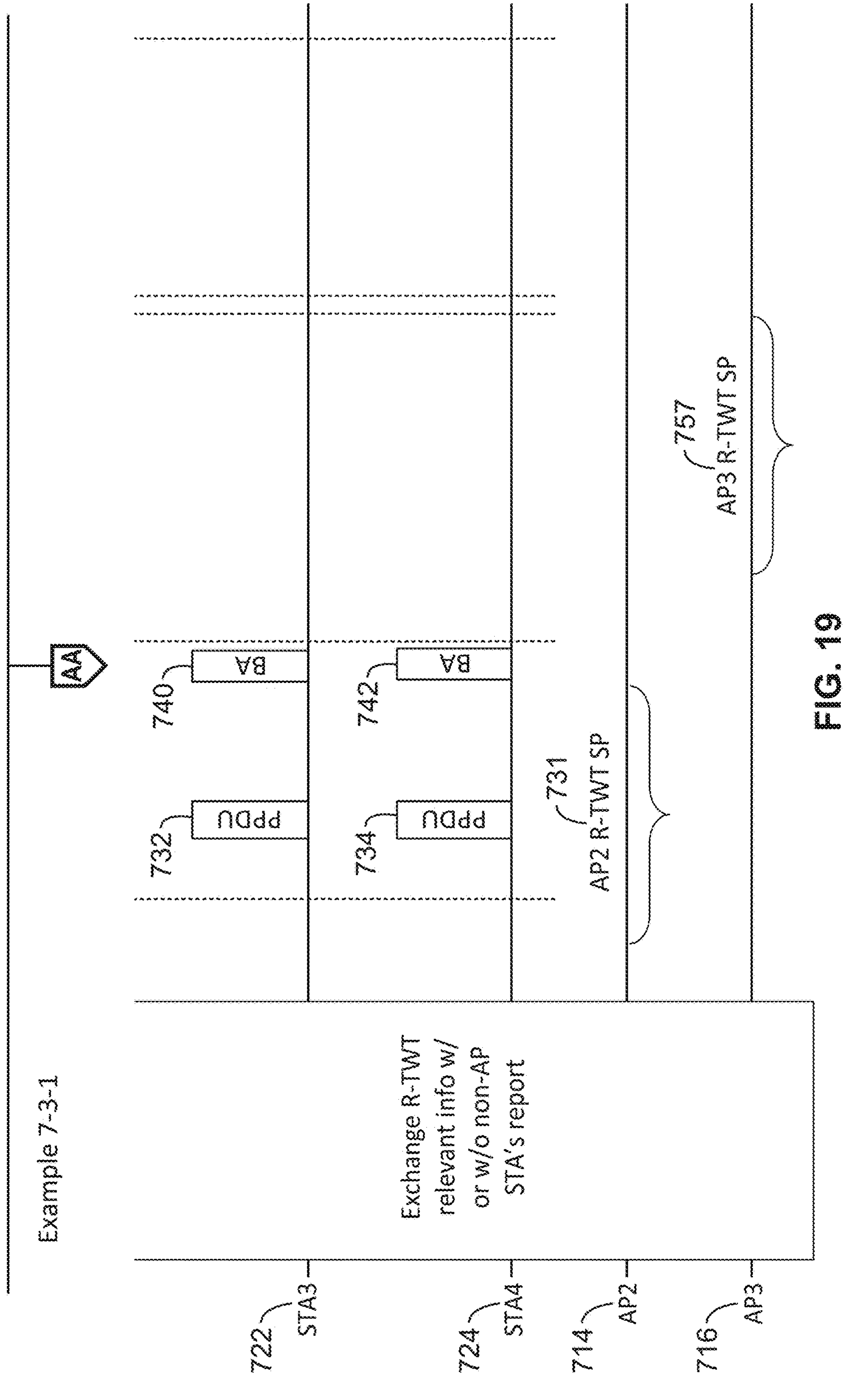

FIG. 18 and FIG. 19 illustrates an example embodiment 710 of channel access for this 7-3-1 example, which are shown in a different arrangement than the prior figures. The figure depicts communications in relation to AP1 712, STA1 718, STA2 720, STA3 722, STA4 724, AP2 714 and AP3 716.

When Trigger enabled coordinated R-TWT is enabled, after exchanging R-TWT relevant information 726, with or without, non-AP STA's report as described in Example 7-2-1, the channel access for BSS1 STAs and AP1 are shown in the figure.

AP1-STA3,4 R-TWT SP 728 means that STA3 and STA4 are the member of this R-TWT SP. At the starting point of AP1-STA3,4 R-TWT SP, AP1 obtains the TXOP and sends a trigger frame (TF) 730 to trigger UL MU-PPDUs 732, 734 from STA3 and STA4. After receiving the UL MU-PPDUs from STA3 and STA4, AP1 responds with a block ack (BA) frame 736 and then can transmit DL MU-PPDUs 738 to STA3 and STA4, and is shown receiving solicited BA frame(s) 740, 742 to indicate the successful reception of the DL MU-PPDUs by STA3 and STA4. AP2 is seen performing AP2 T-TWT SP 731.

AP1-STA2 R-TWT SP 744 means that STA2 is the member of this R-TWT SP. At the starting point of AP1-STA2 R-TWT SP, AP1 obtains the TXOP and sends a trigger frame (TF) 746 to trigger UL PPDUs 748 from STA2. AP3 is shown performing AP3 R-TWT SP 757. After receiving the UL PPDUs from STA2, AP1 responds with a block ack (BA) frame 750 and then can transmit DL PPDUs 752 to STA2, and solicit BA frame(s) 756 to indicate the successful reception of the DL PPDUs.

AP1-STA1 R-TWT SP 758 means that STA1 is the member of this R-TWT SP. At the starting point of AP1-STA1 R-TWT SP, AP1 obtains the TXOP and sends a trigger frame (TF) 760 to trigger UL PPDUs 762 from STA1. After receiving the UL PPDUs from STA1, AP1 responds with a block ack (BA) frame 764 and then can transmit DL PPDUs to STA1, and solicit BA frame(s) 768 to indicate the successful reception of the DL PPDUs.

7.3.2. Channel Access Based on Example 7-2-2

This case of Example 7-3-2 illustrates channel access based on example 7-2-2 when APs are in direct communications range of one another, and the OBSS STAs are not interfering with each other. The example is based on Topology 2 as was shown in FIG. 5.

The communications are shown in relation to AP1 712, STA1 718, STA2 720, STA3 722, STA4 724, AP2 714 and AP3 716.

Figure 20:
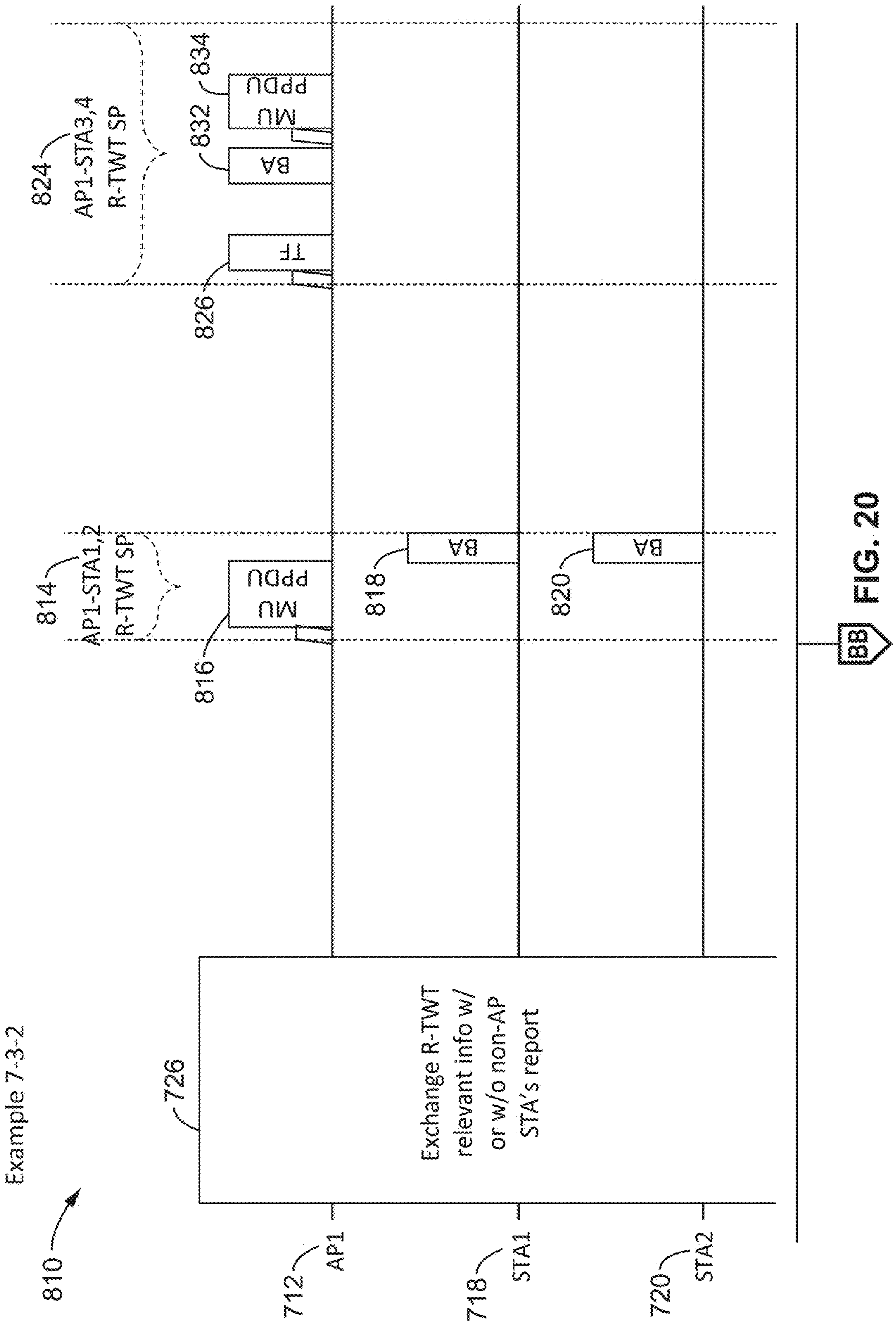
FIG. 20 and FIG. 21 is a communication diagram as Example 7-3-2 for channel access when APs can communicate with one another, and the OBSS stations do not interfere with each another, as performed according to at least one embodiment of the present disclosure.
Figure 21:
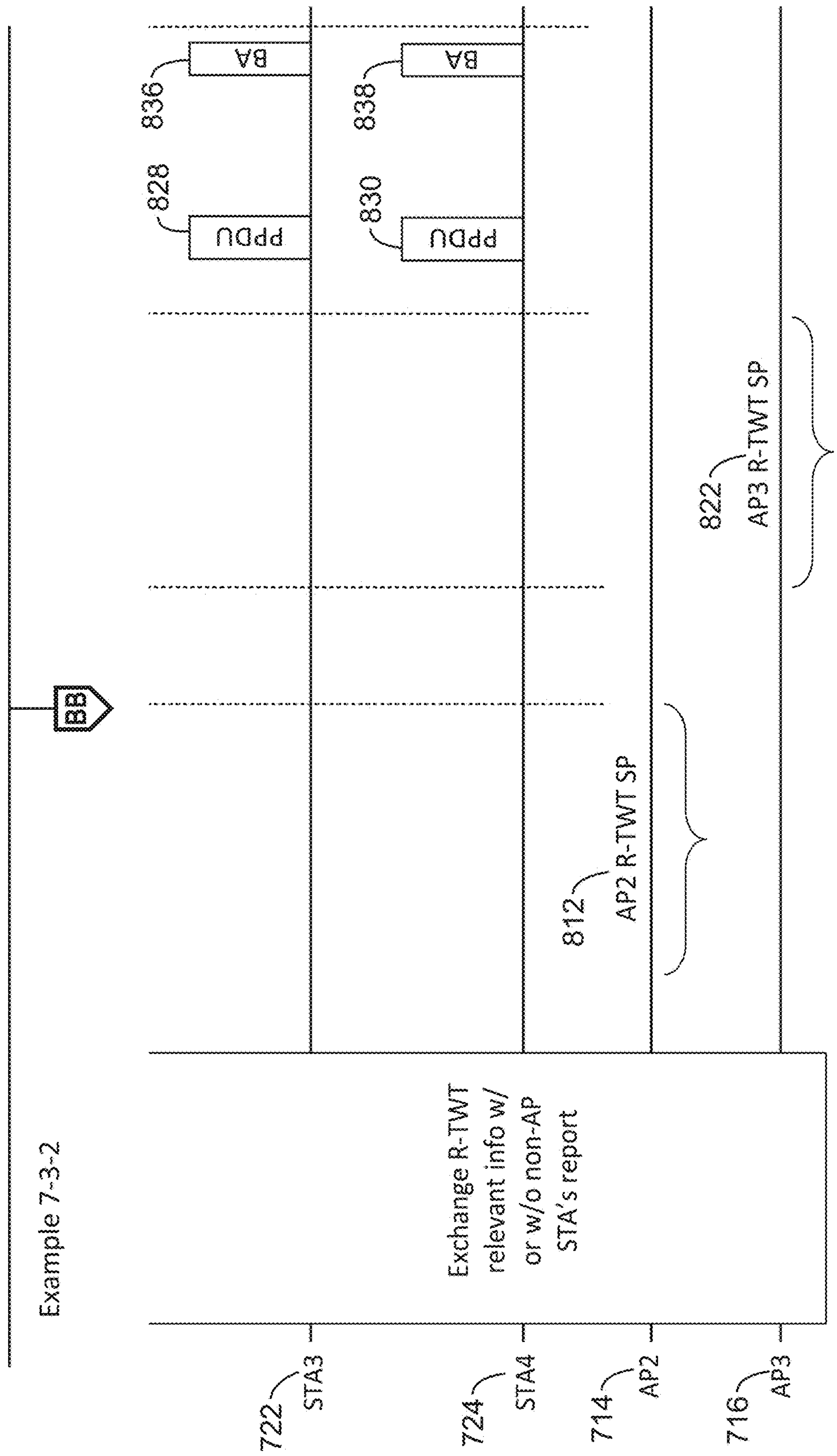

FIG. 20 and FIG. 21 illustrates an example embodiment 810 of channel access for this 7-3-2 example. After the exchange 726 of relevant R-TWT information, with or without non-AP STA reports as described in Example 7-2-2, the channel access for BSS1 STAs and AP1 are shown in the figure.

The figure first shows the occurrence of AP2 R-TWT SP 812.

AP1-STA1,2 R-TWT SP 814 means that STA1 and STA2 are the member of this R-TWT SP. At the starting point of AP1-STA1,2 R-TWT SP, AP1 obtains the TXOP and transmits DL MU-PPDUs 816 to STA1 and STA2, and receives solicited BA frame(s) 818, 820 which are returned to indicate successful reception. AP3 is also shown performing AP3 R-TWT SP 822.

AP1-STA3,4 R-TWT SP 824 means that STA3 and STA4 are the member of this R-TWT SP. At the starting point of AP1-STA3,4 R-TWT SP, AP1 obtains the TXOP and sends a trigger frame (TF) 826 to trigger UL MU-PPDUs 828, 830 from STA3 and STA4. After receiving the UL MU-PPDUs from STA3 and STA4, AP1 responds with a block ack (BA) frame 832 and then can transmit DL MU-PPDUs 834 to STA3 and STA4, and solicited BA frame(s) 836, 838 are returned to indicate the successful reception of the DL MU-PPDUs.

7.3.3. Channel Access Based on Example 7-2-3

This case of Example 7-3-3 illustrates channel access based on example 7-2-3 when not all APs are in direct communications range and the OBSS STAs are not interfering with each other. In this example Topology 3 is utilized which is shown in FIG. 6. The communications are shown in relation to AP1 712, STA1 718, STA2 720, STA3 722, STA4 724, AP2 714 and AP3 716.

Figure 22:
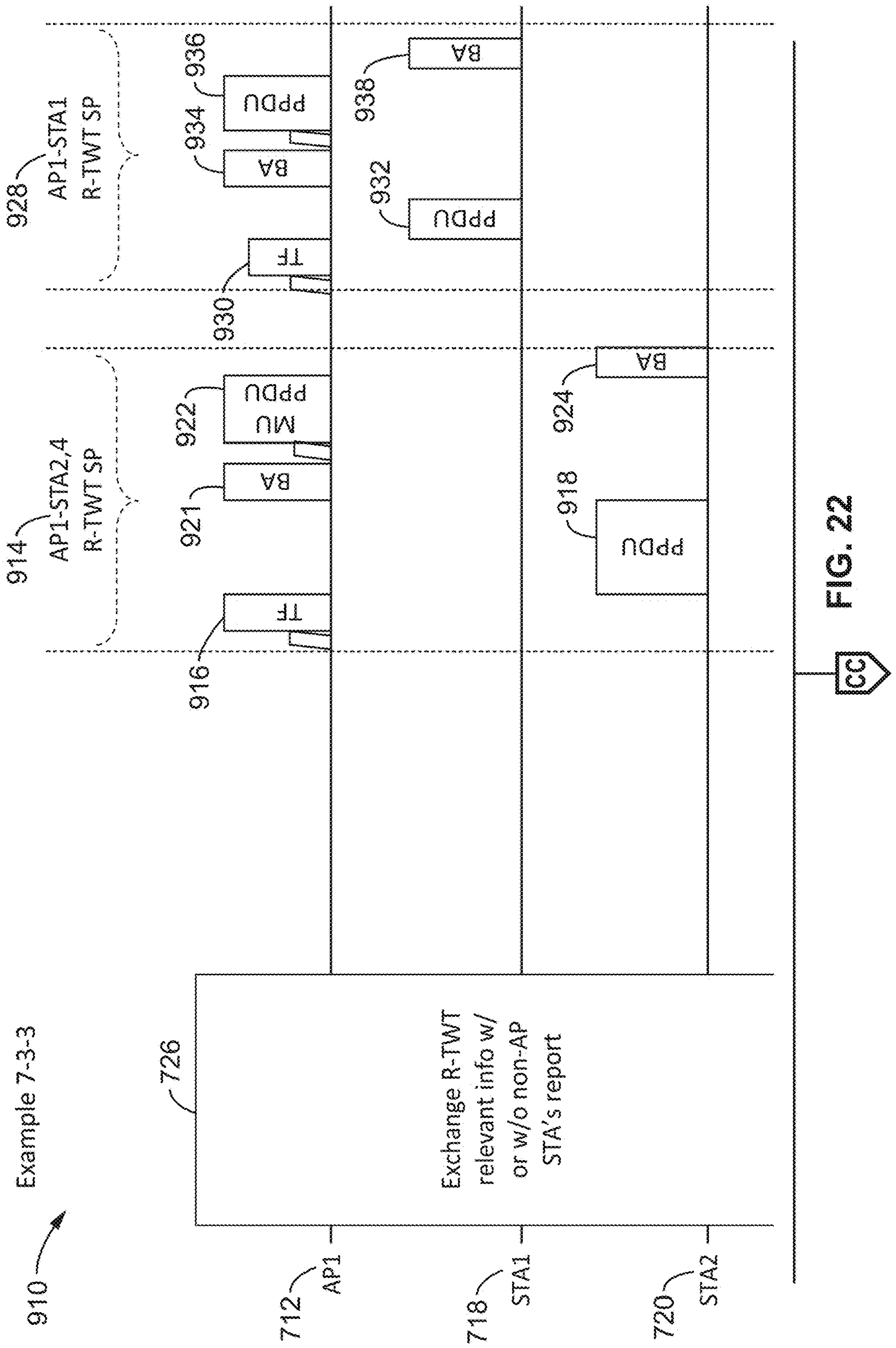
FIG. 22 and FIG. 23 is a communication diagram as Example 7-3-3 for channel access when not all APs can communicate with one another, and the OBSS stations do not interfere with each another, as overcome according to at least one embodiment of the present disclosure.
Figure 23:
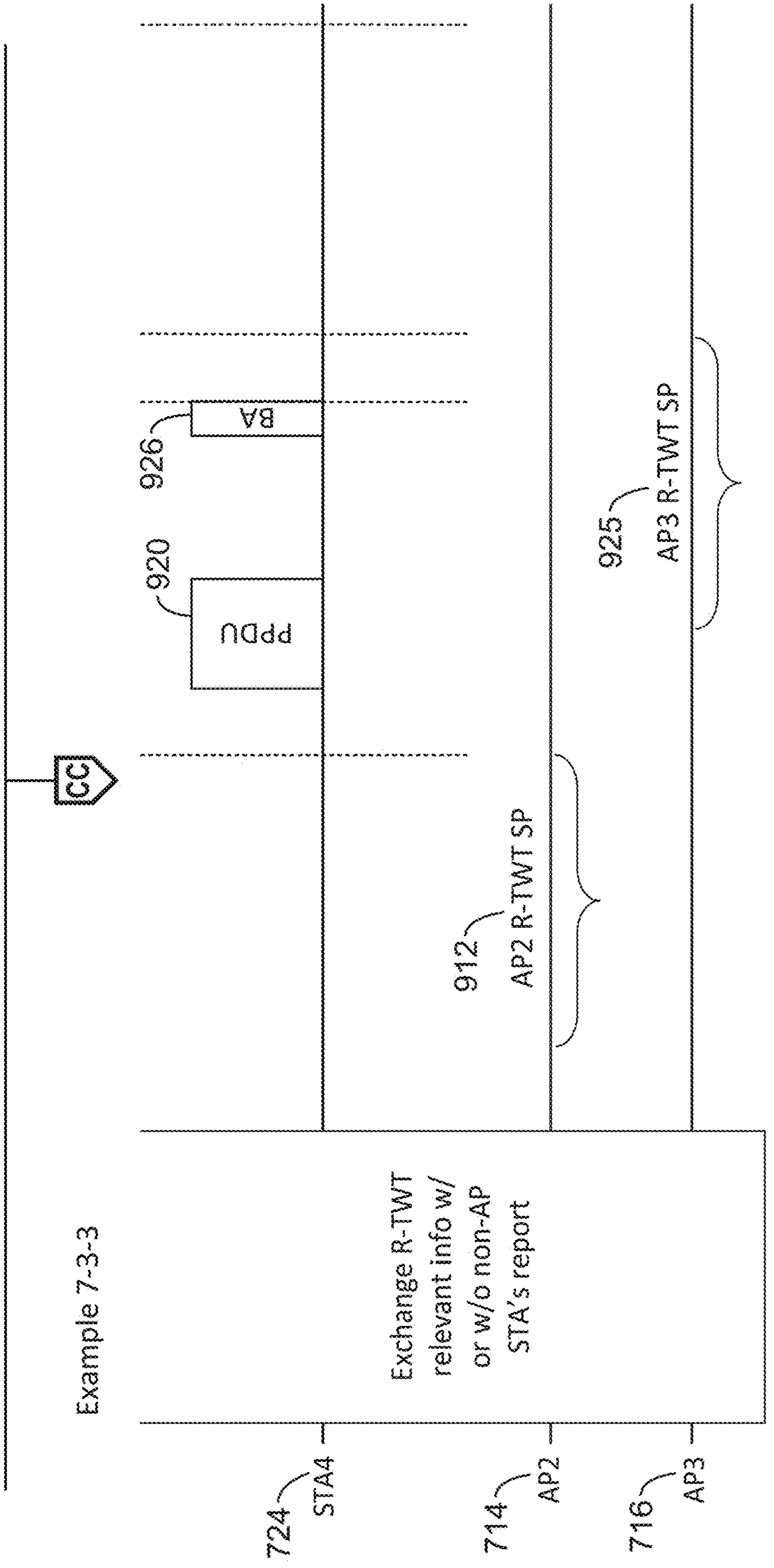

FIG. 22 and FIG. 23 illustrate an example embodiment 910 of channel access for this 7-3-3 example. After the exchange 726 of relevant R-TWT information, with or without non-AP STA reports as described in Example 7-2-3, the channel access for BSS1 STAs and AP1 are shown in the figure.

AP2 R-TWT SP 912 is performed as scheduled. After which AP3 R-TWT SP 925 is performed as scheduled, while at the same time the figure shows AP1-STA2,4 R-TWT SP 914, which means that STA2 and STA4 are the member of this R-TWT SP. At the starting point of AP1-STA2,4 R-TWT SP, AP1 obtains the TXOP and sends a trigger frame (TF) 916 to trigger UL MU-PPDUs from STA2 and STA4. After receiving the UL MU-PPDUs 918, 920 from STA2 and STA4. In response to receipt of these MU-PPDUs, AP1 sends a block ack (BA) frame 921 and then can transmit DL MU-PPDUs 922 to STA2 and STA4, and in this example it solicits BA frame(s) 924, 926 which indicate successful reception of the DL MU-PPDUs.

Then AP1-STA1 R-TWT SP 928 is shown meaning that STA1 is the member of this R-TWT SP. At the starting point of AP1-STA1 R-TWT SP, AP1 obtains the TXOP and sends a trigger frame (TF) 930 to trigger UL PPDUs 932 from STA1. After receiving the UL PPDUs from STA1, AP1 responds with a block ack (BA) frame 934 and then can transmit DL PPDUs 936 to STA1, and solicits BA frame(s) 938 to indicate the successful reception of the DL PPDUs.

7.4.1. Scheduling when APs OOR and OBSS STAs Interfere

This case of Example 7-4-1 illustrates scheduling when APs are not in direct communications range of (e.g., cannot hear from) each other and one or more OBSS STAs could interfere with one other.

Figure 24:
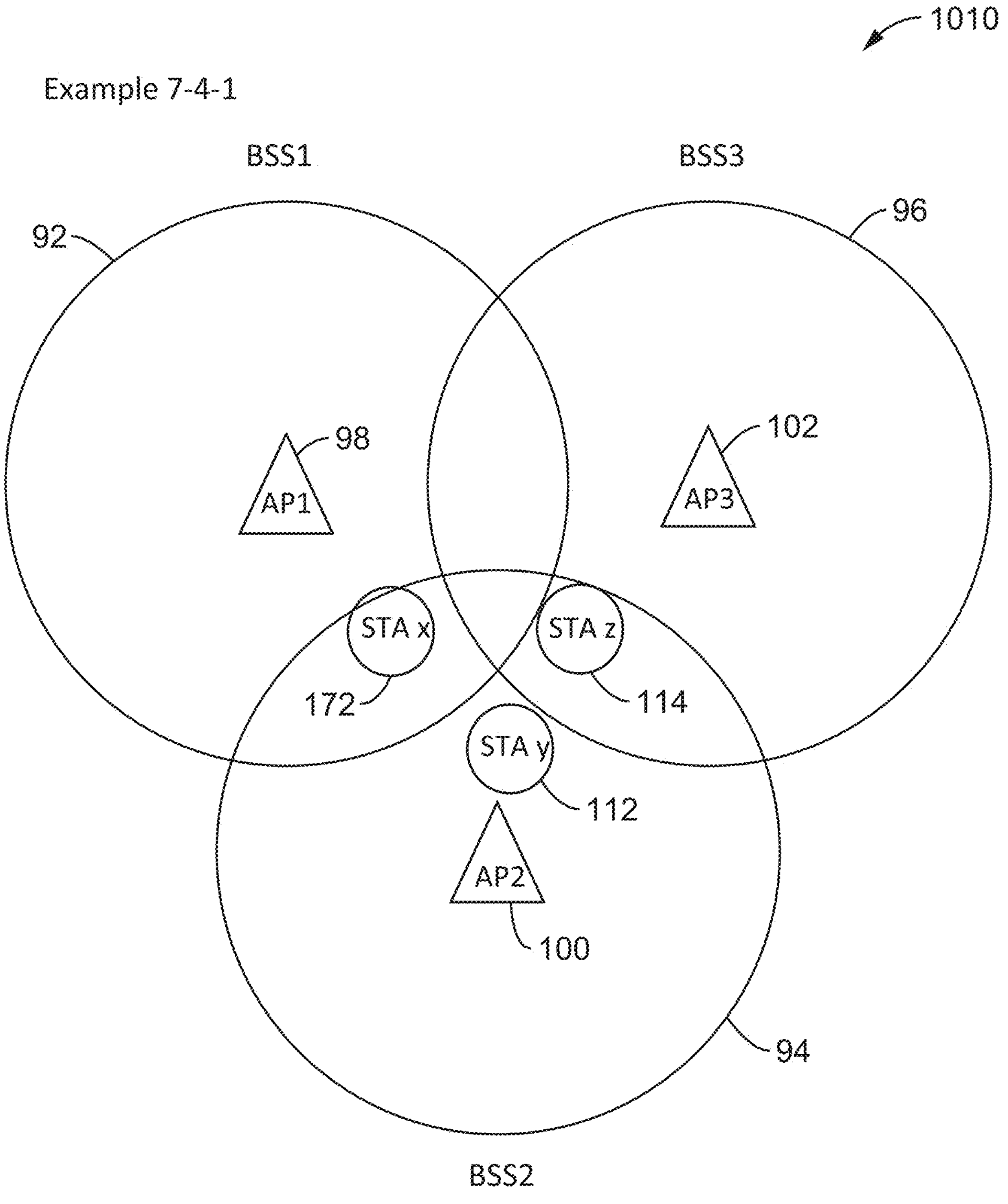
FIG. 24 is a communication topology for Example 7-4-1 for coordinated R-TWT membership negotiation when APs cannot hear from one another and the OBSS stations can interfere with one another.

FIG. 24 illustrates an example topology 1010, which is based on a simplified Topology 1, in which only 3 non-AP STAs are shown in the figure, STA x 172 is associated with AP1 in BSS1 92, STA y 112 is associated with AP2 in BSS2 94, STA z 114 is associated with AP3 in BSS3 96. STA x, STA y and STA z can hear from each other.

Figure 25:
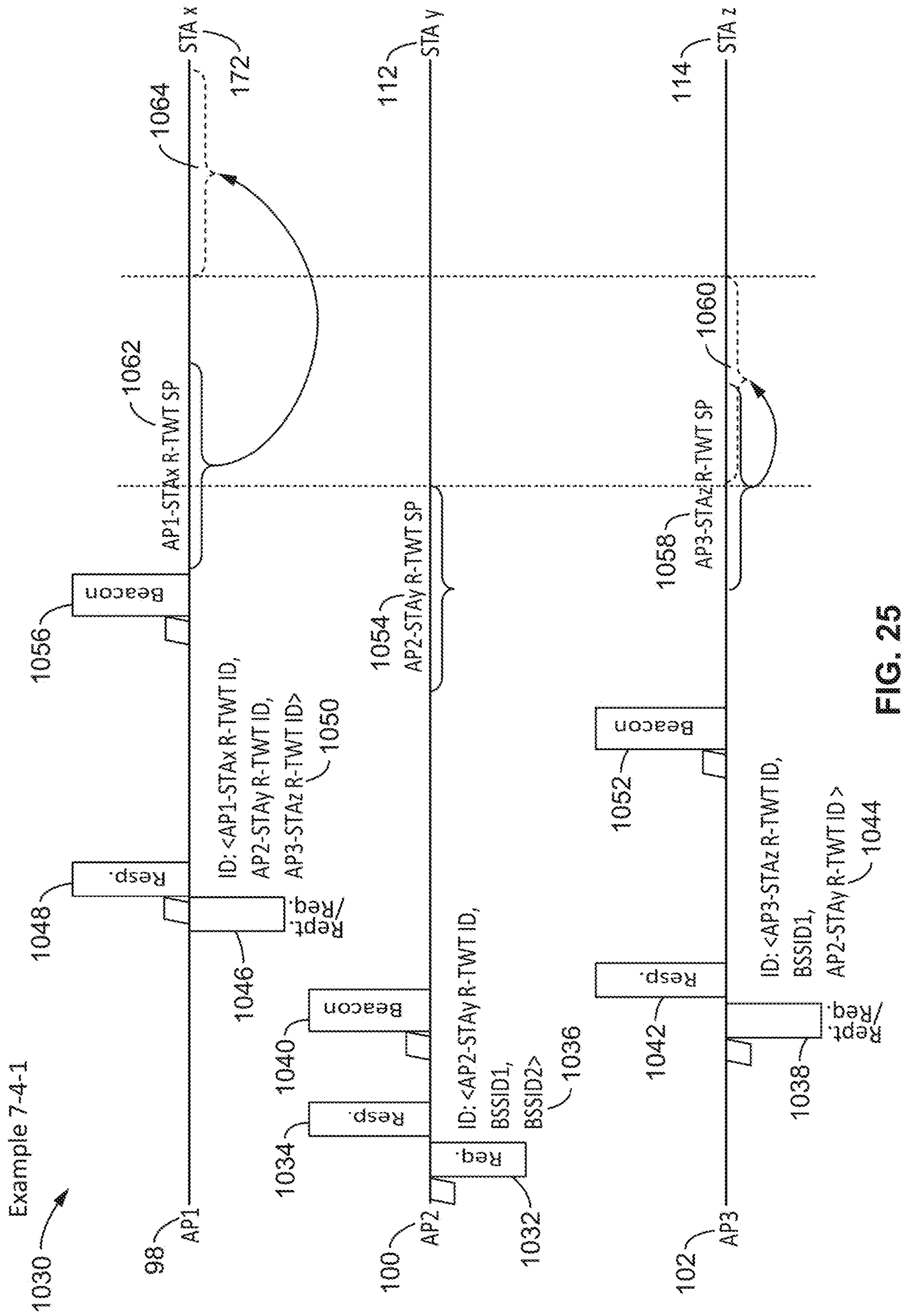
FIG. 25 is a communication diagram as Example 7-4-1 for scheduling when APs cannot communicate with one another, and the OBSS stations can interfere with each another, as overcome according to at least one embodiment of the present disclosure.

FIG. 25 illustrates an example embodiment 1030 of scheduling being performed for this case. STA y first negotiates coordinated R-TWT with AP2 by sending a coordinated R-TWT request frame 1032, which indicates it is negotiating to be a member of coordinated R-TWT SP identified 1036 by ID <AP2-STAy R-TWT ID, BSSID1, BSSID2>. AP2 receives the coordinated R-TWT request frame and responds with a coordinated R-TWT response frame 1034 to indicate it accepts the request. AP2 will schedule the coordinated R-TWT SP for STA y which includes considering AP2-STAy R-TWT.

STA z detected the coordinated R-TWT negotiation frame exchanges between AP2 and STA y and parses the latest AP2-STAy R-TWT schedule, STA z then reports the parsed information to AP3 by sending a coordinated R-TWT request/report frame 1038, which indicates it is negotiating to be a member of coordinated R-TWT SP identified 1044 by ID <AP3-STAz R-TWT ID, BSSID1, AP2-STAy R-TWT ID>. AP3 receives the coordinated R-TWT request frame 1038 and responds with a coordinated R-TWT response frame 1042 to indicate it accepts the request. AP3 will schedule the coordinated R-TWT SP for STA z with considering AP3-STAz R-TWT and AP2-STAy R-TWT. Thus, AP3-STAz R-TWT SP has been rescheduled to avoid overlapping with AP2-STAy R-TWT SP.

STA x detected the coordinated R-TWT negotiation frame exchanges between AP2 and STA y and frame exchanges between AP3 and STA z and parses the latest AP2-STAy R-TWT schedule and the latest AP3-STAz R-TWT schedule, STA x then reports the parsed information to AP1 by sending a coordinated R-TWT request/report frame 1046, which indicates it is negotiating to be a member of coordinated R-TWT SP identified 1050 by ID <AP1-STAx R-TWT ID, AP2-STAy R-TWT ID, AP3-STAz R-TWT ID>. AP1 receives the coordinated R-TWT request frame and responds with a coordinated R-TWT response frame 1048 to indicate it accepts the request. AP1 will schedule the coordinated R-TWT SP for STA x with considering AP1-STAx R-TWT, AP2-STAy R-TWT, AP3-STAz R-TWT. Thus, AP1-STAx R-TWT SP 1062 has been rescheduled to 1064 to avoid overlapping with AP2-STAy R-TWT SP 1054 and AP3-STAz R-TWT SP 1058. AP3 and AP1 are shown transmitting beacons 1052 and 1056, respectively. The figure depicts the actual SPs as AP2 STAy R-TWT SP 1054, then scheduled AP3-STAz R-TWT SP 1058 in its rescheduled position 1060, and scheduled AP1-STAx R-TWT SP 1062 rescheduled to 1064.

7.4.2. Scheduling when APs in Range and OBSS STAs Interfere

This case of Example 7-4-2 illustrates scheduling when APs are in direct communications range of (e.g., can hear from) each other and one or more OBSS STAs could interfere with one other.

Figure 26:
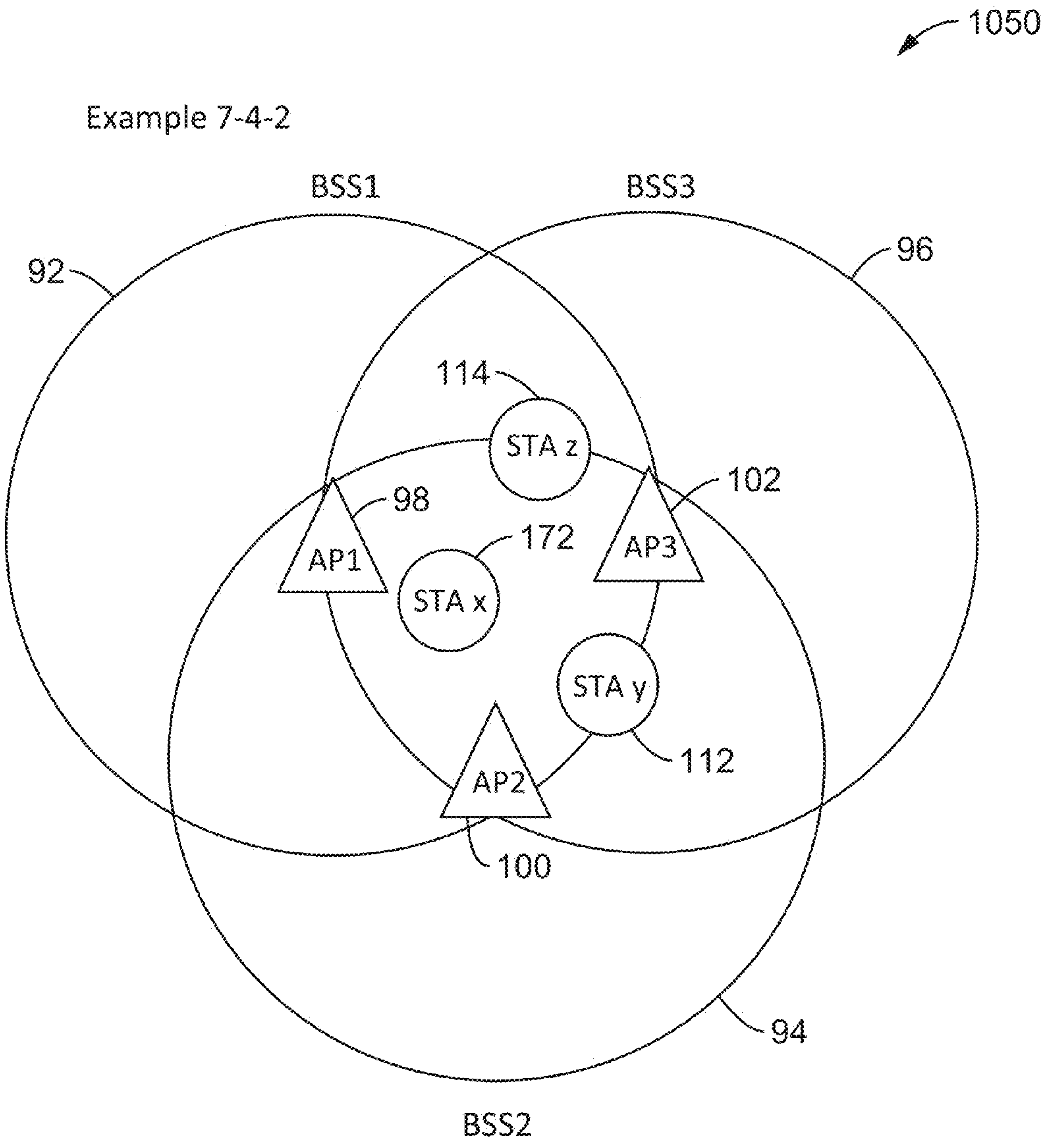
FIG. 26 is a communication topology for Example 7-4-2 for coordinated R-TWT membership negotiation when APs can hear from one another and the OBSS stations may interfere with one another.

FIG. 26 illustrates an example topology 1050 for this 7-4-2 case. This example is based on a simplified Topology 2 as seen in FIG. 5, in which only three non-AP STAs are shown in the figure, STA x is associated with AP1, STA y is associated with AP2, STA z is associated with AP3. STA x, STA y and STA z can hear from each other as they are all in the overlapped area between BSS1 92, BSS2 94 and BSS3 96.

Figure 27:
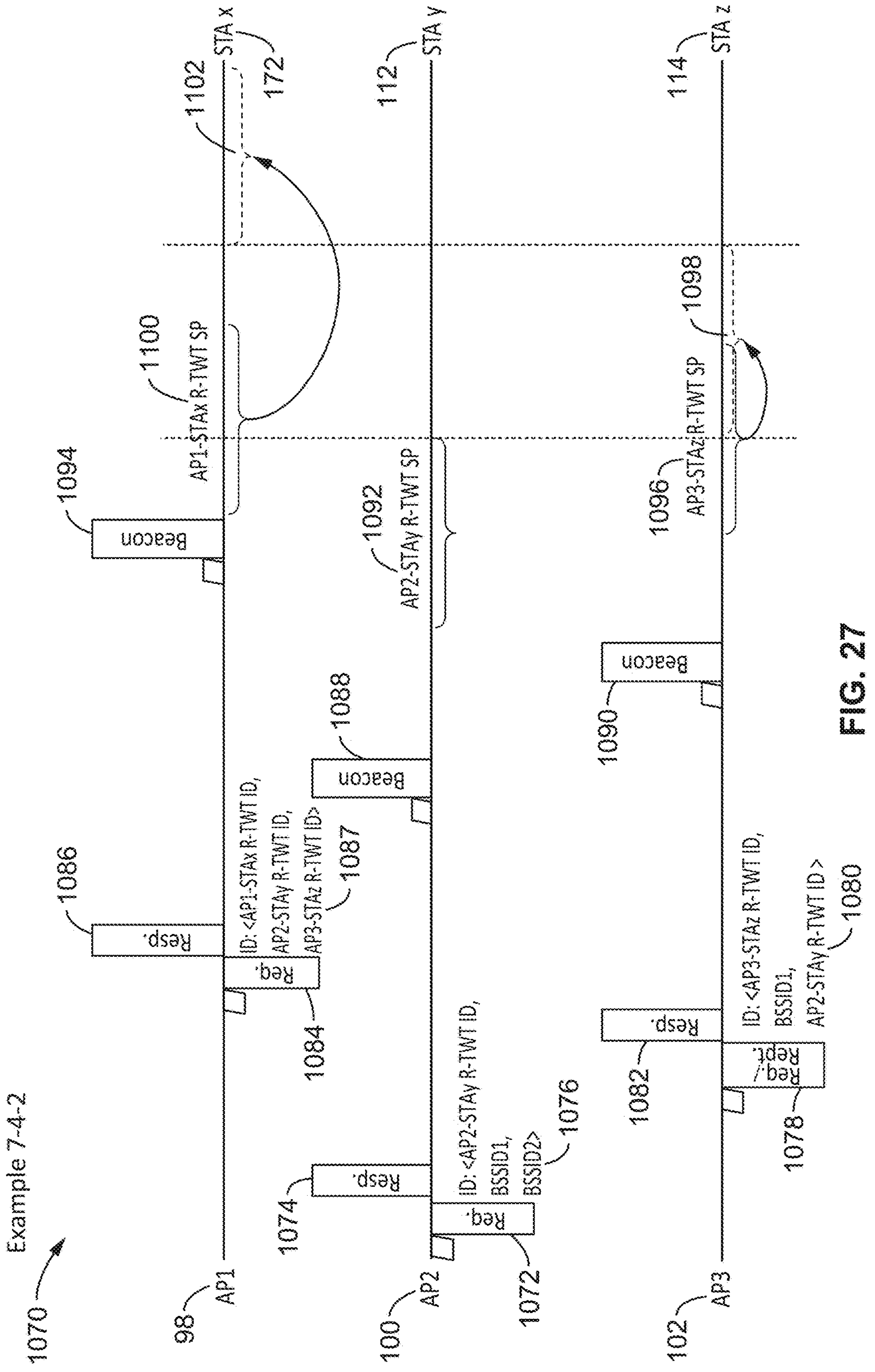
FIG. 27 is a communication diagram as Example 7-4-2 for scheduling when APs can communicate with one another, and OBSS stations can interfere with one another, as overcome according to at least one embodiment of the present disclosure.

FIG. 27 illustrates an example embodiment 1070 of scheduling being performed for this case. STA y first negotiates coordinated R-TWT with AP2 by sending a coordinated R-TWT request frame 1072, which indicates it is negotiating to be a member of coordinated R-TWT SP identified 1076 by ID <AP2-STAy R-TWT ID, BSSID1, BSSID2>. AP2 receives the coordinated R-TWT request frame 1076 and responds with a coordinated R-TWT response frame 1074 to indicate it has accepted the request. AP2 then schedules the coordinated R-TWT SP for STA y taking into consideration AP2-STAy R-TWT.

STA z detects the coordinated R-TWT negotiation frame exchanges between AP2 and STA y and parses the latest AP2-STAy R-TWT schedule, STA z then reports the parsed information to AP3 by sending a coordinated R-TWT request/report frame 1078, which indicates it is negotiating to be a member of coordinated R-TWT SP identified by ID <AP3-STAz R-TWT ID, BSSID1, AP2-STAy R-TWT ID>. AP3 receives the coordinated R-TWT request frame and responds by sending a coordinated R-TWT response frame 1082 to indicate it has accepted the request. AP3 then schedules the coordinated R-TWT SP for STA z taking into consideration AP3-STAz R-TWT and AP2-STAy R-TWT. Thus, originally scheduled 1096 AP3-STAz R-TWT SP has been rescheduled 1098 to avoid overlapping with AP2-STAy R-TWT SP.

STA x detects the coordinated R-TWT negotiation frame exchanges between AP2 and STA y and frame exchanges between AP3 and STA z and parses the latest AP2-STAy R-TWT schedule and the latest AP3-STAz R-TWT schedule, STA x then reports the parsed information to AP1 by sending a coordinated R-TWT request/report frame 1084, which indicates it is negotiating to be a member of coordinated R-TWT SP identified 1087 by ID <AP1-STAx R-TWT ID, AP2-STAy R-TWT ID, AP3-STAz R-TWT ID>. AP1 receives the coordinated R-TWT request frame and responds by sending a coordinated R-TWT response frame 1086 to indicate it accepts the request.

Beacons 1088, 1090 and 1094 are shown being sent by the different APs, and AP2-STAy R-TWT SP is utilized as originally scheduled.

AP2-STA y R-TWT SP 1092 occurs as scheduled. Originally, scheduled AP3-STAz R-TWT SP 1096 was rescheduled to 1098. AP1 has scheduled the coordinated R-TWT SP for STA x and taken into consideration AP1-STAx R-TWT, AP2-STAy R-TWT, AP3-STAz R-TWT. Thus, originally scheduled 1100 AP1-STAx R-TWT SP has been rescheduled 1102 to avoid overlapping with AP2-STAy R-TWT SP and AP3-STAz R-TWT SP.

7.4.3. Scheduling Some APs in Range and OBSS STAs Interfere

This case of Example 7-4-3 illustrates scheduling when a portion of the APs are in direct communications range of (e.g., can hear from) each other and one or more OBSS STAs can interfere with one other.

Figure 28:
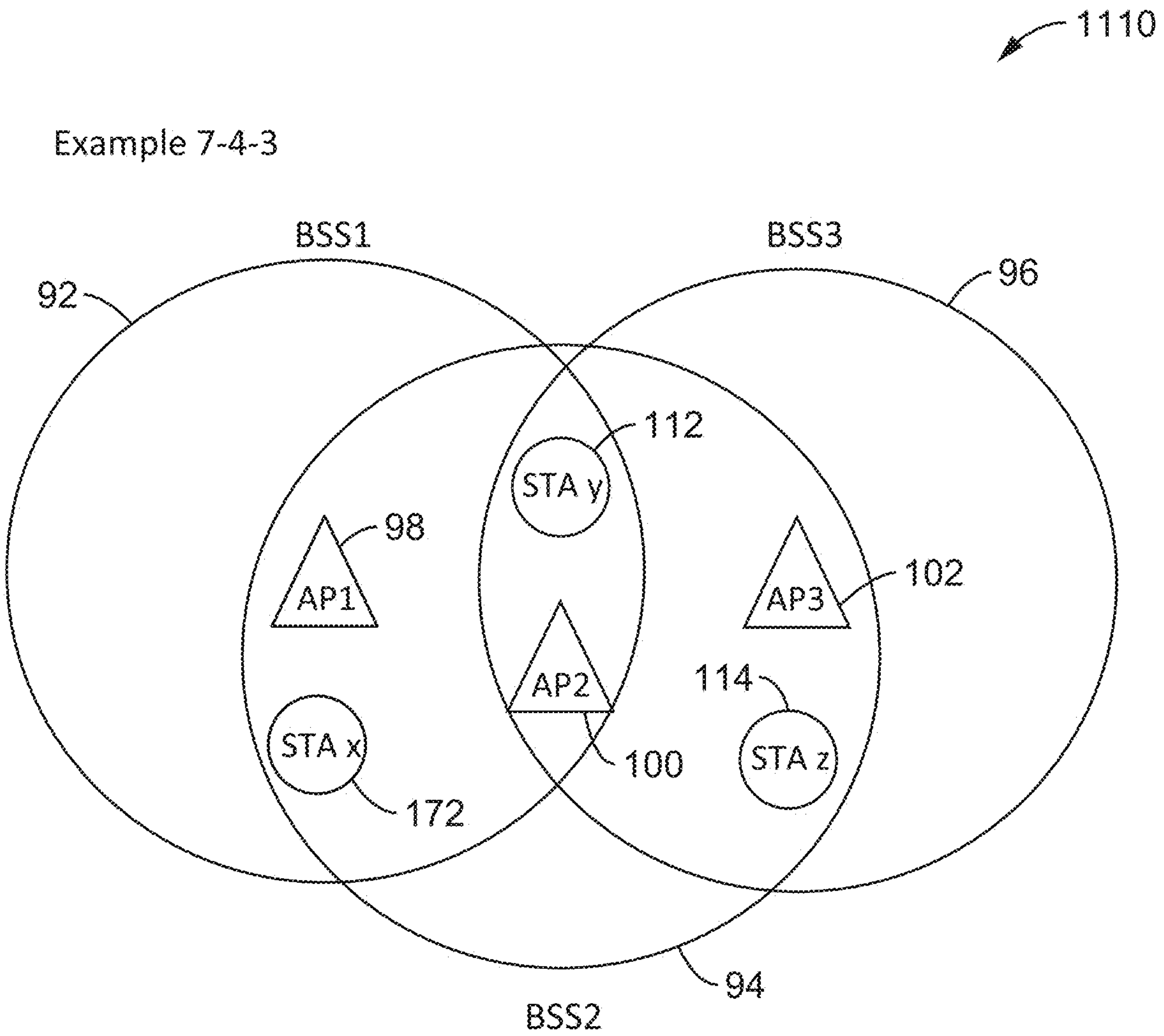
FIG. 28 is a communication topology for Example 7-4-3 for scheduling when some APs can communicate with each other, but OBSS stations may interfere with one another.

FIG. 28 illustrates an example topology for this 7-4-3 case. This example is based on a simplified Topology 3, in which only three non-AP STAs are shown in the figure having BSS1 92, BSS2 94 and BSS3 96. STA x 172 is associated with AP1 98, STA y 112 is associated with AP2 100, STA z 114 is associated with AP3 102. STA x and STA y can hear from each other, STA y and STA z can hear from each other, STA x and STA z cannot hear from each other.

Figure 29:
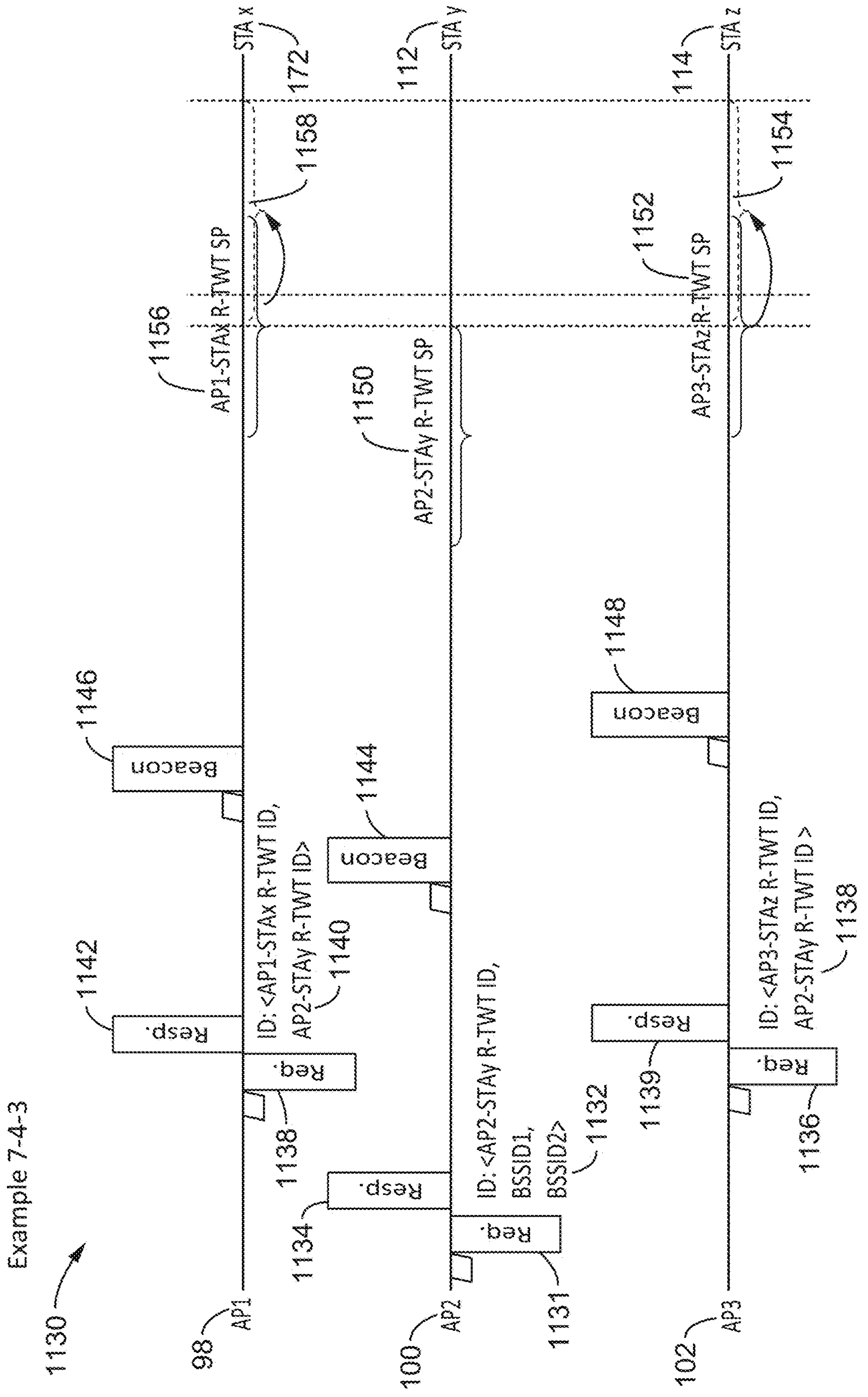
FIG. 29 is a communication diagram as Example 7-4-3 for scheduling when some APs can communicate with one another, but OBSS stations can interfere with one another, as overcome according to at least one embodiment of the present disclosure.

FIG. 29 illustrates an example embodiment 1130 of scheduling being performed for this case. STA y first negotiates a coordinated R-TWT with AP2 by sending a coordinated R-TWT request frame 1131, which indicates it is negotiating to be a member of coordinated R-TWT SP identified 1132 by ID <AP2-STAy R-TWT ID, BSSID1, BSSID2>. AP2 receives the coordinated R-TWT request frame and responds with a coordinated R-TWT response frame 1134 to indicate it has accepted the request. AP2 will schedule the coordinated R-TWT SP for STA y taking into consideration AP2-STAy R-TWT.

STA z detected the coordinated R-TWT negotiation frame exchanges between AP2 and STA y and parses the latest AP2-STAy R-TWT schedule, STA z then reports the parsed information to AP3 by sending a coordinated R-TWT request/report frame 1136, which indicates it is negotiating to be a member of coordinated R-TWT SP identified 1138 by ID <AP3-STAz R-TWT ID, AP2-STAy R-TWT ID>. AP3 receives the coordinated R-TWT request frame and responds by sending a coordinated R-TWT response frame 1139 to indicate it has accepted the request. AP3 will schedule the coordinated R-TWT SP for STA z and take into consideration AP3-STAz R-TWT and AP2-STAy R-TWT.

At the same time, STA x detected the coordinated R-TWT negotiation frame exchanges between AP2 and STA y and parses the latest AP2-STAy R-TWT schedule, STA x then reports the parsed information to AP1 by sending a coordinated R-TWT request/report frame 1138, which indicates it is negotiating to be a member of coordinated R-TWT SP identified 1140 by ID <AP1-STAx R-TWT ID, AP2-STAy R-TWT ID>. AP1 receives the coordinated R-TWT request frame and responds with a coordinated R-TWT response frame 1142 to indicate it accept the request. AP1 will schedule the coordinated R-TWT SP for STA x taking into consideration AP1-STAx R-TWT and AP2-STAy R-TWT.

After this Beacons 1144, 1146 and 1148 are seen being sent by AP2, AP1 and AP3, respectively. AP2-STAy R-TWT SP 1150 is performed according to its original scheduling.

Originally scheduled 1156 AP1-STAx R-TWT SP has been rescheduled 1158. Originally scheduled 1152 AP3-STAz R-TWT SP has also been rescheduled 1154 to avoid overlapping with AP2-STAy R-TWT SP. It should be noted that there is no issue with updated AP1-STAx R-TWT SP and AP3-STAz R-TWT SP overlapping in time, since AP1 and STA x are not interfering with AP3 and STAz.

8. Frame Formats

8.1. Coordinated R-TWT Support Subfield

Figure 30:
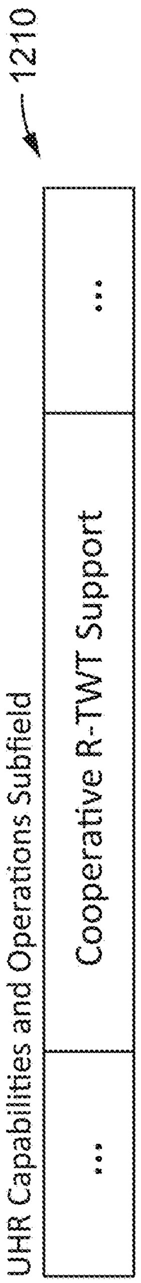
FIG. 30 is a data field diagram of a UHR capabilities and operations with relevant subfields according to at least one embodiment of the present disclosure.

FIG. 30 illustrates an example embodiment 1210 of a Coordinated R-TWT Support subfield within the UHR Capabilities and Operations subfield. The Coordinated R-TWT Support subfield is configured to be included in UHR capabilities and operations relevant subfield to indicate the support of coordinated R-TWT. The UHR capabilities and operations relevant subfield can be carried in a Beacon, or in other management frames.

The STA which sends the frame supports coordinated R-TWT scheduling with coordinated OBSS(s) if the Coordinated R-TWT Support subfield is set to a first state (e.g., '1').

The STAs which support coordinated R-TWT receives the frame from OBSS and parses the Coordinated R-TWT Support subfield. If this field is equal to a first state (e.g., '1'), then the STA should continue parsing information including, but not limited to the BSSID, the R-TWT schedule, the quiet schedule, the TSF offset, the primary channel, the bandwidth information, the BSS color, the AID or TA, the RSSI and/or the RCPI of the OBSS.

If the receiving STA is a non-AP STA, then it can report the parsed information to its associated AP. If the receiving STA is an AP, it can consider the parsed information when updating and/or rescheduling the coordinated R-TWT SP in its own BSS.

The AP and/or non-AP STAs which support coordinated R-TWT may support independent coordinated R-TWT (re) schedule negotiation between each AP to non-AP STA pair or support coordinated R-TWT (re)schedule advertisement from AP to a group of non-AP STAs at once.

8.1.1. Coordinated R-TWT Report/Request Frame

When a non-AP STA supporting coordinated R-TWT capabilities detects an OBSS frame with different BSS color, it should parse the frame to check if the source of the frame is capable to support the coordinated R-TWT and/or contains (coordinated) R-TWT schedules of the OBSS. If so, it implicitly indicates that this non-AP STA may locate within an area that was interfered by the OBSS frame Source. in this case, the non-AP STA should check BSSID from the OBSS frame to see if the frame is sent from a coordinated OBSS as previously announced by its associated AP.

If the non-AP STA is unable to identify the BSSID from the previously announced coordinated OBSS by its associated AP, then this indicates that the OBSS device might be hidden from its associated AP. The non-AP STA should report the information including, but not limited to the BSSID, the R-TWT schedule, the quiet schedule, the STF offset, the primary channel and bandwidth information of the OBSS as parsed from the received OBSS frame to its associated AP.

If the non-AP STA identifies that the frame was sent from a coordinated OBSS, then this implicitly indicates that the non-AP STA associated AP may also receive this frame and will be aware of the R-TWT schedule of this coordinated OBSS. The non-AP STA should parse the frame without immediately reporting the parsed information to its associated AP, unless the non-AP STA can identify that its associated AP failed to receive the frame from the coordinated OBSS after a timeout, whereby at that time the non-AP STA should report the parsed information to its associated AP. Otherwise, the non-AP STA should report the parsed BSSID and R-TWT ID information from the OBSS frame to its associated AP, to let AP be aware that it may interfered by the OBSS frame source, which has been granted a R-TWT identified by the R-TWT ID from the OBSS AP.

The coordinated R-TWT Report/Request frame sent from a UHR non-AP STA to its associated UHR AP can be configured in different ways according to different embodiments or modes of the present disclosure. By way of example and not limitation, there are at least four ways, as follows. (1) The Report/Request frame can be directly carried in management frame body. (2) The Report/Request frame can be carried in the (coordinated) TWT element if TSF offset, and OBSS channel operation information are not needed. (3) The Report/Request frame can be carried in a (coordinated) TWT element for corresponding OBSS's BSSID together with the modified Neighbor Report element, which further provide TSF offset and OBSS channel operation information. (4) The Report/Request frame may be carried in a (coordinated) TWT element for corresponding OBSS's BSSID together with the modified Reduced Neighbor Report element, which further provide TSF offset and OBSS channel operation information.

8.2. C-RTWT Negotiation/Announcement

Figure 31:
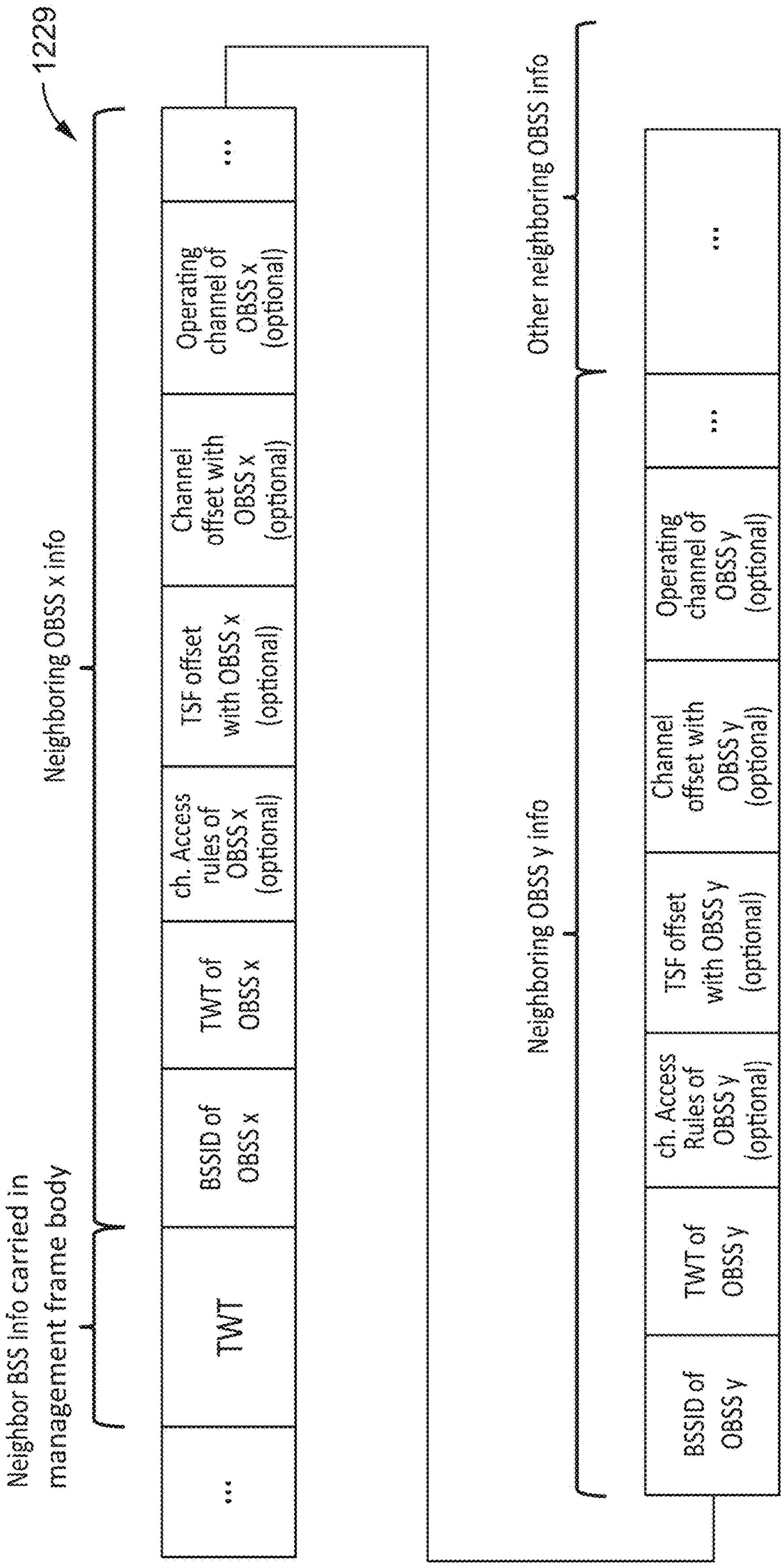
FIG. 31 is a data field diagram of a management frame carrying neighbor BSS information according to at least one embodiment of the present disclosure.

FIG. 31 illustrates an example embodiment 1230 of a CR-TWT Negotiation/Announcement frame which carries relevant neighbor BSS information. The TWT subfield indicates the coordinated R-TWT schedule the non-AP STA is negotiated for in its own BSS. The non-AP STA should report the R-TWT schedule with modified Broadcast TWT Info subfield as shown in Section 8.3.

The TWT value in the OBSS subfield indicates the coordinated TWT info or the TWT ID of the neighboring BSS. If the non-AP STA, which receives OBSS signal is unable to identify the OBSS's BSSID from the previously announced coordinated OBSS(s)'s BSSID(s) by its associated AP, then this indicates that the OBSS device might be hidden from its associated AP. The non-AP STA should report the R-TWT information with a modified Broadcast TWT Info subfield as described in Section 8.3.

If the non-AP STA, which receives OBSS signal identifies that the frame is sent from a coordinated OBSS, and its associated AP also receives this frame, then the associated AP will be aware of the R-TWT schedule of this coordinated OBSS. The non-AP STA should report the R-TWT ID together with the BSSID of the coordinated OBSS to its associated AP.

A Channel Access Rules subfield indicates the channel access rules included with respect to the quiet interval corresponding to the neighboring BSS, which can be the same as the Quiet element as defined in Draft P802.11 be_D6.0, and/or the TXOP termination rules at the starting point of the neighboring BSS.

The TSF Offset subfield contains the TSF timer offset of the neighbor AP, as a time difference in Timer Units (TUs), between the serving AP and a neighbor AP. This offset is given modulo the Beacon Interval of the neighbor AP and rounded to the nearest TU boundary.

The Channel offset subfield indicates the primary channel offset with the neighbor AP's primary channel.

The Operating Channel subfield indicates the bandwidth of the operating channel of the neighbor AP, such as channel position and channel bandwidth.

The Channel Access Rules subfield, TSF Offset subfield, Channel offset subfield and Operating Channel subfield are optionally presented in the Negotiation Relevant frame body. When the non-AP STA identifies the OBSS frame has been received by its associated AP which will be aware of the information indicated in these subfields, these subfields will not be included in the Report frame sent from the non-AP STA to its associated AP. Otherwise, these subfield should be included in the Report frame.

8.3. (Coordinated) TWT Element

Figure 32:
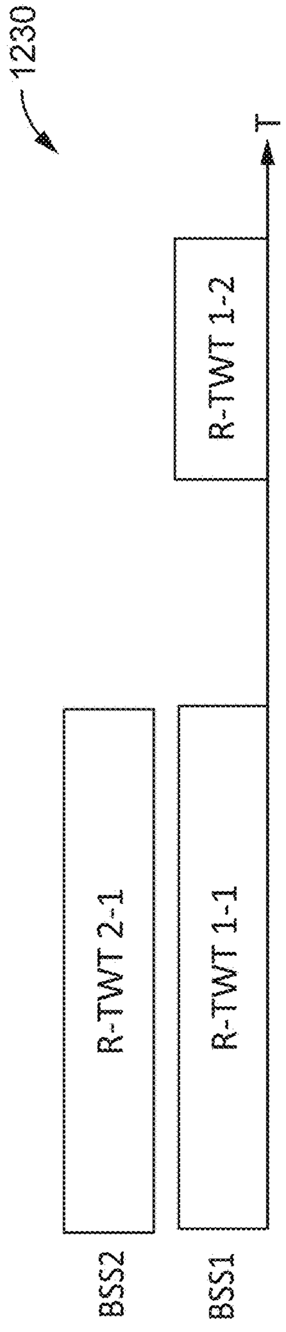
FIG. 32 is a time domain communication example of incorporating multiple (coordinated) R-TWT Parameter Sets according to at least one embodiment of the present disclosure.

FIG. 32 illustrates an example embodiment 1230 in the time domain of incorporating multiple (coordinated) R-TWT Parameter Sets inside one (coordinated) TWT Element. In the figure is seen simultaneous communication of R-TWT 1-1 in BSS1 and R-TWT 2-1 in BSS2, which is followed by communicating R-TWT 1-2 in BSS1.

Figure 33:
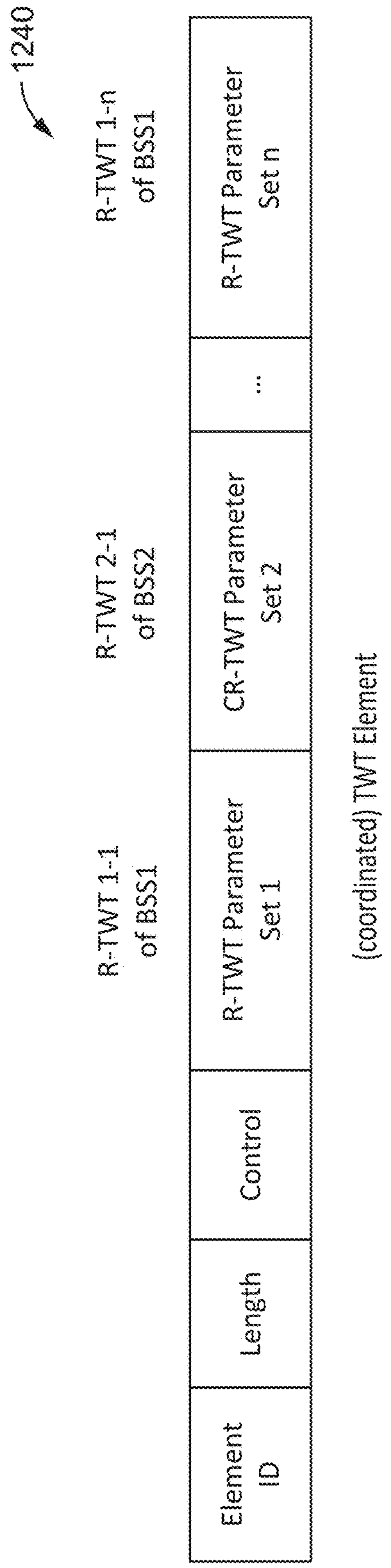
FIG. 33 is a data field diagram of a coordinated TWT data element according to at least one embodiment of the present disclosure.

FIG. 33 illustrates an example embodiment 1240 of a coordinated TWT data element. The frame is shown with Element ID, Length, and control fields, followed by TWT parameters sets. An R-TWT Parameter Set 1 field indicates the R-TWT Parameter Set which is used to indicate the R-TWT schedule as identified by R-TWT 1-1 in BSS1, with schedule distributions shown in FIG. 32. The R-TWT Parameter Set 2 field indicates the R-TWT Parameter Set which is used to indicate the R-TWT schedule as identified by R-TWT 2-1 in BSS2, where the schedule distribution in time domain is overlapped with R-TWT 1-1 in BSS1 as shown in FIG. 32. The R-TWT Parameter Set n field indicates the R-TWT schedule as identified by R-TWT 1-n in BSS1, where the schedule distribution in time domain is not overlapping with any OBSS R-TWT SP as shown in FIG. 32.

Figure 34:
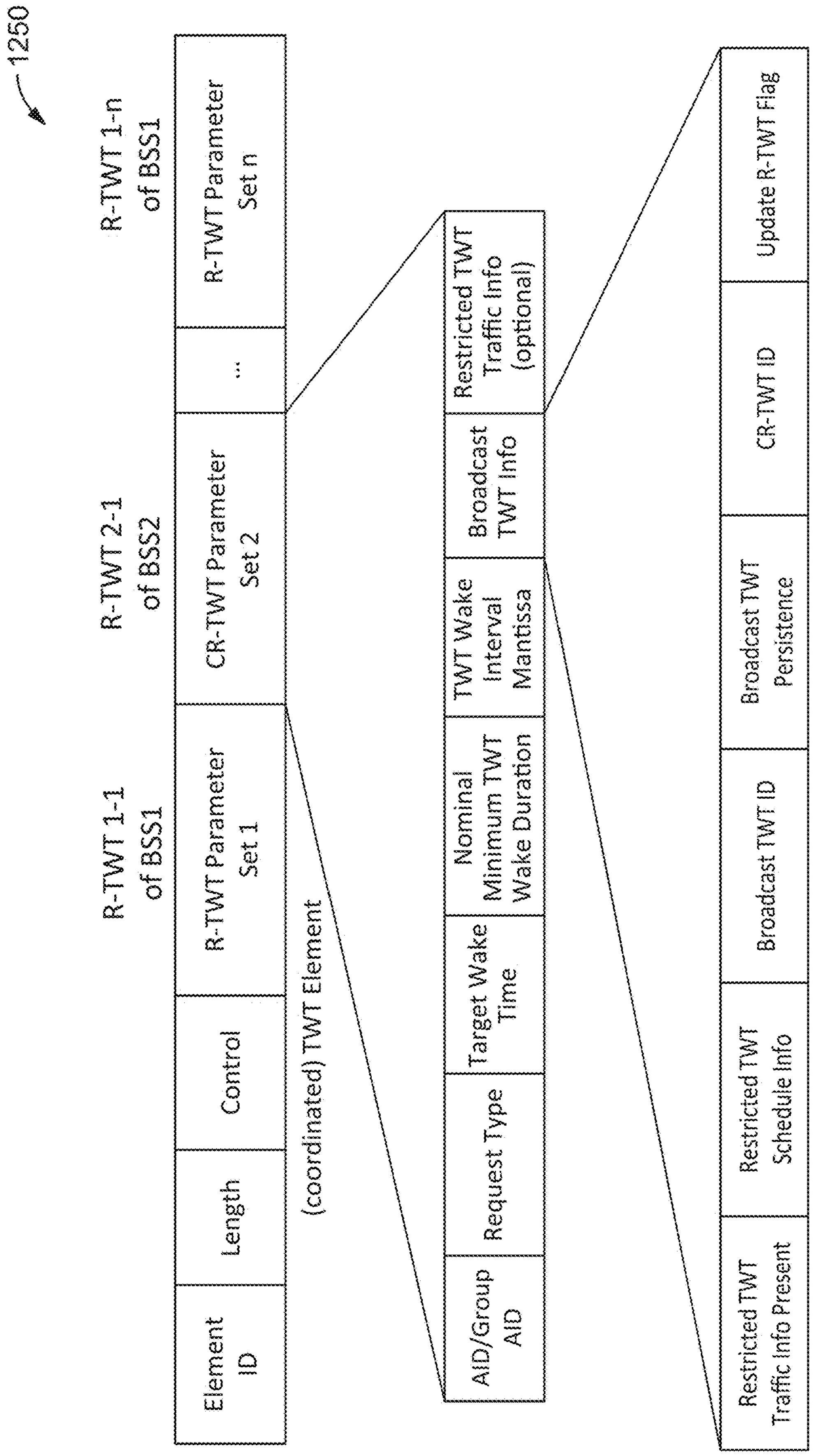
FIG. 34 is a data field diagram of a Broadcast TWT Information element according to at least one embodiment of the present disclosure.

FIG. 34 illustrates an example embodiment 1250 of incorporating a Coordinated R-TWT ID element, and an Update R-TWT flag within a Broadcast TWT info subfield, and incorporating a AID/Group AID within a coordinated R-TWT Parameter Set.

A TWT element in EHT can only indicate that the advertised R-TWT schedule is for the associated AP, or for an AP corresponding to a non-transmitted BSSID that is a member of the same multiple BSSID set or co-hosted BSSID set as the AP transmitting the Restricted TWT Schedule Info subfield.

The TWT element in UHR, however, allows for indicating the R-TWT schedule of an OBSS AP, which is not a member of the same multiple BSSID set or co-hosted BSSID set as the AP transmitting the Restricted TWT Schedule Info subfield, which shown in FIG. 32 as for the information of R-TWT 2-1 of BSS2 is carried in the coordinated T-TWT Parameter Set field in the (coordinated) TWT Element, which is carried in a frame sent by BSS1 AP/non-AP STA.

In addition, a new coordinated R-TWT ID should be included in the (coordinated) TWT element, such as in the Broadcast TWT Info subfield of the coordinated R-TWT Parameter Set to indicate the coordinated R-TWT ID negotiated between the non-AP STA and its associated AP, and also indicates the interfering OBSS R-TWT ID and/or BSSID, if it has been detected and parsed from any OBSS signals.

To avoid a deadlock situation that after neighboring coordinated APs reschedule, the updated coordinated R-TWT SPs may overlap again, a signal bit for setting the Update R-TWT Flag should be included in the coordinated R-TWT Parameter Set. In this case, (coordinated) TWT Element should be updated in the following manner which includes but is not limited to the following examples:

(a) The Broadcast TWT Parameter Set field which has the Broadcast TWT Recommendation field value equal to a specific value, such as, 5, is referred to as a Coordinated Restricted (CR)-TWT Parameter Set field. A new Restricted TWT Schedule Info subfield value (e.g., 4 since 0-3 is used) can be used in the Broadcast TWT Info subfield of the CR-TWT Parameter set field to indicate the case of performing a coordinated R-TWT request or report function (from non-AP STA to AP), where the R-TWT schedule is from an OBSS AP, which is not a member of the same multiple BSSID set or co-hosted BSSID set as the AP transmitting the Restricted TWT Schedule Info subfield, and in another case of perform coordinated R-TWT response function (from AP to non-AP STA), where the R-TWT schedule is the rescheduled coordinated R-TWT schedule that AP assigned for one/group of coordinated R-TWT member STAs.

(b) For instance, the coordinated R-TWT Parameter Set field should carry AID/Group AID subfield to indicate the coordinated R-TWT SP as identified by the coordinated R-TWT ID field under the same coordinated R-TWT Parameter Set field is negotiated for which coordinated R-TWT scheduled STA(s) in the intended BSS. It is possible that STAs that previously own the R-TWT membership of the same R-TWT SP could negotiate for and been granted coordinated R-TWT membership in different coordinated R-TWT SPs, which is carried in different coordinated R-TWT Parameter Sets.

(c) For instance, include a coordinated R-TWT ID IN THE Broadcast TWT Info subfield of the coordinated R-TWT Parameter set field of the (coordinated) TWT Element.

(d) For instance, for the coordinated R-TWT ID, if presented, can identify R-TWT ID of BSS1 and R-TWT ID of BSS2 as parsed from OBSS frame. If the CR-TWT ID indicate as for example., <R-TWT ID of BSS1 (R-TWT 1-1), R-TWT ID of BSS2 (R-TWT 2-1)>, then: In case of perform coordinated R-TWT request or report function (from non-AP STA to AP): all the subfields in coordinated R-TWT Parameter Set 2 should remains to reflect the R-TWT schedule of R-TWT 2-1 from BSS2, and the Broadcast TWT ID could be set as R-TWT ID of BSS2 (R-TWT 2-1). In case of perform coordinated R-TWT response function (from AP to non-AP STA) meaning all the subfields in coordinated R-TWT Parameter Set 2 should remains to reflect the (re)scheduled coordinated R-TWT schedule with considering the interference of R-TWT 2-1 from BSS2, and the Broadcast TWT ID could be set as R-TWT ID of the (re)scheduled coordinated R-TWT in for the coordinated R-TWT member STAs in BSS1, whose AID/Group AID are indicated in the AID/Group AID subfield of the same CR-TWT Parameter Set field.

If the coordinated R-TWT ID indicate as e.g., <R-TWT ID of BSS1 (R-TWT 1-1), None>, all other subfields in coordinated R-TWT Parameter Set 2 could be deleted or reserved since there is no interference R-TWT SP from BSS2. If the coordinated R-TWT ID indicate as e.g., <R-TWT ID of BSS1 (R-TWT 1-1), BSSID of BSS2>, all other subfields in coordinated R-TWT Parameter Set 2 could be deleted or reserved since there is no interference R-TWT SP from BSS2. New subfields can define enhanced channel access rules when TXOP from BSS2 interferes the R-TWT 1-1 SP from BSS1, which is not within the scope of this disclosure.

(e) To avoid deadlock that the updated coordinated R-TWT SPs may overlap again, a signal bit for setting the Update R-TWT Flag is included to indicates that the scheduler of the R-TWT SP identified by the Broadcast TWT ID has update the R-TWT SP with considering the R-TWT SPs of its own BSS and the coordinated OBSS.

8.4. Neighbor Report Element

Figure 35:
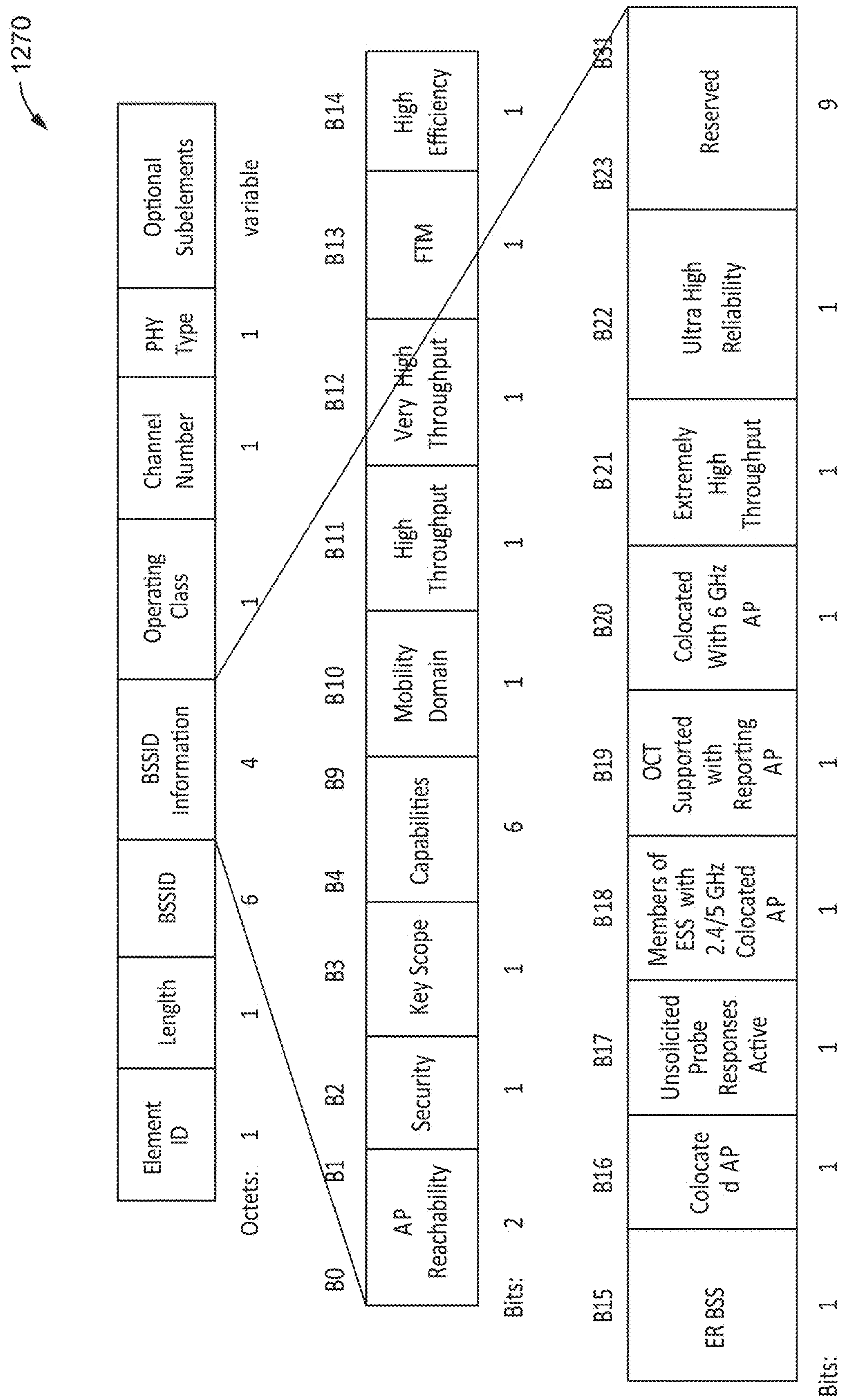
FIG. 35 is a data field diagram of a Neighbor Report element according to at least one embodiment of the present disclosure.

FIG. 35 illustrates an example embodiment 1270 of the Neighbor Report element. The value of the BSSID field is the BSSID of the BSS being reported. The subsequent fields in the Neighbor Report element pertain to this BSS. The BSSID Information field can be used to help determine neighbor service set transition candidates. The Operating Class and Channel Number field together indicate the primary channel of the BSS being reported. The Channel Number field indicates the last known primary channel of the AP indicated by this BSSID. The PHY Type field indicates the PHY type of the AP indicated by this BSSID; and is an integer value coded according to the value of the dot11 PHYType.

The Optional Subelements field contains zero or more sub elements, which would be a good candidate to further carry TWT elements. The coordinated R-TWT Report/Request frame functionality could be achieved by embedding the (coordinated) TWT element inside the Neighbor Report element for the reported AP from OBSS.

Figure 36:
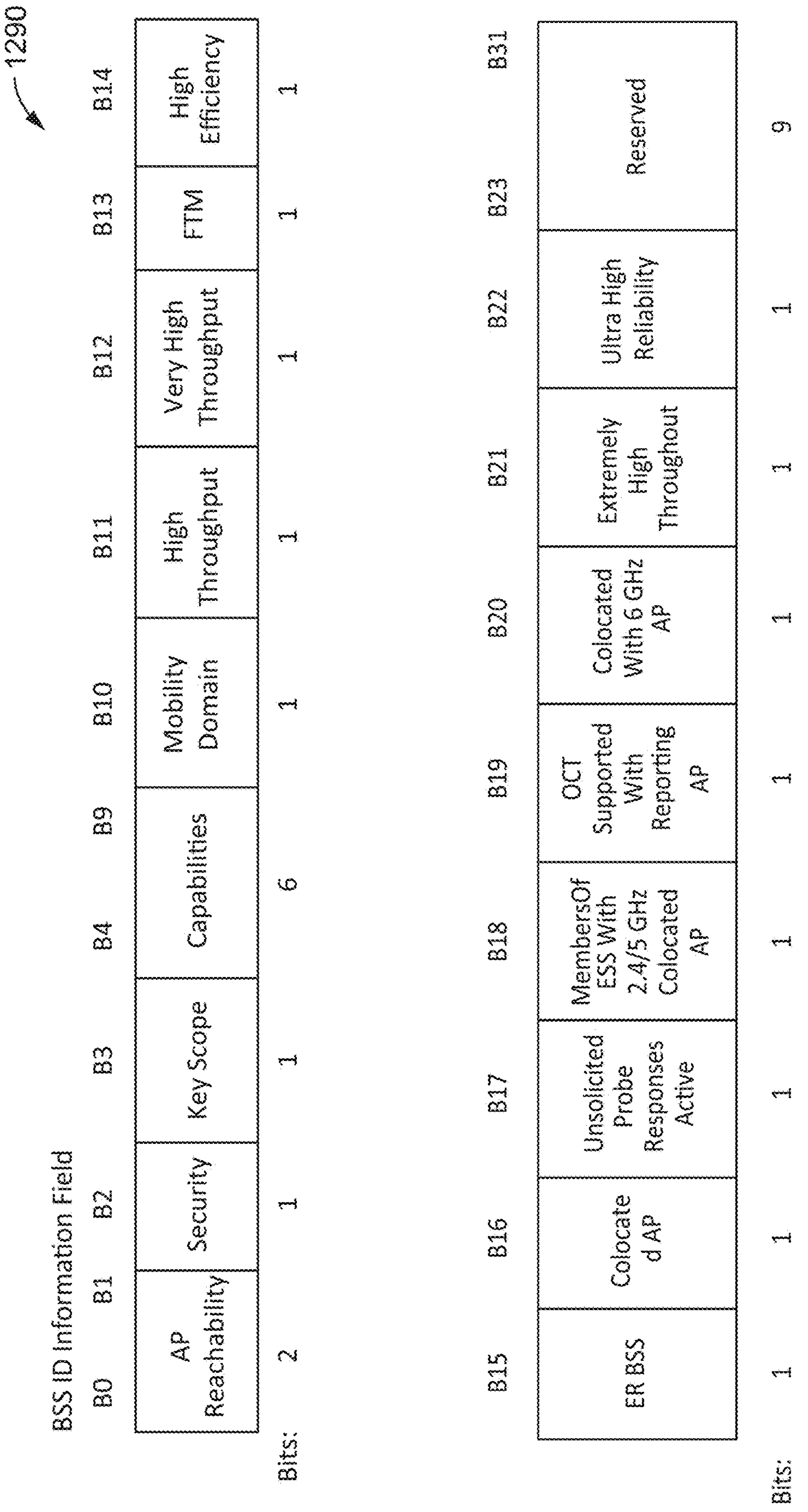
FIG. 36 is a data field diagram of a BSSID information field format according to at least one embodiment of the present disclosure.

FIG. 36 illustrates an example embodiment 1290 of subfields added within the BSSID information field. The subfields are shown as AP Reliability, Security, Key Scope, Capabilities, Mobility Domain, High Throughput, Very High Throughput, FTM, High Efficiency, ER BSS, Collocated AP, Unsolicited Probe Response Active, Members of ESS with 2.4/5 GHz Collocated AP, Collocated with 6 GHz AP, Extremely High Reliability and Reserved.

To the above, the present disclosure adds an Ultra-High Reliability (UHR) subfield to the BSSID Information format. The Ultra High Reliability subfield is set to a first state (e.g., '1') to indicate that the AP represented by this BSSID (reported AP) is an UHR AP and that the UHR Capabilities element (or UHR Operation element) as defined in Section 8.1, if included as a sub element in the modified Neighbor Report element, which is carried by the CR-TWT Report frame, is identical in content to the UHR Capabilities element (or UHR Operation element) that the reporting AP includes in the Beacon frames it transmits. Otherwise, the Ultra High Reliability subfield is set to a second state (e.g., '0').

When the Ultra High Reliability subfield is set to a first state (e.g., '1'), and when the (coordinated) TWT element as defined in Section 8.3 is present as a sub element in the modified Neighbor Report element, which is carried by the CR-TWT Report frame for a reported AP, the fields included in the (coordinated) TWT element are identical in content in the corresponding fields that are present in the (coordinated) TWT element that the reporting AP includes in the Beacon frames that it transmits.

It should be noted that various optional sub element ID may be used for the Neighbor Report. In particular, the UHR Capabilities subfield, UHR Operation subfield and (Coordinated) TWT subfields can be implemented using any values from the reserved values and each is extensible.

A (coordinated) TWT sub element should be included in the optional sub elements of the Neighbor Report element. The field of the TWT sub element should have the same format as the TWT element defined in Section 8.3 (coordinated) TWT element or could have the same format as the TWT element as defined in Draft P802.11 be_D6.0, the (coordinated) TWT sub element is not present if the reporting AP is not supporting coordinated R-TWT.

8.5. Reduced Neighbor Report (RNR) Element

Figure 37:
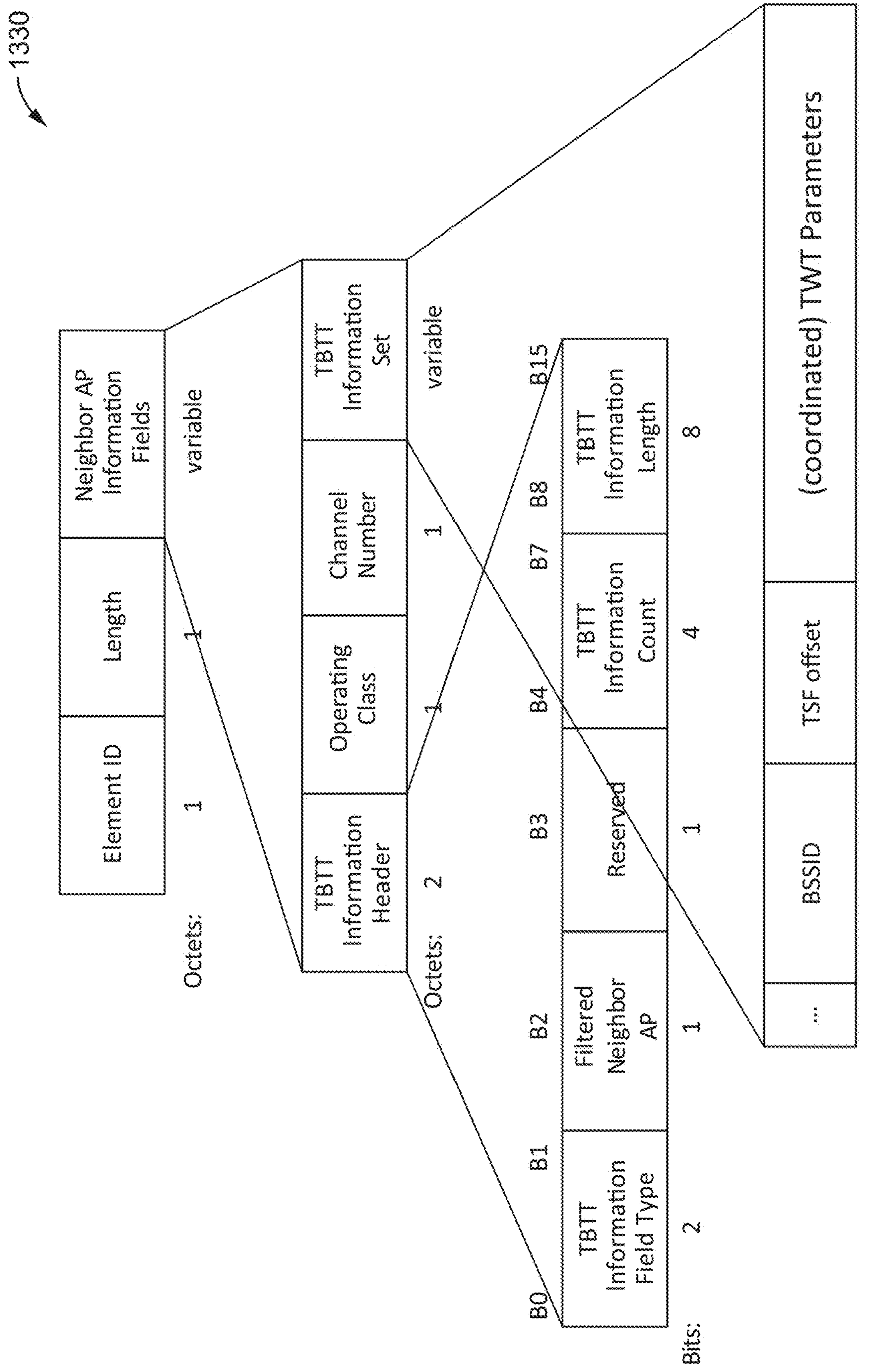
FIG. 37 is a data field diagram of a Reduced Neighbor Report element according to at least one embodiment of the present disclosure.

FIG. 37 illustrates an example embodiment 1330 of a TBTT Information field format when the TBTT Information Field Type subfield is equal to 2 and the TBTT Information Length subfield is equal to a specific value large enough to carry OBSS R-TWT relevant information.

The EHT RNR element modified the TBTT Information field format to a single MLD Parameters field when the TBTT Information Field Type subfield is equal to 1 and the TBTT Information Length subfield is equal to 3. The MLD Parameters subfield is designed to report for a neighboring AP, which is either affiliated with the same MLD as the reporting AP, or affiliated with the same MLD as a non-transmitted BSSID that is in the same multiple BSSID set as the reporting AP, or other type of ML device.

However, in the present disclosure the reported AP is described as an independent OBSS AP, regardless of the ML features of the reporting AP, which is not covered in the current EHT specification.

In order to enable RNR element to carry the R-TWT schedule of an independent OBSS AP, the following RNR element design is needed. The TBTT Information Field Type subfield identifies, together with the TBTT Information Length subfield, the format of the TBTT Information field. It is set to 0 or 1 or 2; while value 3 is reserved.

If the TBTT Information Field Type subfield is 2 or using any undefined value from the reserved values, the TBTT Information Length subfield is set to a specific value that satisfies the containing of the BSSID, the TSF offset and the (Coordinated) TWT Parameters in the subfield.

The format of the (Coordinated) TWT Parameters subfield can have the same format as the TWT element defined in Section 8.3 (Coordinated) TWT element or could have the same format as the TWT element defined in Draft P802.11 be_D6.0, the TWT Parameters sub element is not present if the reporting AP is not supporting coordinated R-TWT schedule.

8.6. Coordinated R-TWT Response Frame

Figure 38:
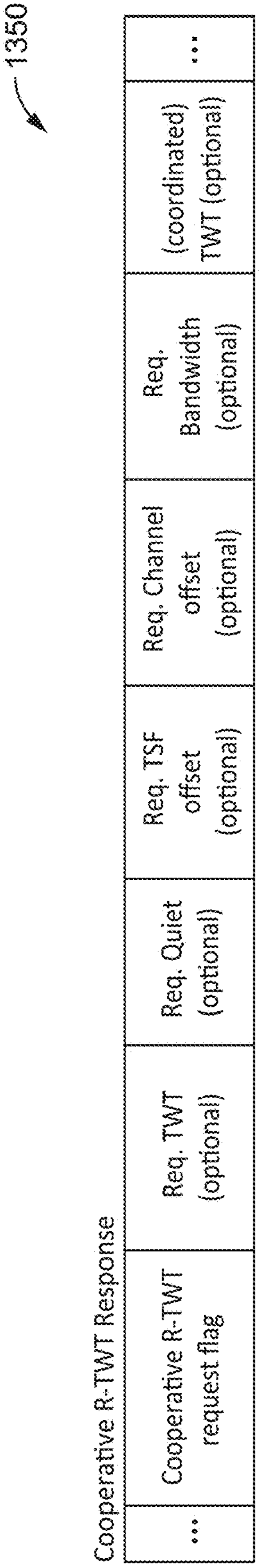
FIG. 38 is a data field diagram of a Coordinated R-TWT response frame according to at least one embodiment of the present disclosure.

FIG. 38 illustrates an example embodiment 1350 of a Coordinated R-TWT Response frame. When a non-AP STA receives an OBSS frame indicating support for coordinated R-TWT and carries corresponding R-TWT information, this implicitly indicates that the associated AP of the non-AP STA might also receive this frame and will be aware of the R-TWT schedule of this coordinated OBSS. According to the present disclosure, the non-AP STA should parse the frame and first report at least the parsed BSSID/BSS color, the AID or TA, the RSSI and/or the RCPI and R-TWT ID information from the OBSS frame to its associated AP. The non-AP STA can identify if its associated AP has successfully received the frame from the coordinated OBSS based on the response of the AP. If the response from the AP requests to report more information (e.g., set a Coordinated R-TWT Info request flag) including but not limited to the coordinated R-TWT schedule, the channel access rules, the STF offset, the primary channel and operating channel information of the OBSS as parsed from the received OBSS frame, then the non-AP STA should further report these parsed elements of information to its associated AP. Otherwise, the non-AP STA can assume its associated AP is aware that it has interfered with the OBSS frame source and is aware of the coordinated R-TWT schedule and other information from that interfering OBSS. In this case, the Coordinated R-TWT response frame should optionally carry a Coordinated R-TWT Info request flag, and requirements of the coordinated R-TWT schedule, the channel access rules, the STF offset, the primary channel and operating channel subfields.

If the Coordinated R-TWT Info request flag subfield is set to a first state (e.g. '1'), then this indicates that the AP requests the reporting non-AP STA to further report the information as indicated in following subfield by setting the bit value to a first state (e.g., '1') in the corresponding subfield. For example, the request may indicate to further report the coordinated R-TWT schedule, by setting the request TWT subfield to the first state, otherwise, it is set to a second state.

If the Coordinated R-TWT Info request flag subfield is set to a second state (e.g., '0'), then this indicates that the AP is not requesting further report information from the non-AP STA, and optional subfields should not be present. In this case, AP may carry (coordinated) TWT element as in 8.3 to either individually negotiate the rescheduled CR-TWT SP(s) with each coordinated R-TWT member STA or broadcast the (re)scheduled coordinated R-TWT SP(s) to all coordinated R-TWT member STAs. The coordinated R-TWT member STA(s) that the AP is negotiating with could be indicated by the AID/Group AID subfield in the coordinated R-TWT Parameter Set field.

9. Protocol Process Flow Diagrams

9.1. Process for UHR AP

Figure 39:
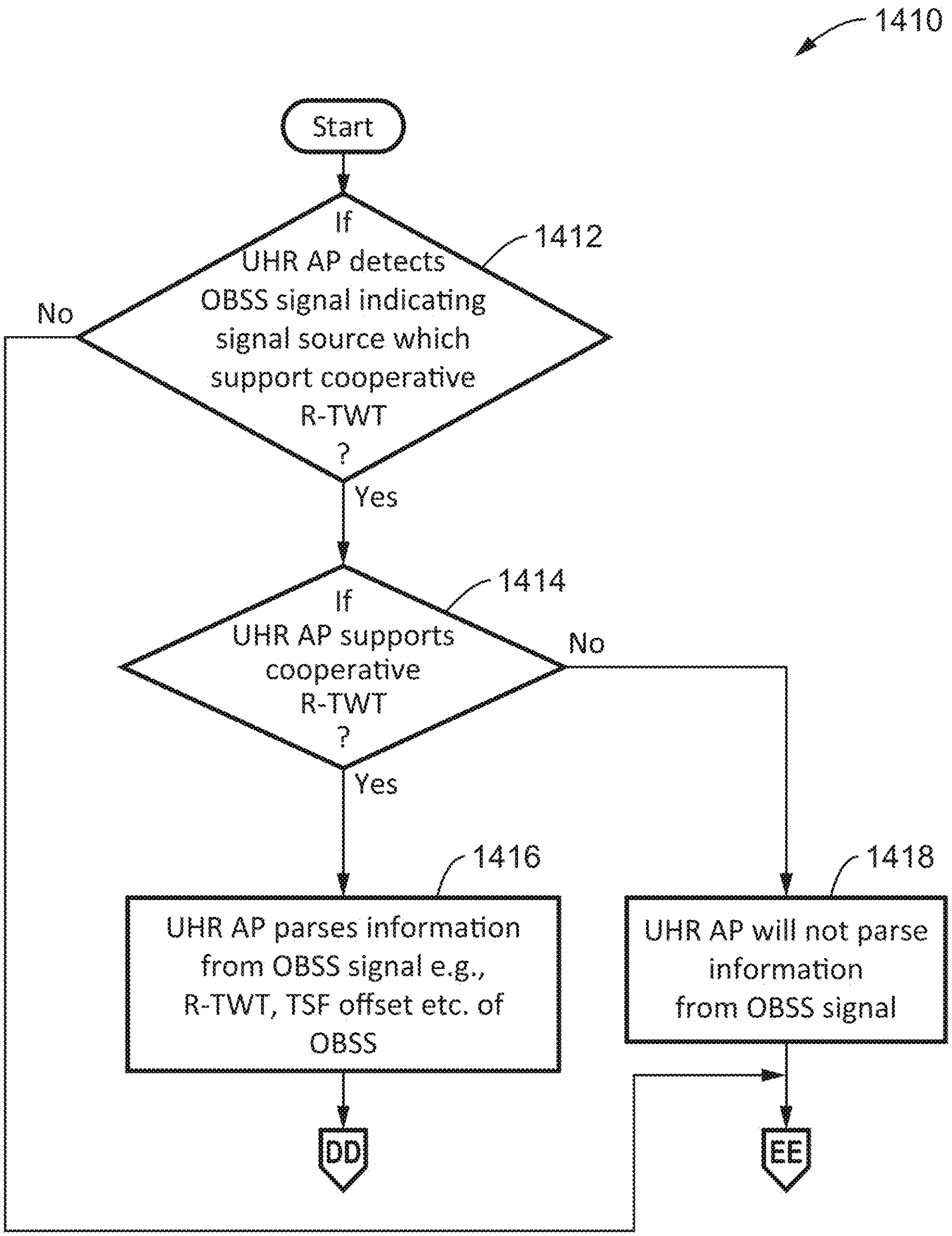
FIG. 39 and FIG. 40 is a flow diagram of UHR AP scheduling operation according to at least one embodiment of the present disclosure.
Figure 40:
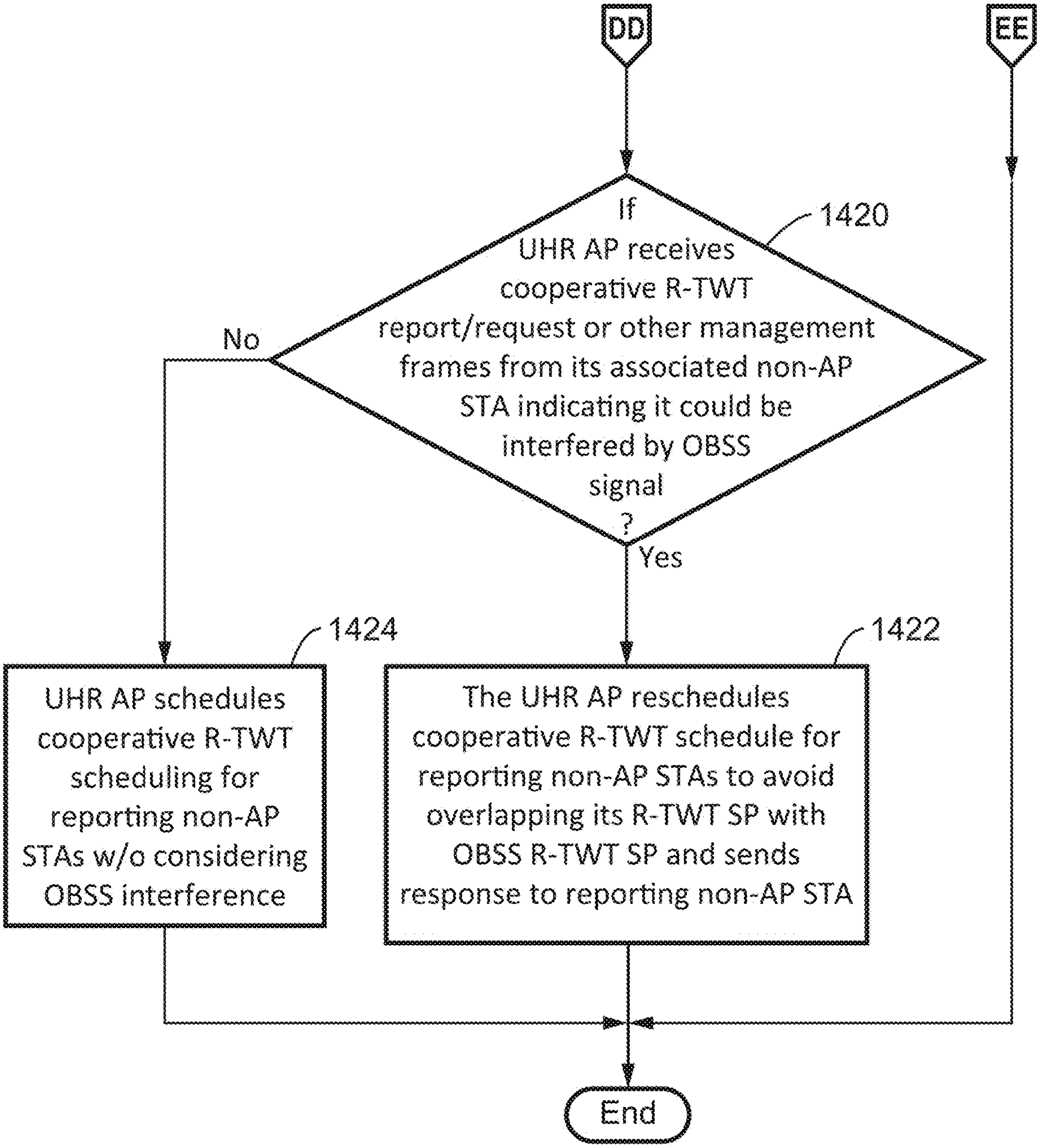

FIG. 39 and FIG. 40 illustrate an example embodiment 1410 of the scheduling operation performed by a UHR AP. A check 1412 in FIG. 39 is a check on the other (OBSS) UHR AP which could be the signal source of the OBSS signal, and it determines if the signal source supports coordinated R-TWT. If coordinated R-TWT is not supported, then this process is completed. Otherwise, check 1414 is reached which further checks if the intended BSS UHR AP supports coordinated R-TWT. If the coordinated R-TWT is not supported, then the UHR AP will not parse 1418 information from the OBSS signal and this processing ends.

Otherwise, block 1416 is reached and the UHR AP parses information from the OBSS signal, such as R-TWT, TSF Offset, and any other relevant information from the OBSS with execution moving to check 1420 in FIG. 40. In the parsing operation, the receiver reads received headers and determines the meaning of the information carried in the frame. The receiver can only take action, such as rescheduling, only after finishing parsing the received frame; and rescheduling is only needed for the interfering OBSS R-TWT SP.

Check 1420 determines if the UHR AP has received a coordinated R-TWT report or request, or other management frames from its associated non-AP STA indicating it could be interfered with by the OBSS signal. If the condition is not met, then at block 1424, the UHR AP schedules coordinated R-TWT scheduling for reporting non-AP STAs without considering OBSS interference, and this processing ends.

Otherwise, if the condition of check 1420 is met, then at block 1422 the UHR AP reschedules the coordinated R-TWT scheduling for reporting non-AP STAs to avoid overlapping its R-TWT SP with OBSS R-TWT SP and sends a response to the reporting non-AP STA, after which this process ends.

9.2. Process for UHR Non-AP STA

Figure 41:
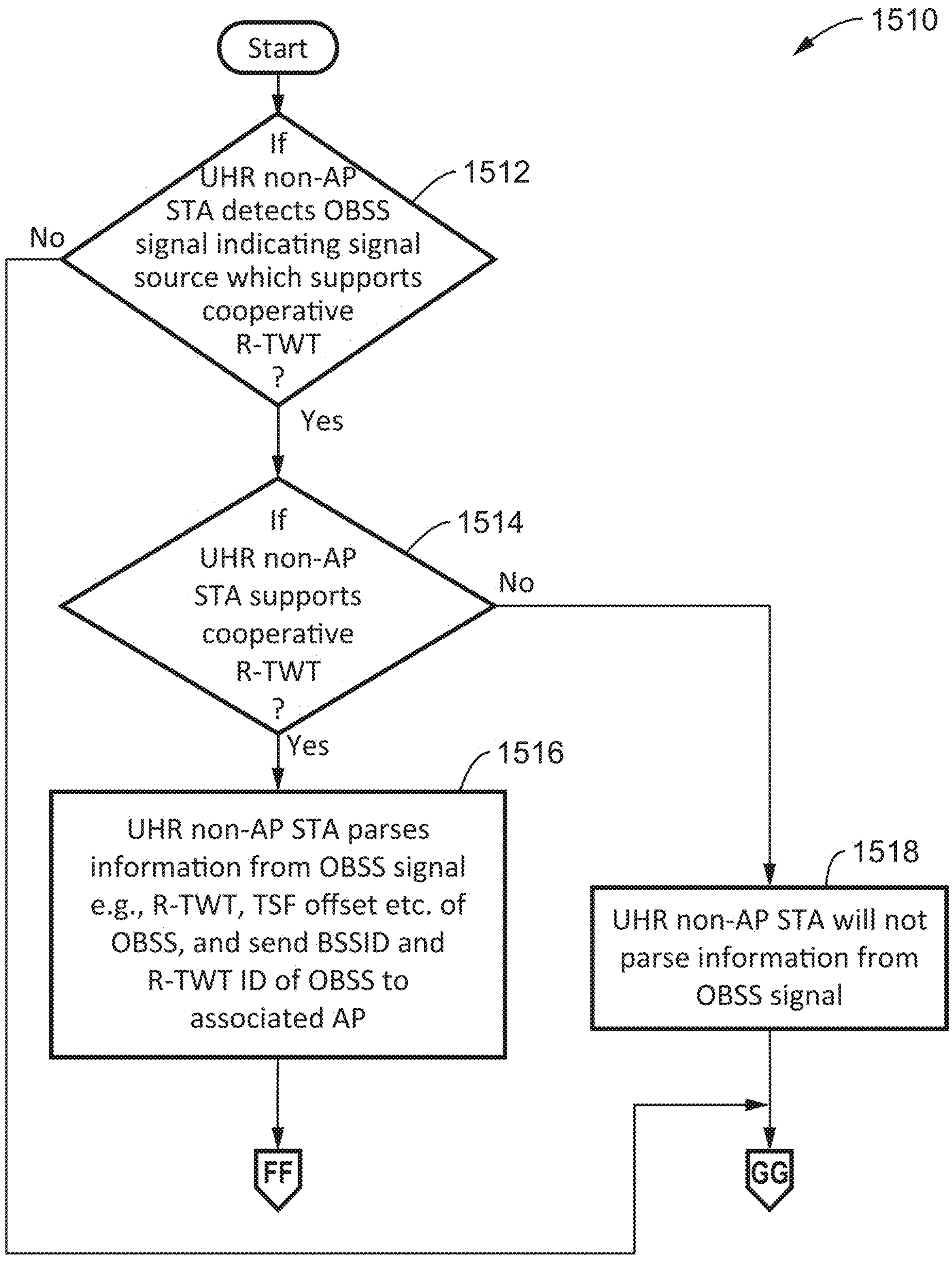
FIG. 41 and FIG. 42 is a flow diagram of UHR non-AP scheduling operation according to at least one embodiment of the present disclosure.
Figure 42:
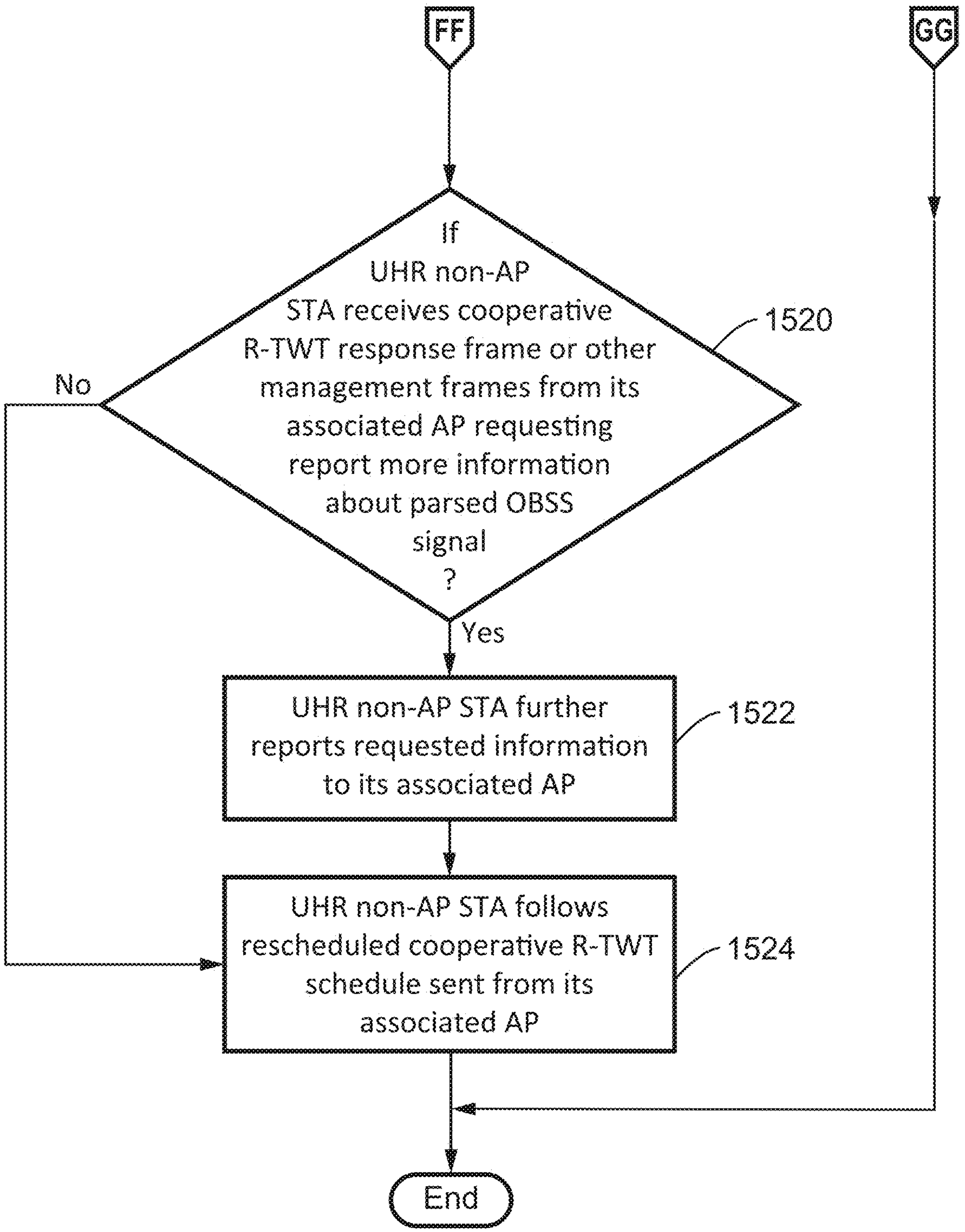

FIG. 41 and FIG. 42 illustrate an example embodiment 1510 for scheduling operations performed by a UHR AP. In FIG. 41 a check 1512 is performed which determines if the UHR non-AP STA detects an OBSS signal source with supports coordinated R-TWT. If the condition is not met, then the process ends.

Otherwise at block 1514 it is determined if the UHR non-AP STA supports coordinated R-TWT. If it does not support the coordinated R-TWT, then at block 1518 the UHR non-AP STA will not parse information from the OBSS signal, and this processing is completed.

However, if the condition of check 1514 is met, then at block 1516, the UHR non-AP STA parses information from the OBSS signal (such as R-TWT, TSF Offset, or other relevant information of the OBSS and sends the BSSID and R-TWT ID of the OBSS to the associated AP, with execution moving to check 1520 in FIG. 42 which determines if the UHR non-AP STA receives a coordinated R-TWT response frame or other management frame from its associated AP requesting it to report more information about the parsed OBSS signal. If the condition is not met, then execution moves forward to block 1524. However, if the condition is met, then at block 1522 the UHR non-AP STA further reports requested information to its associated AP. In block 1524 the UHR non-AP STA follows rescheduled coordinated R-TWT scheduling sent from its associated AP and this processing ends.

10. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(s), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A station apparatus for communication in a wireless network, the apparatus comprising: (a) at least one modem coupled to at least one radio-frequency (RF) circuit, with each RF circuit connected to one or multiple antennas; (b) wherein said station (STA) is configured as a separate STA or as a STA within a multiple-link device (MLD); (c) a processor of said STA; (d) a non-transitory memory storing instructions executable by the processor for wirelessly communicating with other STAs on a IEEE 802.11 wireless local area network (WLAN); and (e) wherein said instructions, when executed by the processor, perform steps of a wireless communications protocol, comprising: (e)(i) wherein said STA operates a wireless communications protocol as either a ultra high reliability (UHR) Access Point (AP) STA of its basic service set (BSS) or a UHR non-AP STA associated with the UHR AP in the BSS, for communicating with other STAs in the network; (e)(ii) incorporating a flag in the basic service set identification (BSSID) field of UHR AP and UHR non-AP STAs to indicate if the AP represented by the BSSID is a UHR AP; and (e)(iii) rescheduling restricted-target wake times (R-TWT) by the UHR AP to avoid overlapping and/or interfering its R-TWT service period (SP) with another BSS (OBSS) R-TWT SP, in response to detecting a signal from the OBSS which indicates it is an UHR AP or it is an UHR non-AP STA that is associate with an UHR AP that supports coordinated R-TWT and extracting information from that OBSS signal, and performing rescheduling when a UHR non-AP STA of the BSS indicates it could be interfered with by communications by the OBSS.

A station apparatus for communication in a wireless network, the apparatus comprising: (a) at least one modem coupled to at least one radio-frequency (RF) circuit, with each RF circuit connected to one or multiple antennas; (b) wherein said station (STA) is configured as a separate STA or as a STA within a multiple-link device (MLD); (c) a processor of said STA; (d) a non-transitory memory storing instructions executable by the processor for wirelessly communicating with other STAs on an IEEE 802.11 wireless local area network (WLAN); and (e) wherein said instructions, when executed by the processor, perform steps of a wireless communications protocol, comprising: (e)(i) wherein said STA operates a wireless communications protocol as either an ultra high reliability (UHR) Access Point (AP) STA of its basic service set (BSS) or a UHR non-AP STA associated with the UHR AP in the BSS, for communicating with other STAs in the network; (e)(ii) incorporating a flag in the basic service set identification (BSSID) field of UHR AP and UHR non-AP STAs to indicate if the AP represented by the BSSID is a UHR AP; (e)(iii) rescheduling restricted-target wake times (R-TWT) by the UHR AP to avoid overlapping and/or interfering its R-TWT service period (SP) with another BSS (OBSS) R-TWT SP, in response to detecting a signal from the OBSS which indicates it is an UHR AP or it is an UHR non-AP STA that is associate with an UHR AP that supports coordinated R-TWT and extracting information from that OBSS signal, and performing rescheduling when a UHR non-AP STA of the BSS indicates it could be interfered with by communications by the OBSS; and (e)(iv) wherein said UHR AP receives information from a UHR non-AP STA which supports coordinated R-TWT in its BSS, when that UHR non-AP STA detects an OBSS signal which supports coordinated R-TWT and sends information comprising the BSSID and R-TWT ID of that OBSS; wherein said UHR AP performs sending a management frame to said UHR non-AP STA in its BSS indicating that said UHR non-AP STA is to report additional information about the OBSS signal detected by UHR non-AP STA.

A method of communication between stations in a wireless network, comprising: (a) communicating between stations (STAs) in a wireless network in which STAs can be configured as either a single-link STA or as a STA within a multiple-link device (MLD) operating on an IEEE 802.11 protocol within a wireless local area network (WLAN); (b) operating a STA as either an ultra high reliability (UHR) Access Point (AP) STA of its basic service set (BSS) or a UHR non-AP STA associated with the UHR AP in the BSS, for communicating with other STAs in the network; (c) incorporating a flag in the basic service set identification (BSSID) field of UHR AP and UHR non-AP STAs to indicate if the AP represented by the BSSID is a UHR AP; and (d) rescheduling restricted-target wake times (R-TWT) by the UHR AP to avoid overlapping and/or interfering its R-TWT service period (SP) with another BSS (OBSS) R-TWT SP, in response to detecting a signal from the OBSS which indicates it is an UHR AP or it is an UHR non-AP STA that is associate with an UHR AP that supports coordinated R-TWT and extracting information from that OBSS signal, and performing rescheduling when a UHR non-AP STA of the BSS indicates it could be interfered with by communications by the OBSS.

An apparatus and method for scheduling cooperative R-TWT SP(s) for specific non-AP STAs, comprising: (a) wherein for non-AP STAs that locate within the communication range of the AP and/or non-AP STA(s) from the cooperative neighboring OBSS, the cooperative R-TWT scheduler(s) avoids scheduling non-AP STAs for a cooperative R-TWT SP that may overlap with the OBSS cooperative R-TWT SP that was scheduled to serve those interfering STAs from that OBSS; (b) wherein for non-AP STAs that are not located within the communication range of the AP or non-AP STA(s) from the cooperative neighboring OBSS, the cooperative R-TWT scheduler(s) schedules the non-AP STAs in a cooperative R-TWT SP that may overlap with the OBSS cooperative R-TWT SP that was scheduled to serve those STAs not introduce interference from that OBSS.

An apparatus and method for scheduling cooperative R-TWT SP(s) in which the cooperative R-TWT scheduling APs and the cooperative R-TWT scheduled STAs from the cooperative BSSs indicate the capabilities comprising: (a) supporting cooperative R-TWT features (e.g., C (cooperative)-TDMA, C-OFDMA, C-SR etc.) and the corresponding channel access rules; (b) supporting the cooperative R-TWT schedule according to each specific non-AP STA's need; and (c) wherein a subfield indicating Cooperative R-TWT Support is designed to indicates the support of a cooperative R-TWT schedule, and the STA/AP that supports cooperative R-TWT receives the frame from the OBSS and parses the Cooperative R-TWT Support subfield, and when it equals 1 the STA/AP continues parsing information including but not limited to the BSSID, the R-TWT schedule, the quiet schedule, the STF offset, the primary channel and bandwidth information of the OBSS.

An apparatus and method for scheduling cooperative R-TWT SP(s) in which an AP supporting cooperative R-TWT capabilities negotiates cooperative R-TWT schedules with an OBSS AP that supports cooperative R-TWT capabilities, comprising: (a) wherein the negotiation procedure is directly through the frame exchange between these cooperative APs if they are in the communication range of each other; or wherein the negotiation procedure is coordinated through a common management entity; or the negotiation procedure is performed by relaying from the associated STAs if the cooperative APs are not in the communication range of each other; (b) wherein the cooperative R-TWT schedules are negotiated and carried in a Beacon frame or other management frames; and (c) wherein aside from the cooperative R-TWT schedule, the BSSID, the STF offset, the primary channel and bandwidth information is also carried by the negotiation frames.

The apparatus or method of any preceding implementation, wherein said UHR AP receives information from a UHR non-AP STA which supports coordinated R-TWT in its BSS, when that UHR non-AP STA detects an OBSS signal which supports coordinated R-TWT and sends information comprising the BSSID and R-TWT ID of that OBSS.

The apparatus or method of any preceding implementation, further comprising said UHR AP sending a management frame to said UHR non-AP STA in its BSS indicating that said UHR non-AP STA is to report additional information about the OBSS signal detected by UHR non-AP STA.

The apparatus or method of any preceding implementation, wherein information about said coordinated R-TWT scheduling comprises information on the type of communication signaling being performed.

The apparatus or method of any preceding implementation, wherein said type of communications is selected from the group of signaling types consisting of coordinated time division multiple access (C-TDMA), coordinated orthogonal frequency division multiple access (C-OFDMA), coordinated spatial reuse (C-SR) along with channel access rules corresponding to any of these communication types.

The apparatus or method of any preceding implementation, wherein elements are communicated to the UHR AP on coordinated R-TWT scheduling details according to the needs of the specific UHR non-AP STA.

The apparatus or method of any preceding implementation, wherein said coordinated R-TWT scheduling details comprise R-TWT schedule, quiet schedule, and time synchronization function (TSF) offset, primary channel and bandwidth information, BSS color, the AID or TA, the received channel power indicator (RSSI) and/or the received channel power indicator (RCPI) of the OBSS.

The apparatus or method of any preceding implementation, wherein the UHR AP of the BSS which supports coordinated R-TWT capabilities performs negotiations on scheduling a coordinated R-TWT schedule with an UHR AP in the OBSS that also supports coordinated R-TWT capabilities.

The apparatus or method of any preceding implementation, wherein said negotiation is directly performed through a frame exchange between these coordinated APs if they are in the communication range of each other; or could be coordinated through a common management entity; or through relaying from non-AP STAs in the associated BSSs if the coordinated APs are not in the communication range of each other.

The apparatus or method of any preceding implementation, wherein said negotiation is carried in Beacon frame or other management frames.

The apparatus or method of any preceding implementation, wherein said negotiation carries information between these coordinated APs comprising R-TWT schedule, BSSID, TSF offset, primary channel and bandwidth information, BSS color, AID or TA, RSSI and/or RCPI.

The apparatus or method of any preceding implementation, wherein UHR APs and UHR non-AP STA supporting coordinated R-TWT capabilities can negotiate coordinated R-TWT membership for specific non-AP STAs with a coordinated R-TWT ID that identifies its own BSS and information of coordinated OBSS(s) as parsed from OBSS frame.

The apparatus or method of any preceding implementation, wherein said negotiation of coordinated R-TWT schedules is performed using coordinated R-TWT Request frames, coordinated R-TWT report frames and coordinated R-TWT Response frames.

The apparatus or method of any preceding implementation, wherein said negotiation of coordinated R-TWT schedules is performed with considering traffic priorities that are to be served in the coordinated R-TWT SPs from coordinated BSSs.

The apparatus or method of any preceding implementation, wherein said UHR AP STA and UHR non-AP STAs recognize a signal bit of an update R-TWT flag in beacon frames or other management frames as sent by a UHR AP indicating it has updated the R-TWT SP schedule.

The apparatus or method of any preceding implementation, wherein rescheduling of the UHR non-AP STA coordinated R-TWT SP directs it into a new coordinated R-TWT SP which can eliminate recognized interference sources from OBSSs.

The apparatus or method of any preceding implementation, wherein rescheduling of the new coordinated R-TWT SP is performed by setting the starting point of the new coordinated R-TWT SP after the end point of the latest coordinated OBSS R-TWT SP.

As used herein, the term “implementation” is intended to include, without limitation, embodiments, examples, or other forms of practicing the technology described herein.

As used herein, the singular terms “a,” “an,” and “the” may include plural referents unless the context clearly dictates otherwise. Reference to an object in the singular is not intended to mean “one and only one” unless explicitly so stated, but rather “one or more.”

Phrasing constructs, such as “A, B and/or C”, within the present disclosure describe where either A, B, or C can be present, or any combination of items A, B and C. Phrasing constructs indicating, such as “at least one of” followed by listing a group of elements, indicates that at least one of these groups of elements is present, which includes any possible combination of the listed elements as applicable.

References in this disclosure referring to “an embodiment”, “at least one embodiment” or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term “set” refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms “comprises,” “comprising,” “has”, “having,” “includes”, “including,” “contains”, “containing” or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by “comprises . . . a”, “has . . . a”, “includes . . . a”, “contains . . . a” does not, without more constraints, preclude the existence of additional identical elements in the process, method, article, apparatus, or system, that comprises, has, includes, contains the element.

As used herein, the terms “approximately”, “approximate”, “substantially”, “essentially”, and “about”, or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to +5%, less than or equal to +4%, less than or equal to +3%, less than or equal to ±2%, less than or equal to ±1%, less than or equal to ±0.5%, less than or equal to +0.1%, or less than or equal to ±0.05%. For example, “substantially” aligned can refer to a range of angular variation of less than or equal to +10°, such as less than or equal to 5°, less than or equal to 4°, less than or equal to 3°, less than or equal to 2°, less than or equal to 1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term “coupled” as used herein is defined as connected, although not necessarily directly and not necessarily mechanically. A device or structure that is “configured” in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a “means plus function” element unless the element is expressly recited using the phrase “means for”. No claim element herein is to be construed as a “step plus function” element unless the element is expressly recited using the phrase “step for”.

TABLE 1

Rescheduling of the Coordinated R-TWT

| Req./Resp. from non-AP STA | Resp. frame from AP | Interpretation on STA side | Interpretation on AP side | Re-schedule for non-AP STA |
|---|---|---|---|---|
| <R-TWT ID of own BSS, None> | <R-TWT ID of own BSS, None> | No OBSS signal received | No OBSS signal received | No reschedule needed |
| <R-TWT ID of own BSS, None> | <R-TWT ID of own BSS, BSSID of OBSS> | No OBSS signal received | OBSS signal received which not carrying R-TWT schedule of the OBSS | No reschedule needed if Update R-TWT Flag = 1 from the reception of OBSS signal or if later no updated R-TWT schedule is received by the scheduling AP and/or scheduled non-AP STA. Otherwise, reschedule needed. |
| <R-TWT ID of own BSS, BSSID of OBSS> | <R-TWT ID of own BSS, BSSID of OBSS> | OBSS signal received which not carrying R-TWT schedule of the OBSS | OBSS signal received which not carrying R-TWT schedule of the OBSS | No reschedule needed if Update R-TWT Flag = 1 from the reception of OBSS signal or if later no updated R-TWT schedule is received by the scheduling AP and/or scheduled non-AP STA. Otherwise, reschedule needed. |
| <R-TWT ID of own BSS, None> | <R-TWT ID of own BSS, R-TWT ID of coordinated OBSS> | No OBSS signal received | OBSS signal received which carrying R-TWT schedule of the OBSS | No reschedule needed if Update R-TWT Flag = 1 from the reception of OBSS signal. Otherwise, reschedule needed. |
| <R-TWT ID of own BSS, BSSID of OBSS> | <R-TWT ID of own BSS, R-TWT ID of coordinated OBSS> | OBSS signal received which not carrying R-TWT schedule of the OBSS | OBSS signal received which carrying R-TWT schedule of the OBSS | No reschedule needed if Update R-TWT Flag = 1 from the reception of OBSS signal. Otherwise, reschedule needed. |
| <R-TWT ID of own BSS, R-TWT ID of coordinated OBSS> | <R-TWT ID of own BSS, R-TWT ID of coordinated OBSS> | OBSS signal received which carrying R-TWT schedule of the OBSS | OBSS signal received which carrying R-TWT schedule of the OBSS | No reschedule needed if Update R-TWT Flag = 1 from the reception of OBSS signal. Otherwise, reschedule needed. |

TABLE 2

(IEEE 802.11be Table 9-210)
Change Table

| Sub element ID | Name | Extensible? |
|---|---|---|
| . . . | | |
| Any value from reserved values | UHR Capabilities | Yes |
| Any value from reserved values | UHR Capabilities | Yes |
| Any value from reserved values | (Coordinated) TWT | Yes |
| . . . | Reserved | |

What is claimed is:

1. A station apparatus for communication in a wireless network, the apparatus comprising:
   (a) at least one modem coupled to at least one radio-frequency (RF) circuit, with each RF circuit connected to one or multiple antennas;
   (b) wherein said station (STA) is configured as a separate STA or as a STA within a multiple-link device (MLD);
   (c) a processor of said STA;
   (d) a non-transitory memory storing instructions executable by the processor for wirelessly communicating with other STAs on a IEEE 802.11 wireless local area network (WLAN); and
   (e) wherein said instructions, when executed by the processor, perform steps of a wireless communications protocol, comprising:
      (i) wherein said STA operates a wireless communications protocol as either a ultra high reliability (UHR) Access Point (AP) STA of its basic service set (BSS) or a UHR non-AP STA associated with the UHR AP in the BSS, for communicating with other STAs in the network;
      (ii) incorporating a flag in the basic service set identification (BSSID) field of UHR AP and UHR non-AP STAs to indicate if the AP represented by the BSSID is a UHR AP; and
      (iii) rescheduling restricted-target wake times (R-TWT) by the UHR AP to avoid overlapping and/or interfering its R-TWT service period (SP) with another BSS (OBSS) R-TWT SP, in response to detecting a signal from the OBSS which indicates it is an UHR AP or it is an UHR non-AP STA that is associate with an UHR AP that supports coordinated R-TWT and extracting information from that OBSS signal, and performing rescheduling when a UHR non-AP STA of the BSS indicates it could be interfered with by communications by the OBSS.

2. The apparatus of claim 1, wherein said UHR AP receives information from a UHR non-AP STA which supports coordinated R-TWT in its BSS, when that UHR non-AP STA detects an OBSS signal which supports coordinated R-TWT and sends information comprising the BSSID and R-TWT ID of that OBSS.

3. The apparatus of claim 2, further comprising said UHR AP sending a management frame to said UHR non-AP STA in its BSS indicating that said UHR non-AP STA is to report additional information about the OBSS signal detected by UHR non-AP STA.

4. The apparatus of claim 1, wherein information about said coordinated R-TWT scheduling comprises information on the type of communication signaling being performed.

5. The apparatus of claim 1, wherein said type of communications is selected from the group of signaling types consisting of coordinated time division multiple access (C-TDMA), coordinated orthogonal frequency division multiple access (C-OFDMA), coordinated spatial reuse (C-SR) along with channel access rules corresponding to any of these communication types.

6. The apparatus of claim 1, wherein elements are communicated to the UHR AP on coordinated R-TWT scheduling details according to the needs of the specific UHR non-AP STA.

7. The apparatus of claim 6, wherein said coordinated R-TWT scheduling details comprise R-TWT schedule, quiet schedule, and time synchronization function (TSF) offset, primary channel and bandwidth information, BSS color, the AID or TA, the received channel power indicator (RSSI) and/or the received channel power indicator (RCPI) of the OBSS.

8. The apparatus of claim 1, wherein the UHR AP of the BSS which supports coordinated R-TWT capabilities performs negotiations on scheduling a coordinated R-TWT schedule with an UHR AP in the OBSS that also supports coordinated R-TWT capabilities.

9. The apparatus of claim 8, wherein said negotiation is directly performed through a frame exchange between these coordinated APs if they are in the communication range of each other; or could be coordinated through a common management entity; or through relaying from non-AP STAs in the associated BSSs if the coordinated APs are not in the communication range of each other.

10. The apparatus of claim 8, wherein said negotiation is carried in Beacon frame or other management frames.

11. The apparatus of claim 8, wherein said negotiation carries information between these coordinated APs comprising R-TWT schedule, BSSID, TSF offset, primary channel and bandwidth information, BSS color, AID or TA, RSSI and/or RCPI.

12. The apparatus of claim 8, wherein UHR APs and UHR non-AP STA supporting coordinated R-TWT capabilities can negotiate coordinated R-TWT membership for specific non-AP STAs with a coordinated R-TWT ID that identifies its own BSS and information of coordinated OBSS(s) as parsed from OBSS frame.

13. The apparatus of claim 8, wherein said negotiation of coordinated R-TWT schedules is performed using coordinated R-TWT Request frames, coordinated R-TWT report frames and coordinated R-TWT Response frames.

14. The apparatus of claim 8, wherein said negotiation of coordinated R-TWT schedules is performed with considering traffic priorities that are to be served in the coordinated R-TWT SPs from coordinated BSSs.

15. The apparatus of claim 1, wherein said UHR AP STA and UHR non-AP STAs recognize a signal bit of an update R-TWT flag in beacon frames or other management frames as sent by a UHR AP indicating it has updated the R-TWT SP schedule.

16. The apparatus of claim 1, wherein rescheduling of the UHR non-AP STA coordinated R-TWT SP directs it into a new coordinated R-TWT SP which can eliminate recognized interference sources from OBSSs.

17. The apparatus of claim 16, wherein rescheduling of the new coordinated R-TWT SP is performed by setting the starting point of the new coordinated R-TWT SP after the end point of the latest coordinated OBSS R-TWT SP.

18. A station apparatus for communication in a wireless network, the apparatus comprising:

(a) at least one modem coupled to at least one radio-frequency (RF) circuit, with each RF circuit connected to one or multiple antennas;
(b) wherein said station (STA) is configured as a separate STA or as a STA within a multiple-link device (MLD);
(c) a processor of said STA;
(d) a non-transitory memory storing instructions executable by the processor for wirelessly communicating with other STAs on an IEEE 802.11 wireless local area network (WLAN); and
(e) wherein said instructions, when executed by the processor, perform steps of a wireless communications protocol, comprising:
  (i) wherein said STA operates a wireless communications protocol as either an ultra high reliability (UHR) Access Point (AP) STA of its basic service set (BSS) or a UHR non-AP STA associated with the UHR AP in the BSS, for communicating with other STAs in the network;
  (ii) incorporating a flag in the basic service set identification (BSSID) field of UHR AP and UHR non-AP STAs to indicate if the AP represented by the BSSID is a UHR AP;
  (iii) rescheduling restricted-target wake times (R-TWT) by the UHR AP to avoid overlapping and/or interfering its R-TWT service period (SP) with another BSS (OBSS) R-TWT SP, in response to detecting a signal from the OBSS which indicates it is an UHR AP or it is an UHR non-AP STA that is associate with an UHR AP that supports coordinated R-TWT and extracting information from that OBSS signal, and performing rescheduling when a UHR non-AP STA of the BSS indicates it could be interfered with by communications by the OBSS; and
  (iv) wherein said UHR AP receives information from a UHR non-AP STA which supports coordinated R-TWT in its BSS, when that UHR non-AP STA detects an OBSS signal which supports coordinated R-TWT and sends information comprising the BSSID and R-TWT ID of that OBSS; wherein said UHR AP performs sending a management frame to said UHR non-AP STA in its BSS indicating that said UHR non-AP STA is to report additional information about the OBSS signal detected by UHR non-AP STA.

19. The apparatus of claim 18, wherein information about said coordinated R-TWT scheduling comprises information on the type of communication signaling being performed.

20. A method of communication between stations in a wireless network, comprising:

(a) communicating between stations (STAs) in a wireless network in which STAs can be configured as either a single-link STA or as a STA within a multiple-link device (MLD) operating on an IEEE 802.11 protocol within a wireless local area network (WLAN);
(b) operating a STA as either an ultra high reliability (UHR) Access Point (AP) STA of its basic service set (BSS) or a UHR non-AP STA associated with the UHR AP in the BSS, for communicating with other STAs in the network;
(c) incorporating a flag in the basic service set identification (BSSID) field of UHR AP and UHR non-AP STAs to indicate if the AP represented by the BSSID is a UHR AP; and
(d) rescheduling restricted-target wake times (R-TWT) by the UHR AP to avoid overlapping and/or interfering its R-TWT service period (SP) with another BSS (OBSS)

R-TWT SP, in response to detecting a signal from the OBSS which indicates it is an UHR AP or it is an UHR non-AP STA that is associate with an UHR AP that supports coordinated R-TWT and extracting information from that OBSS signal, and performing rescheduling when a UHR non-AP STA of the BSS indicates it could be interfered with by communications by the OBSS.

* * * * *